[12] United States Patent
Kamada et al.

(10) Patent No.: US 7,771,309 B2
(45) Date of Patent: Aug. 10, 2010

(54) CONTROL DEVICE FOR VEHICLE DRIVE DEVICE

(75) Inventors: Atsushi Kamada, Toyota (JP); Atsushi Tabata, Okazaki (JP); Yuji Inoue, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 349 days.

(21) Appl. No.: 11/817,726

(22) PCT Filed: Mar. 3, 2006

(86) PCT No.: PCT/JP2006/304675

§ 371 (c)(1),
(2), (4) Date: Sep. 4, 2007

(87) PCT Pub. No.: WO2006/093356

PCT Pub. Date: Sep. 8, 2006

(65) Prior Publication Data

US 2009/0048050 A1 Feb. 19, 2009

(30) Foreign Application Priority Data

Mar. 4, 2005 (JP) ............................. 2005-061570
Jun. 24, 2005 (JP) ............................. 2005-184437

(51) Int. Cl.
*B60K 1/02* (2006.01)
(52) U.S. Cl. .......................................................... 477/3
(58) Field of Classification Search ...................... 477/3
See application file for complete search history.

(56) References Cited

U.S. PATENT DOCUMENTS

| 2005/0137042 | A1 | 6/2005 | Schmidt et al. |
| 2005/0204537 | A1 | 9/2005 | Reed et al. |
| 2005/0204861 | A1 | 9/2005 | Reed et al. |
| 2005/0204862 | A1 | 9/2005 | Reed et al. |
| 2005/0205335 | A1 | 9/2005 | Reed et al. |
| 2005/0205373 | A1 | 9/2005 | Foster et al. |
| 2009/0037061 | A1* | 2/2009 | Tabata et al. .................. 701/55 |
| 2009/0075779 | A1* | 3/2009 | Kumazaki et al. .............. 477/3 |

(Continued)

FOREIGN PATENT DOCUMENTS

JP 8-126115 5/1996

(Continued)

*Primary Examiner*—Dirk Wright
(74) *Attorney, Agent, or Firm*—Oblon, Spivak, McClelland, Maier & Neustadt, L.L.P.

(57) ABSTRACT

A drive apparatus for vehicle is disclosed having a coupling device (switching clutch B0 or switching brake C0) operative to switch a transmission mechanism 10 between a continuously variable shifting state and a step-variable shifting state with both advantages including improved fuel consumption achieved by a transmission, enabled to electrically control a speed ratio, and increased power transmitting efficiency provided by a gear-type transmitting device in which drive power is mechanically transmitted. With the transmission mechanism 10, switching control means 50 allows a differential portion 11 to be maintained in the continuously variable shifting state or the differential portion 11 is preferentially placed in the continuously variable shifting state during a start-up of an engine. This allows an engine speed $N_E$ to rapidly increase beyond a given engine speed $N_E'$ to immediately transit a given engine speed area $N_{ER}$, thereby suppressing the occurrence of vibrational noise of the vehicle during the start-up of the engine.

22 Claims, 17 Drawing Sheets

U.S. PATENT DOCUMENTS

2009/0088290 A1 * 4/2009 Tabata et al. .................. 477/5

FOREIGN PATENT DOCUMENTS

| JP | 9-32707 | 2/1997 |
| --- | --- | --- |
| JP | 9-170533 | 6/1997 |
| JP | 11-82088 | 3/1999 |
| JP | 2000-6676 | 1/2000 |
| JP | 2000-209706 | 7/2000 |
| JP | 2000-316205 | 11/2000 |
| JP | 2003-127679 | 5/2003 |
| JP | 2003-161181 | 6/2003 |
| JP | 2004-42834 | 2/2004 |
| JP | 2004-76592 | 3/2004 |
| JP | 2005-48596 | 2/2005 |

* cited by examiner

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | | ○ | 3.209 | |
| N | ○ | | | | | | | | |

○ ENGAGED
◎ ENGAGED IN STEP-VARIABLE, RELEASED IN CONTINUOUSLY-VARIABLE (a)

(b)

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | TOTAL 3.977 |
| R |  |  | ○ |  |  | ○ | 2.393 |  |
| N |  | ○ |  |  |  |  |  |  |

○ ENGAGED
◎ ENGAGED IN STEP-VARIABLE,
   RELEASED IN CONTINUOUSLY-VARIABLE

CONTROL DEVICE FOR VEHICLE DRIVE DEVICE

TECHNICAL FIELD

The present invention relates to a control apparatus for a drive apparatus for vehicle, and more particularly, to technologies of making, in the drive apparatus including a differential mechanism executing a differential action and an electric motor, the differential action and the electric motor small-size.

BACKGROUND ART

There has heretofore been known a drive apparatus of a vehicle including a differential mechanism through which an output of a drive power source, such as an engine or the like, is distributed to a first electric motor and an output member, and a second electric motor disposed between the output member and drive wheels. Such drive apparatus for a hybrid vehicle is disclosed for example in JP 2003-127679A, JP 9-170533A, JP 2000-316205A and JP 2003-161181A. It includes a differential mechanism being comprised of a planetary gear unit i.e., gear set and performing as the differential action for mechanically transmitting a major part of power outputted from the engine to drive wheels. A remaining part of power from the engine is electrically transmitted from the first electric motor to the second electric motor using an electrical path. Thus, the drive apparatus operates a transmission of which shifting ratio i.e., speed ratio is electrically changed, for example as an electrically controlled continuously variable automatic transmission. The drive apparatus is controlled by the control apparatus so that the vehicle runs i.e., is driven with the optimum operation state of the engine, thus improving fuel consumption, i.e., mileage.

In general, the continuously-variable transmission has heretofore been known as a device for improving fuel consumption of a vehicle. A gear type power transmitting device such as a step-variable automatic transmission has heretofore been known as a device having high transmitting efficiency. However, no power transmitting mechanism having such combined advantages has been put into practical use yet. For instance, the hybrid vehicle drive apparatus, disclosed in the above Patent Publications, includes the electrical path through which electric energy is transmitted from the first electric motor to the second electric motor, that is, a transmitting path through which a part of the vehicle drive force is transmitted in the form of electric energy. This inevitably causes the first electric motor to be made large-size with an increase in an output of the engine. Also, the second electric motor, driven with electric energy output from the first electric motor, is caused to increase in size. Thus, an issue arises with the occurrence of an increase in size of the drive apparatus.

In addition, there was a problem that the second electric motor driven by electric energy outputted from the first electric motor need to be made large-size, which in turn makes the drive apparatus large-size. Alternately, the part of the engine output is transmitted to the driving wheel after converted to the electric energy once, which may worsen the mileage depending on the vehicle running condition such as the high speed running i.e., driving. Similar problem may occur when the above power distributing mechanism is used as the continuously variable machine called as the electrically controlled CVT in which the shifting ratio is electrically changed.

Meanwhile, with the hybrid vehicle disclosed in JP 2003-127679A, the first electric motor is turned on to increase the output rotating speed, that is, the first electric motor is rendered operative to function as a starter, thereby drivably rotating (cranking up) the engine. With the engine speed raised at a level higher than a given engine speed, that is, for instance, a level higher than the engine speed at which the engine autonomously rotates, fuel is injected to the engine for ignition, thereby starting up the engine.

Further, in general, the vehicle encounters vibration and noise in various patterns. For instance, fluctuation occurs in the rotating speed of the engine due to variation in engine torque accompanied by cyclic ignitions (explosions) in an engine cylinder and reciprocating motion of a piston. This results in a forcing source (such as a vibrating source and vibration forcing power). Vibrations are transferred to a vehicle vibrating system such as an engine suspension system, structured with a power plant in which the engine and the transmission (or the transaxle) are coupled to each other, an exhaust system and a vehicle body system or the like. This vibration is amplified due to a resonating phenomenon of the vibrating system of the vehicle, which results in the occurrence of vibrations and confined sounds in various parts of the vehicle.

It has heretofore been well known that such a resonating phenomenon occurs in a given engine speed range that acts as a resonating region. The engine speed lies at, for instance, the given engine speed range less than an idling speed, and a probability exists for the resonating region to occur when the engine speed transits the given engine speed range on a stage in which the engine speed is raised during the start-up of the engine.

With the hybrid vehicle disclosed in JP 2003-127679A, the rotating speed of the first electric motor is increased during the start-up of the engine. It is conceived that if the engine speed is caused to rapidly increase to a level higher than the given engine speed, the engine speed can rapidly transit the resonating region in the engine speed range less than the idling speed whereby vibration and noise are suppressed during the start-up of the engine.

Thus, with such a drive apparatus for vehicle enabled to address the issue of the drive apparatus for the hybrid vehicle, it is desired to similarly suppress the vehicle from encountering the occurrence of vibration and noise during the start-up of the engine.

In an alternative, further, during the halt i.e., stop of the engine, a probability exists where during a halt of the engine, the engine speed falls in the given engine speed range on a stage where the engine speed is caused to decrease to a zero, that is, a rotational halt of the engine. Therefore, with the drive apparatus for vehicle enabled to address the issue of the drive apparatus for the hybrid vehicle, it is desired for the drive apparatus for vehicle to similarly suppress the occurrence of vibration and noise during the halt of the engine.

The present invention has been completed on the background with the above problem in mind and has an object to provide a control apparatus for a drive apparatus of vehicle, including a differential mechanism, operative to perform a differential action to distribute an engine output to a first electric motor and an output shaft, and an electric motor provided in a power transmitting path from the differential mechanism to drive wheels, which can minimize the drive apparatus in size or improves fuel economy while suppressing the occurrence of vibration and/or noise of a vehicle during a start-up or a halt of the engine.

DISCLOSURE OF THE INVENTION

The invention recited in the claim 1 is featured by a control apparatus for drive apparatus for vehicle, (a) the drive apparatus having (i) an engine; and (ii) a continuously variable transmission portion including a differential mechanism through which an engine output is distributed to a first electric motor and a transmitting member, and a second electric motor disposed in a power transmitting path between the transmitting member and drive wheels, and being operative to act as an electrically controlled continuously variable transmission, (b) the control apparatus comprising: (iii) a differential state switch device incorporated in the differential mechanism and selectively switched to an uncoupling state under which the continuously variable transmission portion is placed in a continuously variable shifting state rendered operative to perform an electrically controlled continuously variable shifting operation, and a coupling state under which the continuously variable transmission portion is placed in a step-variable shifting state rendered inoperative to perform the electrically controlled continuously variable shifting operation; and (iv) on-engine-start switching control means operative to place the continuously variable transmission portion in the continuously variable shifting state upon a start-up of the engine.

With such a structure, the differential state switching device is operative to selectively switch the continuously variable transmission portion of the drive apparatus for vehicle in the continuously variable shifting state, enabling an electrically controlled continuously variable shifting action to be performed, and the step-variable shifting state for the electrically controlled continuously variable shifting action to be disenabled. Thus, the drive apparatus can have both advantages including improved fuel consumption achieved by the transmission, enabled to electrically control a speed ratio, and increased power transmitting efficiency provided by the gear-type transmitting device in which drive power is mechanically transmitted.

For instance, in a normal output region of the engine where the vehicle runs at a low/medium speed and low/medium output, placing the continuously variable transmission portion in the continuously variable shifting state ensures the vehicle to have fuel economy performance. During the running of the vehicle at the high speed, if the continuously variable transmission is placed in the step-variable shifting state, the engine output is mainly transmitted through a mechanical transmitting path to the drive wheels. This suppresses a loss in conversion efficiency between drive power and electric energy occurring when the continuously variable transmission portion is rendered operative to electrically shift the speed ratio, resulting in improved fuel consumption.

Further, for instance, as the continuously variable transmission portion is placed in a non-continuously variable shifting state in the high output region of the engine, the transmission is rendered operative to electrically shift the speed ratio in regions where the vehicle runs at the low/medium speed and low/medium output. This minimizes a maximal value of electric energy to be generated by the electric motor, that is, a maximal value of electric energy to be transmitted through the electric motor. This results in a further miniaturization of the electric motor or the vehicle drive apparatus including the electric motor.

Furthermore, with the drive apparatus including the continuously variable transmission portion structured to be switched to the continuously variable shifting state and the non-continuously variable shifting state, the on-engine-start switching control means places the continuously variable transmission portion in the continuously variable shifting state during the start-up of the engine. This enables the engine speed to rapidly increase to a level higher than the given engine speed, that is, for instance, a level higher than the given engine speed at which the engine can autonomously rotate. This phase differs from the non-continuously variable shifting state of the continuously variable transmission portion in which the engine speed is restricted with the vehicle speed. This allows the engine speed to rapidly transit the given engine speed range at a level less than the idling engine speed that is well known as a resonating region for the resonating phenomenon to occur, while suppressing the occurrence of vibration and/or noise of the vehicle during the start-up of the engine.

Preferably, the invention recited in claim 2 is further featured by engine start control means operative to increase an engine rotation speed to a level higher than a given engine rotation speed using the first electric motor for thereby starting up the engine. With such a structure, an actual engine speed is caused to rapidly transit the given engine speed range upon or during the start-up of the engine.

Preferably, the invention recited in claim 3 is featured by the on-engine-start switching control means operative to place the continuously variable transmission portion in the continuously variable shifting state when the vehicle encounters vibration and/or noise at a level exceeding a given value during the start-up of the engine. With such a structure, the engine speed can rapidly transit the given engine speed range under which a resonating phenomenon occur with the vehicle encountering vibration and/or noise at the level exceeding the given value during the start-up of the engine. This enables the suppression of the occurrence of vibration and/or noise of the vehicle upon or during the start-up of the engine.

Preferably, the on-engine-start switching control means recited in claim 4, is operative to place the shifting state of the continuously variable transmission portion in the continuously variable shifting state when the power transmitting path from the engine to the drive wheels is placed in a power transmissive state. With such a structure, the engine speed can rapidly transit the given engine speed range, thereby suppressing the occurrence of vibration and/or noise of the vehicle upon or during the start-up of the engine. This phase differs from a case in which the continuously variable transmission is placed in the continuously variable shifting state when the power transmitting path is placed in the power transmissive state to cause the engine speed to be restricted with the vehicle speed.

Preferably, the on-engine-start switching control means recited in claim 5, places the continuously variable transmission portion in the continuously variable shifting state until the start-up of the engine is completed. With such a structure, the engine speed can rapidly transit the given engine speed range, thereby suppressing the occurrence of vibration and/or noise of the vehicle during the start-up of the engine.

Preferably, the on-engine-start switching control means recited in claim 6, is operative to place shifting state of the continuously variable transmission portion in the continuously variable shifting state for a given start-up time interval required for the engine to start-up after the start-up of the engine is commenced. With such a structure, the engine speed can rapidly transit the given engine speed range, thereby suppressing the occurrence of vibration and/or noise of the vehicle during the start-up of the engine.

Preferably, the invention recited in the claim 7 is featured by a control apparatus for drive apparatus for vehicle, (a) the drive apparatus having (i) an engine; and (ii) a differential portion including a differential mechanism for distributing an engine output to a first electric motor and a transmitting member and a second electric motor provided in a power transmitting path between the transmitting member and drive wheels, (b) the control apparatus comprising: (i) a differential state switch device incorporated in the differential mechanism and selectively switched to an uncoupling state in which the shifting mechanism performs a differential action, and a coupling state in which the differential action is disenabled; and (ii) on-engine-start switching control means operative to place the differential mechanism in the uncoupling state upon or during the start-up of the engine.

With such a structure, the differential state switching device allows the differential mechanism to be selectively placed in an uncoupling state, in which the shifting mechanism performs a differential action, and a coupling state in which the differential action is disenabled. Thus, the drive apparatus can have both advantages including improved fuel consumption achieved by the transmission, enabled to electrically control a speed ratio, and increased power transmitting efficiency provided by the gear-type transmitting device enabled to mechanically transmit drive power.

For instance, in a normal output region of the engine where the vehicle runs at a low/medium speed and low/medium output, placing the differential mechanism in the uncoupling state ensures the vehicle to have fuel economy performance. During the vehicle running of the vehicle at the high speed, if the differential mechanism is placed in the coupling state, the engine output is mainly transmitted through a mechanical transmitting path to the drive wheels. This suppresses a loss in conversion between drive power and electric energy occurring when the transmission is rendered operative to electrically shift the speed ratio, resulting in an improved fuel consumption.

Further, for instance, as the differential mechanism is placed in the coupling state in the high output region of the engine, the transmission is rendered operative to electrically shift the speed ratio in regions where the vehicle runs at the low/medium speed and low/medium output. This minimizes a maximal value of electric energy to be generated by the electric motor, that is, a maximal value of electric energy to be transmitted through the electric motor. This results in a further miniaturization of the electric motor or the vehicle drive apparatus including the electric motor.

With the drive apparatus including the differential mechanism with a structure available to be switched to the uncoupling state and the coupling state, the on-engine-start switching control means places the differential mechanism in the uncoupling state during the start-up of the engine. With such a structure, the engine speed is rapidly raised to the given engine speed, that is, the engine speed at which the engine is able to autonomously rotate. Thus, the engine speed can rapidly transit the given engine speed range at the level less than the idling engine speed that is well known as the resonating region for the resonating phenomenon to occur, while suppressing the occurrence of vibration and/or noise of the vehicle during the start-up of the engine. This differs from the coupling state of the differential mechanism in which the engine speed is restricted with the vehicle speed.

The invention recited in claim 8 is further featured by engine start control means operative to increase the engine speed to a level higher than a given engine speed using the first electric motor. With such a structure, an actual engine speed is caused to rapidly transit the given engine speed range during the start-up of the engine.

Preferably, the on-engine-start switching control means recited in claim 9 is operative to place the differential mechanism in the uncoupling state, when the vehicle encounters vibration and/or noise at a level exceeding a given value upon or during the start-up of the engine. With such a structure, the engine speed can rapidly transit the given engine speed range in which the resonating phenomenon occurs with the vehicle encountering vibration and/or noise at the level exceeding the given value during the start-up of the engine. This suppresses the occurrence of vibration and/or noise of the vehicle during the start-up of the engine.

Preferably, the on-engine-start switching control means recited in claim 10 is operative to place the differential mechanism in the uncoupling state, when the power transmitting path from the engine to the drive wheels is placed in a power transmissive state. With such a structure, the engine speed can rapidly transit the given engine speed range, thereby suppressing the occurrence of vibration and/or noise of the vehicle during the start-up of the engine. This differs from a case wherein the differential mechanism is placed in the coupling state to cause the engine speed to be restricted with the vehicle speed when the power transmitting path is placed in the power transmissive state.

Preferably, the on-engine-start switching control means recited in claim 11, is operative to place the differential mechanism in the uncoupling state until the start-up of the engine is completed. With such a structure, the engine speed can rapidly transit the given engine speed range during the start-up of the engine, thereby suppressing the occurrence of vibration and/or noise of the vehicle during the start-up of the engine.

Preferably, the on-engine-start switching control means recited in claim 12, is operative to place the differential mechanism in the uncoupling state for a given start-up time interval required for the engine to start-up after the start-up of the engine is initiated. With such a structure, the engine speed can rapidly transit the given engine speed range during the start-up of the engine, thereby suppressing the occurrence of vibration and/or noise of the vehicle during the start-up of the engine.

The invention recited in the claim 13 is featured by a control apparatus for drive apparatus for vehicle, (a) the drive apparatus having (i) an engine; (ii) and a continuously variable transmission portion including a differential mechanism through which an engine output is distributed to a first electric motor and a transmitting member and a second electric motor provided in a power transmitting path between the transmitting member and drive wheels, and being operative to act as an electrically controlled continuously variable transmission, (b) the control apparatus comprising: (iii) a differential state switch device incorporated in the differential mechanism and selectively switched to an uncoupling state under which the continuously variable transmission portion is placed in a continuously variable shifting state rendered operative to perform an electrically controlled continuously variable shifting operation, and a coupling state under which the continuously variable transmission portion is placed in a step-variable shifting state rendered inoperative to perform the electrically controlled continuously variable shifting operation; and (iv) on-engine-stop switching control means operative to place the continuously variable transmission portion in the continuously variable shifting state upon or during the halt of the engine.

With such a structure, the differential state switching device allows the continuously variable transmission portion inside the vehicle drive apparatus to be selectively placed in the continuously variable shifting state, enabling an electrically controlled continuously variable shifting action to be performed, and the non-continuously-variable shifting state in which the electrically controlled continuously variable shifting action is disenabled. Thus, the drive apparatus can have both advantages including improved fuel consumption achieved by the transmission enabled to electrically control a speed ratio, and increased power transmitting efficiency provided by the gear-type transmitting device enabled to mechanically transmit drive power.

For instance, in a normal output region of the engine where the vehicle runs at a low/medium speed and low/medium output, placing the continuously variable transmission portion in the continuously variable shifting state ensures the vehicle to have fuel economy performance. During the vehicle running of the vehicle at the high speed, if the continuously variable transmission portion is placed in the step-variable shifting state, the engine output is mainly transmitted through a mechanical transmitting path to the drive wheels. This suppresses a loss in conversion between drive power and electric energy occurring when the transmission is rendered operative to electrically shift the speed ratio, resulting in an improved fuel consumption.

Further, for instance, as the continuously variable transmission portion is placed in the non-continuously-variable shifting state in the high output region of the engine, the transmission is rendered operative to electrically shift the speed ratio in regions where the vehicle runs at the low/medium speed and low/medium output. This minimizes a maximal value of electric energy to be generated by the electric motor, that is, a maximal value of electric energy to be transmitted through the electric motor. This results in a further miniaturization of the electric motor or the vehicle drive apparatus including the electric motor.

With the drive apparatus including the continuously variable transmission portion operative to be switched to the continuously variable shifting state and the non-continuously-variable shifting sate, the on-engine-stop switching control means places the continuously variable transmission portion in the continuously variable shifting state during the halt of the engine. With such a structure, the engine speed can be rapidly lowered to a level less than the given engine speed range to immediately transit the given engine speed range in a level less than the engine speed well known as a resonating region where, for instance, the resonating phenomenon occurs. This suppresses the occurrence of vibration and/or noise of the vehicle during the start-up of the engine. This differs from the non-continuously-variable shifting sate of the continuously variable transmission portion wherein the engine speed is restricted with the vehicle speed.

Preferably, the invention recited in the claim 14 is further featured by engine stop control means that is operative to decrease an engine rotation speed to a level less than a given engine rotation speed using the first electric motor for halting the engine. With such a structure, an actual engine speed can rapidly transit the given engine speed range during the halt of the engine.

When the vehicle encounters vibration and/or noise at a level exceeding a given value during the halt of the engine, further, the on-engine-stop switching control means allows the shifting state of the continuously variable transmission portion to be placed in the continuously variable shifting state. With such a structure, the engine speed can rapidly transit the given engine speed range in which the resonating phenomenon occurs with the vehicle encountering vibration and/or noise at the level exceeding the given value during the halt of the engine. This suppresses the occurrence of vibration and/or noise of the vehicle during the halt of the engine.

Preferably, the invention recited in claim 15 is featured by the on-engine-stop switching control means is operative to place the shifting state of the continuously variable transmission portion in the continuously variable shifting state when the power transmitting path from the engine to the drive wheels is placed in the power transmissive state. With such a structure, the engine speed can rapidly transit the given engine speed range, thereby suppressing the occurrence of vibration and/or noise of the vehicle during the halt of the engine. This differs from a case in which when the power transmitting path is placed in the power transmissive state, the variable shifting state of the continuously variable transmission portion is placed in the non-continuously-variable shifting sate and the engine speed is restricted with the vehicle speed.

Preferably, the invention recited in claim 16 is featured by the on-engine-stop switching control means is operative to place the shifting state of the continuously variable transmission portion in the continuously variable shifting state until the halt of the engine is completed. With such a structure, the engine speed can rapidly transit the given engine speed range during the halt of the engine, thereby suppressing the occurrence of vibration and/or noise of the vehicle during the halt of the engine.

Preferably, the invention recited in claim 17 is featured by the on-engine-stop switching control means is operative to place the shifting state of the continuously variable transmission portion in the continuously variable shifting state for a given halt time period required for the engine to be halted after the halt of the engine is commenced. With such a structure, the engine speed can rapidly transit the given engine speed range during the halt of the engine, thereby suppressing the occurrence of vibration and/or noise of the vehicle during the halt of the engine.

The invention recited in the claim 18 is featured by a control apparatus for drive apparatus for vehicle, (a) the drive apparatus having (i) an engine; and (ii) a differential portion including a differential mechanism for distributing an engine output to a first electric motor and a transmitting member and a second electric motor provided in a power transmitting path between the transmitting member and drive wheels, (b) the control apparatus comprising: (iii) a differential state switching device incorporated in the differential mechanism and selectively switched to an uncoupling state for the differential mechanism to perform a differential action and a coupling state for the differential mechanism not to perform the differential action; and (iv) on-engine-stop switching control means operative to place the differential portion in the uncoupling state during the halt of the engine.

With such a structure, the differential state switching device allows the differential mechanism to be selectively placed in the uncoupling state enabling an electrically controlled continuously variable shifting action to be performed, and the non-continuously-variable shifting state in which the electrically controlled continuously variable shifting action is disenabled. Thus, the drive apparatus can have both advantages including improved fuel consumption achieved by the transmission enabled to electrically control a speed ratio, and increased power transmitting efficiency provided by the gear-type transmitting device enabled to mechanically transmit drive power.

For instance, in a normal output region of the engine where the vehicle runs at a low/medium speed and low/medium output, placing the differential mechanism in the uncoupling state ensures the vehicle to have fuel economy performance. During the vehicle running of the vehicle at the high speed, if the differential mechanism is placed in the non-continuouslyvariable shifting state, the engine output is mainly transmitted through a mechanical transmitting path to the drive wheels. This suppresses a loss in conversion between drive power and electric energy occurring when the transmission is rendered operative to electrically shift the speed ratio, resulting in an improved fuel consumption.

Further, for instance, as the differential mechanism is placed in the step-variable shifting state in the high output region of the engine, the transmission is rendered operative to electrically shift the speed ratio in regions where the vehicle runs at the low/medium speed and low/medium output. This minimizes a maximal value of electric energy to be generated by the electric motor, that is, a maximal value of electric energy to be transmitted through the electric motor. This results in a further miniaturization of the electric motor or the vehicle drive apparatus including the electric motor.

With the drive apparatus having a differential mechanism operative to be switched to the uncoupling state and the coupling state, the on-engine-stop switching control means places the differential mechanism in the uncoupling state during the halt of the engine. With such a structure, the engine speed can be rapidly lowered to a level less than the given engine speed, so that the engine speed can be rapidly lowered to a level less than the given engine speed range. This allows the engine speed to immediately transit the given engine speed range in the level less than the engine speed well known as the resonating region where, for instance, the resonating phenomenon occurs. This suppresses the occurrence of vibration and/or noise of the vehicle during the halt of the engine. This differs from the coupling sate of the differential mechanism where the engine speed is restricted with the vehicle speed.

Preferably, the invention recited in claim 19 is further featured by engine stop control means operative to decrease the engine rotation speed to a level lower than a given engine rotation speed using the first electric motor for halting the engine. With such a structure, an actual engine speed can rapidly transit the given engine speed range during the halt of the engine.

Further, the on-engine-stop switching control means allows the differential mechanism to be placed in the uncoupling state when the vehicle encounters vibration and/or noise at a level exceeding a given value during the halt of the engine. With such a structure, the engine speed can rapidly transit the given engine speed range in which a resonating phenomenon occurs with the vehicle encountering vibration and/or noise at a level exceeding the given value during the halt of the engine. This suppresses the occurrence of vibration and/or noise of the vehicle during the halt of the engine.

Preferably, on-engine-stop switching control means in the invention recited in claim 20 is operative to place the differential mechanism in the uncoupling state, when the power transmitting path from the engine to the drive wheels is placed in a power transmissive state. With such a structure, the engine speed can rapidly transit the given engine speed range, thereby suppressing the occurrence of vibration and/or noise of the vehicle during the halt of the engine. This phase differs from a case wherein the differential mechanism is placed in the coupling state to cause the engine speed to be restricted with the vehicle speed when the power transmitting path is placed in the power transmissive state.

Preferably, on-engine-stop switching control means in the invention recited in claim 21 is operative to place the differential mechanism in the uncoupling state, until the halt of the engine is completed. With such a structure, the engine speed can rapidly transit the given engine speed range during the halt of the engine, thereby suppressing the occurrence of vibration and/or noise of the vehicle during the halt of the engine.

Preferably, on-engine-stop switching control means in the invention recited in claim 22 is operative to place the differential mechanism in the uncoupling state for a given halt time interval required for the engine to be halted after the halt of the engine is commenced. With such a structure, the engine speed can rapidly transit the given engine speed range during the halt of the engine, thereby suppressing the occurrence of vibration and/or noise of the vehicle during the halt of the engine.

Preferably, the differential state switching device causes the continuously-variable transmission portion i.e., shifting portion to be placed in the uncoupling state i.e., the differential state enabling the differential action to be performed, causing the continuously variable transmission to be placed in the continuously variable shifting state. In contrast, the continuously-variable transmission portion is placed in the coupling condition i.e., the locked state disabling the differential action, causing the differential mechanism to be placed in the non-continuously shifting state, for example in the step-variable shifting state. Thus, the continuously variable transmission portion can be placed in either the continuously variable shifting state or the non-continuously-variable shifting state.

Preferably, the differential mechanism includes a first element connected to the engine, a second element connected to the first electric motor, and a third element connected to the transmitting member. The differential state switching means operates in one mode to allow the first to third elements to rotate relative to each other for the differential mechanism to be placed in unconnected state i.e., the differential state, and the other mode to allow the first to third elements to rotate in a unitary fashion or to cause the second element to be brought into a non-rotating state for the differential mechanism to be placed in the connected state i.e., the locked state. Such arrangement provides a structure for the differential mechanism to be placed in either the differential state or the locked state.

Preferably, the differential state switching device includes a clutch, operative to couple at least two of the first to third elements to each other for unitary rotation of these elements, and/or a brake operative to couple the second element to the non-rotating member to lock the second element in the non-rotating state. This allows the differential mechanism to have a structure that can be simply placed in either the differential state or the locked state.

Preferably, releasing or uncoupling the clutch and the brake allows the first to third rotary elements of the differential mechanism to rotate relative to each other, which causes the differential mechanism to be placed in the differential state and act as an electrically controlled differential device. Engaging or coupling the clutch allows the differential mechanism to act as the transmission providing the speed ratio of "1". Alternatively, coupling the brake allows the differential mechanism to act as the speed-increasing transmission providing the speed ratio less than "1". This allows the differential mechanism to have a structure to be placed in either the differential state or the locked state while having the structure of the transmission that has a fixed speed ratio in a single gear position or a multiple-gear position.

Preferably, the differential mechanism is composing of a planetary gear device. The first element acts as a carrier, the second element acts as a sun gear, and the third element acts as a ring gear, respectively of the planetary gear device. This allows the differential mechanism to have a minimized axial dimension. In addition, the differential mechanism can be formed in a simplified structure with use of the single planetary gear device.

Preferably, the planetary gear device is one of the single-pinion type. With such a structure, the differential mechanism is short in the axial length and can be simply constructed by the single-pinion type planetary gear device.

Preferably, the vehicle condition may encounters a failure or defective function in control equipment of an electric system such as an electric motor or the like for the differential mechanism to operate as an electrically controlled continuously variable transmission. In such a case, the switching control means places the differential mechanism in the locked state. With such arrangement, even under a situation where the differential mechanism normally remains in the differential state, can perform priority operation to be placed in the step-variable shifting state. Therefore, even in the presence of the locked state, the vehicle can run at the substantially the same running condition as that achieved in the differential state.

More preferably, the differential mechanism further includes a shifting part i.e., transmission part, forming a part of the power transmitting path, which establishes a total speed ratio of the drive apparatus for vehicle based on a speed ratio of the shifting part and a speed ratio of the continuously variable transmission portion. With such a structure, utilizing the speed ratio of the shifting part enables drive power to be obtained in a wide range. This results in a further increase in efficiency of the continuously variable transmission portion to perform electrically controlled continuously variable shifting control.

More preferably, the differential mechanism further includes the shifting part forming a part of the power transmitting path to achieve a total speed ratio of the drive apparatus for vehicle based on a speed ratio of the transmission part and a speed ratio of the differential portion. With such a structure, utilizing the speed ratio of the shifting part enables drive power to be obtained in a wide range.

More preferably, the transmission part is a step-variable automatic transmission. With such a structure, in the continuously variable shifting state of the continuously variable transmission portion, the continuously variable power transmission can be structured by the continuously variable transmission portion and the shifting part. In the non-continuously variable shifting state of the continuously variable transmission portion, the step-variable power transmission can be structured by the continuously variable transmission portion and the transmission part.

More preferably, the transmission part is the step-variable automatic power transmission. With such a structure, in the differential state of the differential mechanism, the continuously-variable power transmission can be structured by the differential mechanism and the shifting part. In the locked state of the differential mechanism, the step-variable power transmission can be structured by the differential mechanism and the shifting part.

EXPLANATION OF REFERENCES

8: engine
10, 70: transmission mechanism (drive apparatus)
11: differential portion (continuously variable transmission portion)
16: power distributing mechanism (differential mechanism)
18: transmitting member
38: drive wheel
40: electronic control device
50: switching control means (on-engine-start switch control means, on-engine-stop switch control means)
80: engine start stop control means (engine start control means, engine stop control means)
C0: switching clutch (differential state control device)
B0: switching brake (differential state control device)
M1: first electric motor
M2: second electric motor

BEST MODE FOR CARRYING OUT THE INVENTION

Hereinafter, embodiments of the present invention will be explained with reference to attaching drawings.

Embodiment 1

Figures 1, 2:
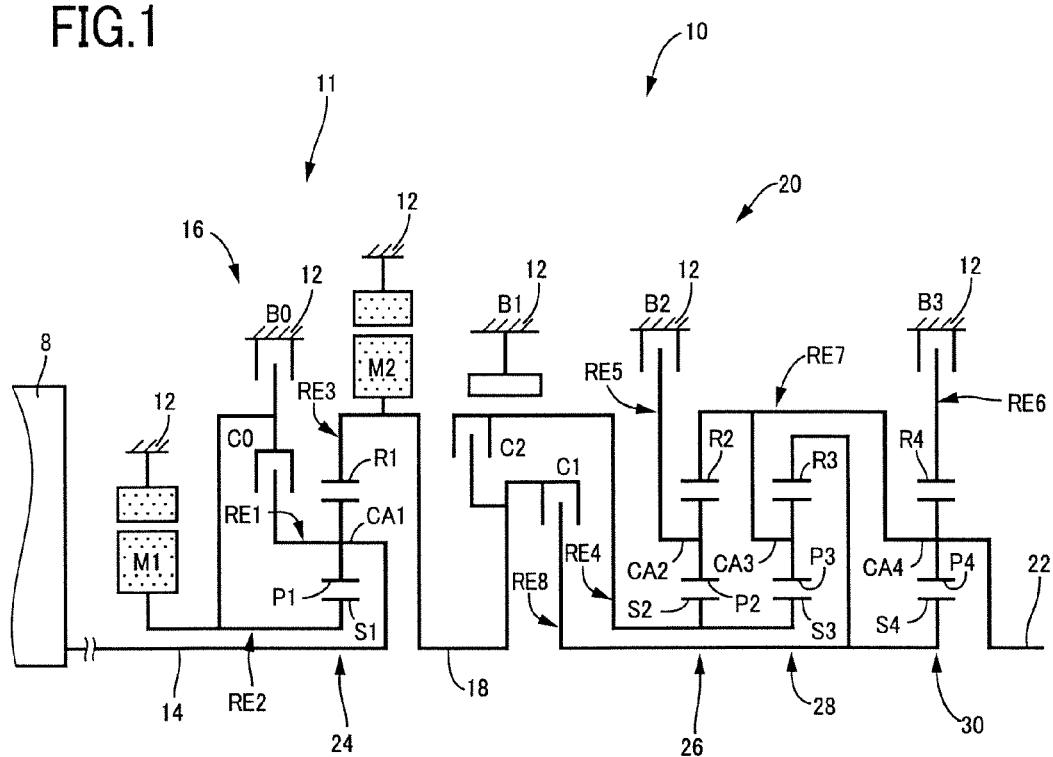
FIG. 1 is a skeleton view explaining a structure of a drive apparatus for hybrid vehicle of one embodiment according to the present invention.
FIG. 2 is an operation Table indicating a relation between a shifting operation of the drive apparatus of the hybrid vehicle of the embodiment shown in FIG. 1 operable in a continuously variable shifting state or a step-variable shifting state, and operation combinations of hydraulic-type frictionally coupling devices used therefor.

FIG. 1 is a skeleton view explaining a shifting mechanism i.e., transmission mechanism 10 constructing a part of a drive apparatus of a hybrid vehicle according to one embodiment of the present invention. The transmission mechanism i.e., transmission mechanism 10 includes an input shaft 14, a differential portion 11, an automatic transmission portion 20, and an output shaft 22 all coaxially disposed in a transmission case 12 (hereinafter briefly referred to as "case 12") as a non-rotatable member fixed to a vehicle body. The input shaft 14 as an input rotation member is fixed to the case 12. The differential portion 11 functioning as the continuously variable shifting portion is connected to the input shaft 14 directly or indirectly via a pulsation absorbing damper (vibration damping device) not shown. The automatic transmission portion 20 as the transmission portion i.e., shifting portion functioning as a step-variable type transmission is disposed between the differential mechanism 11 and the output shaft 22 to be connected thereto in series. The output shaft 22 as an output rotation member is connected to the automatic transmission portion 20.

This transmission mechanism 10 of this embodiment is suitably used for a transverse FR vehicle (front-engine, rear-drive vehicle), and is disposed between a drive power source in the form of an engine 8 such as a gasoline engine or a diesel engine, and a pair of drive wheels 38 (FIG. 5), to transmit a vehicle drive force to the pair of drive wheels 38 through a differential gear device 36 (final speed reduction gear) and a pair of drive axles.

In the transmission mechanism 10 of this embodiment, the engine 8 and the differential portion 11 is directly connected. Here, the direct connection includes, in addition to a connection without using any fluid-type transmitting device such as a torque converter or fluid coupling, a connection with using vibration damping device. Noted that a lower half of the transmission mechanism 10 constructed symmetrically with respect to its axis, is omitted in FIG. 1. This is true for other embodiments to be explained hereinafter.

The differential portion 11 includes a first electric motor M1, a power distributing mechanism 16 and a second electric motor M2. The power distributing mechanism 16 is a mechanism distributing an output of the engine 8 inputted to the input shaft 14 to the first electric motor M1 and the transmitting member 18, as the differential mechanism. The second electric motor M2 is rotatable integral with the transmitting member 18. The second electric motor M2 may be disposed at any portion of a power transmitting path extending between the transmitting member 18 and the drive wheel 38. In the present embodiment, each of the first electric motor M1 and the second electric motor M2 is a so-called motor/generator also functioning as an electric generator. The first electric motor M1 should function at least as an electric generator to generate an electric energy with generating a reaction force, and the second electric motor M2 should function at least as an electric motor to generate a drive force of the vehicle.

The power distributing mechanism 16 includes a first planetary gear unit 24 functioning as a differential device, a switching clutch C0 and a switching brake B1. The first planetary gear unit 24 of single pinion type has a gear ratio $\rho 1$ of about 0.418, for example. It has, as rotary elements, a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Representing the numbers of teeth of the first sun gear S1 and the first ring gear R1 by ZS1 and ZR1, respectively, the above gear ratio $\rho 1$ is represented by ZS1/ZR1.

In the power distributing mechanism 16, the first carrier CA1 is connected to the drive apparatus input shaft 14, i.e., to the engine 8, the first sun gear S1 is connected to the first electric motor M1, and the first ring gear R1 is connected to the transmitting member 18. The switching brake B0 is disposed between the first sun gear S1 and the casing 12, and the switching clutch C0 is disposed between the first sun gear S1 and the first carrier CA1. Upon release of both the switching clutch C0 and switching brake B0, the power distributing mechanism 16 is placed in the differential state where the first sun gear S1, first carrier CA1 and first ring gear R1 of the first planetary gear unit 24 are placed in a differential state to be rotatable relative to each other to perform a differential function.

Thus, the output of the engine 8 is distributed to the first electric motor M1 and the transmitting member 18, and a part of the output distributed to the first electric motor M1 is used to generate and store power thereat or to drive the second electric motor M2. Accordingly, the differential portion 11 (power distributing mechanism 16) functions as the electrically controlled differential device, for example, in the continuously variable shifting state (electrically controlled CVT state), in which the rotating speed of the transmitting member 18 changes continuously, irrespective of the rotating speed of the engine 8. That is, the differential portion 11 placed in the continuously variable shifting state by the differential state of the power distributing mechanism 16 functions as the electrically controlled continuously variable transmission in which speed ratio γ0 (rotating speed of the driving device input shaft 14/rotating speed of the transmitting member 18) electrically changes from a minimum value γ0min to a maximum value γ0max.

In this state, by engagement of the switching clutch C0 or switching brake B0, the power distributing mechanism 16 is placed to the non-differential state not to perform, that is impossible to perform the differential operation. Specifically, when the first sun gear S1 and the first carrier CA1 are engaged integrally by engagement of the switching clutch C0, the rotary elements of the first planetary gear unit 24 including the first sun gear S1, first carrier CA1 and first ring gear R1 are placed in a connected state, i.e., a locked state or a non-differential state to be rotatable as a unit. With this, also the differential portion 11 is placed to the non-differential state. Thus, the rotating speeds of the engine 8 and the power transmitting member 18 coincides with each other, so that the differential portion 11 (power distributing mechanism 16) is placed in a non-continuously-variable shifting state for example a fixed shifting state, that is a step-variable shifting state functioning as the transmission having a fixed speed ratio γ0 equal to 1.

Then, when the switching brake B0 is engaged instead of the switching clutch C0 to connect the first sun gear S1 with the case 12, the power distributing mechanism 16 is placed in a locked state, connected state or non-differential state impossible to perform the differential operation with the non-rotating state of the first sun gear S1. With this, also the differential portion 11 is placed in the non-differential state. Due to the higher rotating speed of the first ring gear R1 than that of the first carrier CA1, the power distributing mechanism 16 functions as a speed-increasing mechanism. The differential portion 11 (power distributing mechanism 16) is placed in non-continuously-variable shifting state for example the fixed shifting state, i.e., the step-variable shifting state functioning as the speed-increasing mechanism of which a speed ratio γ0 is fixed in a value smaller than 1, for example, about 0.7.

In the present embodiment, the switching clutch C0 and switching brake B0 selectively place the differential portion 11 (power distributing mechanism 16) to the differential state i.e., non-locked state (uncoupled state), and in the non-differential state i.e., the locked state. In detail, in the differential state (coupled state), the differential portion 11 (power distributing mechanism 16) is operable as the electrically controlled differential device. For example, in the continuously variable shifting state, it is operable as the continuously variable transmission of which shifting ratio is continuously variable.

The switching clutch C0 and switching brake B0 also place the differential portion 11 (power distributing mechanism 16) in the shifting state not operable as the electrically controlled differential device. For example, in the locked state with the shifting ratio being locked in the fixed value, the differential portion 11 (power distributing mechanism 16) is not operable as the continuously variable transmission, with the continuously variable shifting operation being inoperative. In other words, in the locked state, the differential portion 11 (power distributing mechanism 16) operates as the single-stage or multi-stage transmission having one or not less than two shifting ratio(s), not operative as the continuously variable transmission, with the continuously variable shifting operation being inoperative. The locked state can otherwise be expressed as the fixed shifting state where the differential portion 11 (power distributing mechanism 16) operates as the single-stage or multi-stage transmission having one or not less than two shifting ratio(s).

The uncoupling state includes, in addition to the state where the switching clutch C0 and the switching brake B0 are completely released, the state where the switching clutch C0 or the switching brake B0 is half coupled or engaged (slipped state).

The automatic transmission portion 20 includes plural planetary gear units, that is a single-pinion type second planetary gear unit 26, a single-pinion type third planetary gear unit 28 and a single-pinion type fourth planetary gear unit 30. The second planetary gear unit 26 includes a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gear P2, having for example a gear ratio ρ2 of about 0.562.

The third planetary gear unit 28 includes a third sun gear S3, a third planetary gear P3, a third carrier CA3 supporting the third planetary gear P3 to be rotatable about its axis and about the axis of the third sun gear S3, and a third ring gear R3 meshing with the third sun gear S3 through the third planetary gear P3, having for example a gear ratio ρ3 of about 0.425. The fourth planetary gear unit 30 includes a fourth sun gear S4, a fourth planetary gear P4, a fourth carrier CA4 supporting the fourth planetary gear P4 to be rotatable about its axis and about the axis of the fourth sun gear S4, and the fourth ring gear R4 meshing with the fourth sun gear S4 through the fourth planetary gear P4, having a gear ratio ρ4 of about 0.421.

When representing the numbers of teeth of the second sun gear S2, second ring gear R2, third sun gear S3, third ring gear R3, fourth sun gear S4 and fourth ring gear R4 by ZS2, ZR2, ZS3, ZR3, ZS4 and ZR4 respectively, the above gear ratios ρ2, ρ3 and ρ4 are represented by ZS2/ZR2, ZS3/ZR3, and ZS4/ZR4, respectively.

In the automatic transmission portion 20, the second sun gear S2 and the third sun gear S3 integrally fixed to each other as a unit are selectively connected to the transmitting member 18 through a second clutch C2, and are selectively fixed to the casing 12 through a first brake B1. The second carrier CA2 is selectively connected to the casing 12 through the second brake B2, and the fourth ring gear R4 is selectively fixed to the transmission casing 12 through a third brake B3. The second ring gear R2, third carrier CA3 and fourth carrier CA4 integrally fixed to each other are fixed to the output shaft 22. The third ring gear R3 and the fourth sun gear S4 integrally fixed to each other are selectively connected to the transmitting member 18 through a first clutch C1.

Thus, the automatic transmission portion 20 and the transmitting member 18 are selectively connected to each other through the first clutch C1 or the second clutch C2 used for establishing the gear shift position in the automatic transmission portion 20. In other words, the first clutch C1 and the second clutch C2 function as the coupling device between the transmitting member 18 and the automatic transmission portion 20. That is, it selectively switches the power transmitting path between the differential portion 11 (transmitting member 18) and the drive wheel 38 in a power transmitting condition allowing the power transmission therethrough, and a power interrupting condition interrupting the power transmission therethrough. That is, engagement of at least one of the first clutch C1 and the second clutch C2 bring the power transmitting path into the power transmitting condition, while release of both the first clutch C1 and the second clutch C2 bring the power transmitting path into the power interrupting condition.

The switching clutch C0, the first clutch C1, the second clutch C2, the switching brake B0, the first brake B1, the second brake B2 and the third brake B3 are hydraulic-type frictionally coupling devices used in a conventional vehicular automatic transmission. The frictionally coupling device includes a wet-type multiple-disc clutch in which a plurality of friction plates superposed on each other are forced against each other by a hydraulic actuator, or a band brake in which a rotary drum and one band or two bands wound on an outer circumferential surface thereof is tightened at one end by a hydraulic actuator.

In the transmission mechanism 10 thus constructed, as shown in an operation Table of FIG. 2, one of a first-gear position (first-speed position) through a fifth-gear position (fifth-speed position), a reverse-gear position (rear-drive position) and a neural position is selectively established by engagement of the switching clutch C0, the first clutch C1, the second clutch C2, the switching brake B0, the first brake B1, the second brake B2 and the third brake B3. Those positions have respective speed ratios γ (input shaft speed $N_{IN}$/output shaft speed $N_{OUT}$) which change as geometric series.

In particular, in this embodiment, by engagement of any of the switching clutch C0 and switching brake B0 provided in the power distributing mechanism 16, the differential portion 11 can construct, in addition to the continuously variable shifting state operable as the continuously variable transmission, the fixed shifting state operable as the transmission of the fixed shifting ratio. Accordingly, in the transmission mechanism 10, the differential portion 11 placed in the fixed shifting state by engagement of any of the switching clutch C0 and switching brake B0, and the automatic transmission portion 20 construct the step variable shifting state operable as the step-variable transmission. The differential portion 11 placed in the continuously variable shifting state by non-engagement of both the switching clutch C0 and switching brake B0, and the automatic transmission portion 20 construct the continuously variable shifting state operable as the continuously variable transmission. In other words, the transmission mechanism 10 is switched to the step-variable shifting state by engagement of any of the switching clutch C0 and switching brake B0, and is switched to the continuously variable shifting state by non-engagement of both the switching clutch C0 and switching brake B0. The differential portion 11 is the transmission also switched to the step-variable shifting state and the continuously variable shifting state.

For example, when the transmission mechanism 10 functions as the step-variable transmission, for example, as shown in FIG. 2, engagement of the switching clutch C0, the first clutch C1 and the third brake B3 establish the first-gear position having the highest speed ratio γ1 of about 3.357, for example, and engagement of the switching clutch C0, the first clutch C1 and the second brake B2 establish the second-gear position having the speed ratio γ2 of about 2.180, for example, which is lower than the speed ratio γ1. Further, engagement of the switching clutch C0, first clutch C1 and first brake B1 establish the third-gear position having the speed ratio γ3 of about 1.424, for example, which is lower than the speed ratio γ2, and engagement of the switching clutch C0, first clutch C1 and second clutch C2 establish the fourth-gear position having the speed ratio γ4 of about 1.000, for example, which is lower than the speed ratio γ3.

Engagement of the first clutch C1, second clutch C2 and switching brake B0 establish the fifth-gear position having the speed ratio γ5 of about 0.705, for example, which is smaller than the speed ratio γ4. Further, engagement of the second clutch C2 and the third brake B3 establish the reverse-gear position having the speed ratio γR of about 3.209, for example, which positions between the speed ratios γ1 and γ2. The neutral position N is established by engaging only the switching clutch C0.

However, when the transmission mechanism 10 functions as the continuously variable transmission, as shown in FIG. 2, the switching clutch C0 and the switching brake B0 are both released. With this, the differential portion 11 functions as the continuously variable transmission, and the automatic transmission portion 20 connected in series thereto functions as the step-variable transmission. The rotating speed to be input to the automatic transmission portion 20 placed in one of the first-gear, second-gear, third-gear and fourth-gear positions, that is the rotating speed of the transmitting member 18 is continuously changed so that the continuous shifting ratio width can be obtained for each of the gear positions. Accordingly, since the speed ratio of the automatic transmission portion 20 is continuously variable across the adjacent gear positions, a total speed ratio γT (overall speed ratio) of the transmission mechanism 10 is continuously variable.

Figure 3:
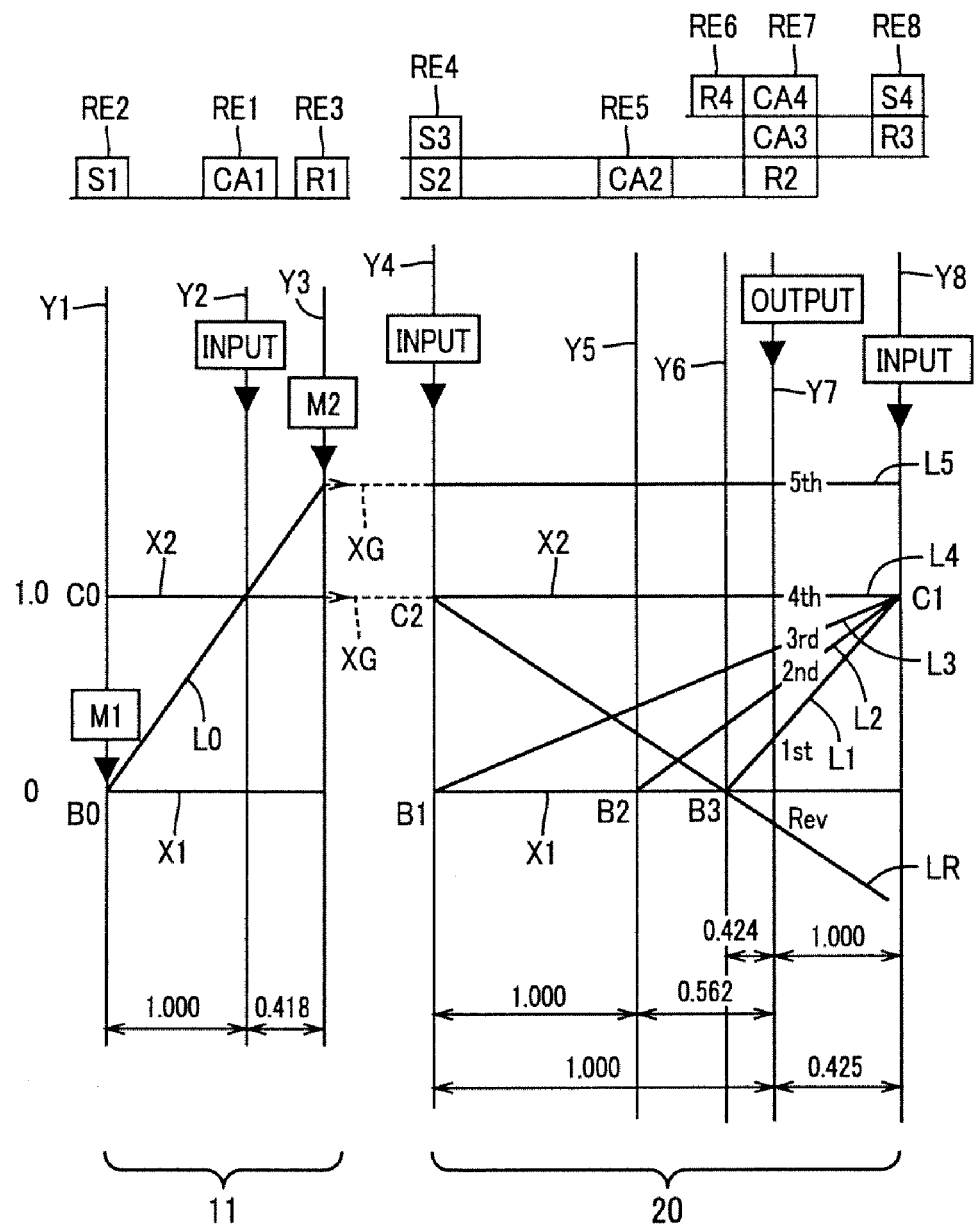
FIG. 3 is a collinear chart showing relative rotating speeds of rotary elements in each of different gear positions when the drive apparatus of the hybrid vehicle of the embodiment shown in FIG. 1 is operated in the step-variable shifting state.

FIG. 3 shows a collinear chart representing by straight lines a relation among the rotating speeds of the rotary elements different in each of the gear positions of the transmission mechanism 10. The transmission mechanism 10 is constituted by the differential portion 11 functioning as the continuously variable shifting portion or first shifting portion, and the automatic transmission portion 20 functioning as the step-variable shifting portion or second shifting portion. The collinear chart of FIG. 3 is a rectangular two-dimensional coordinate system in which the gear ratios ρ of the planetary gear units 24, 26, 28 and 30 are taken along the horizontal axis, while the relative rotating speeds of the rotary elements are taken along the vertical axis. A lower one X1 of three horizontal lines indicates the rotating speed of 0, and an upper one X2 indicates the rotating speed of 1.0, that is, an operating speed $N_E$ of the engine 8 connected to the input shaft 14. The horizontal line XG indicates the rotating speed of the transmitting member 18.

Among three vertical lines Y1, Y2 and Y3 corresponding to the three elements of the differential portion 11, respectively represent from the left the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined corresponding to the gear ratio ρ1 of the first planetary gear unit 24.

Further, five vertical lines Y4, Y5, Y6, Y7 and Y8 corresponding to the automatic transmission portion 20 respectively represent from the left the relative rotating speeds of a fourth rotary element (fourth element) RE4, a fifth rotary element (fifth element) RE5, a sixth rotary element (sixth element) RE6, a seventh rotary element (seventh element) RE7, and an eighth rotary element (eighth element) RE8. The fourth rotary element RE4 has a form of the second and third sun gears S2, S3 integrally fixed to each other, the fifth rotary element RE5 has a form of the second carrier CA2, and the sixth rotary element RE6 has a form of the fourth ring gear R4. The seventh rotary element RE7 has a form of the second ring gear R2 and third and fourth carriers CA3, CA4 integrally fixed to each other, and the eighth rotary element RE8 has a form of the third ring gear R3 and fourth sun gear S4 integrally fixed to each other. The distances between the adjacent ones of the vertical lines Y4 to Y8 are determined by the gear ratios ρ2, ρ3 and ρ4 of the second, third and fourth planetary gear units 26, 28 and 30.

In the relation between the vertical lines of the collinear chart, when the interval i.e., distance between the sun gear and the carrier is set as "1", the interval between the carrier and the ring gear is set as the interval corresponding to the gear ratio ρ of the planetary gear unit. That is, at the differential portion 11, the interval between the vertical lines Y1 and Y2 is set as the interval corresponding to "1", and the interval between the vertical lines Y2 and Y3 is set as the interval corresponding to "ρ". In the automatic transmission portion 20, for each of the second, third and fourth planetary gears 26, 28 and 30, the interval between the sun gear and carrier is set as "1", and the distances between the carrier and ring gear is set as the gear ratio ρ.

Expressing with the collinear chart of FIG. 3, the transmission mechanism 10 of this embodiment is, in the power distributing mechanism 16 (continuously variable shifting portion 11), arranged such that the first rotary element RE1 (the first carrier CA1), which is one of the three rotary elements of the first planetary gear unit 24, is fixed to the input shaft 14, and selectively connected to the second rotary element RE 2 (first sun gear S1) as another rotary element through the switching clutch C0. The second rotary element RE2 is fixed to the first electric motor M1 and selectively fixed to the casing 12 through the switching brake B0. The third rotary element RE3 (the first ring gear R1) as still another rotary element is fixed to the transmitting member 18 and the second electric motor M2. Thus, rotation of the input shaft 14 is transmitted (inputted) to the automatic transmission (step-variable transmission portion) 20 through the transmitting member 18. An inclined straight line L0 which passes an intersection point between the lines Y2 and X2 represents a relation between the rotating speeds of the first sun gear S1 and the first ring gear R1.

For example, when the transmission mechanism 10 is switched to the continuously variable shifting state (differential state) by release of the switching clutch C0 and the switching brake B0, rotation of the sun gear S1 represented by the intersection point between the straight line L0 and the vertical line Y1 increases of decreases by control of the rotation speed of the first electric motor M1. When the rotation speed of the ring gear R1 determined depending on the vehicle speed V is substantially constant, the rotation speed of the first carrier CA1 represented by the intersection point between the straight line L0 and the vertical line Y2 increases or decreases.

When the first sun gear S1 and the first carrier CA1 are connected by engagement of the switching clutch C0, the power distributing mechanism 16 is brought into the non-differential state where the above three rotary elements are integrally rotated. Thus, the straight line L0 coincides with the lateral line X2, so that the transmitting member 18 rotates in the same rotation speed as the engine rotation speed. Alternately, with rotation halt of the first sun gear S1 by engagement of the switching brake B0, the power distributing mechanism 16 is brought into the non-differential state functioning as the speed increasing mechanism. Thus, the rotation speed of the first ring gear R1, i.e., the transmitting member 18 is represented by the intersection point between the straight line L0 which is in the state shown in FIG. 3 and the vertical line Y3, being inputted to the automatic transmission portion 20 in the increased rotation speed compared with the engine rotation speed $N_E$.

In the automatic transmission portion 20, the fourth rotary element RE4 is selectively connected to the transmitting member 18 through the second clutch C2 and selectively fixed to the casing 12 through the first brake B1, the fifth rotary element RE5 is selectively fixed to the casing 12 through the second brake B2, and the sixth rotary element RE6 is selectively fixed to the casing 12 through the third brake B3. The seventh rotary element RE7 is fixed to the output shaft 22, and the eighth rotary element RE8 is selectively connected to the transmitting member 18 through the first clutch C1.

As shown in FIG. 3, in the automatic transmission portion 20, upon engagement of the first clutch C1 and the third brake B3, the rotating speed of the output shaft 22 in the first-speed position is represented by an intersection point between the inclined straight line L1 and the vertical line Y7. Here, the inclined straight line L1 passes an intersection point between the vertical line Y8 indicative of the rotating speed of the eighth rotary element RE8 and the horizontal line X2, and an intersection point between the vertical line Y6 indicative of the rotating speed of the sixth rotary element RE6 and the horizontal line X1.

Similarly, the rotating speed of the output shaft 22 in the second-speed position is represented by an intersection point between an inclined straight line L2 determined by engagement of the first clutch C1 and second brake B2, and the vertical line Y7 indicative of the rotating speed of the seventh rotary element RE7 fixed to the output shaft 22. The rotating speed of the output shaft 22 in the third-speed position is represented by an intersection point between an inclined straight line L3 determined by engagement of the first clutch C1 and first brake B1, and the vertical line Y7 indicative of the rotating speed of the seventh rotary element RE7 fixed to the output shaft 22. The rotating speed of the output shaft 22 in the fourth-speed position is represented by an intersection point between a horizontal line L4 determined by engagement of the first clutch C1 and second clutch C2, and the vertical line Y7 indicative of the rotating speed of the seventh rotary element RE7 fixed to the output shaft 22.

In the first-speed through fourth-speed positions, as result of engagement of the switching clutch C0, power from the differential portion 11 i.e., the power distributing mechanism 16 is inputted to the eighth rotary element RE8 with the rotating speed the same as that of the engine speed $N_E$. However, when the switching clutch B0 engages instead of the switching clutch C0, since power from the differential portion 11 is inputted to the eighth rotary element RE8 with a speed higher than the engine speed $N_E$, the rotating speed of the output shaft 22 in the fifth-speed position is represented by an intersection point between a horizontal line L5 and the vertical line Y7. Here, the horizontal line L5 is determined by engagement of the first clutch C1, second clutch C2 and switching brake B0, and the vertical line Y7 indicates the rotating speed of the seventh rotary element RE7 fixed to the output shaft 22.

Figure 4:
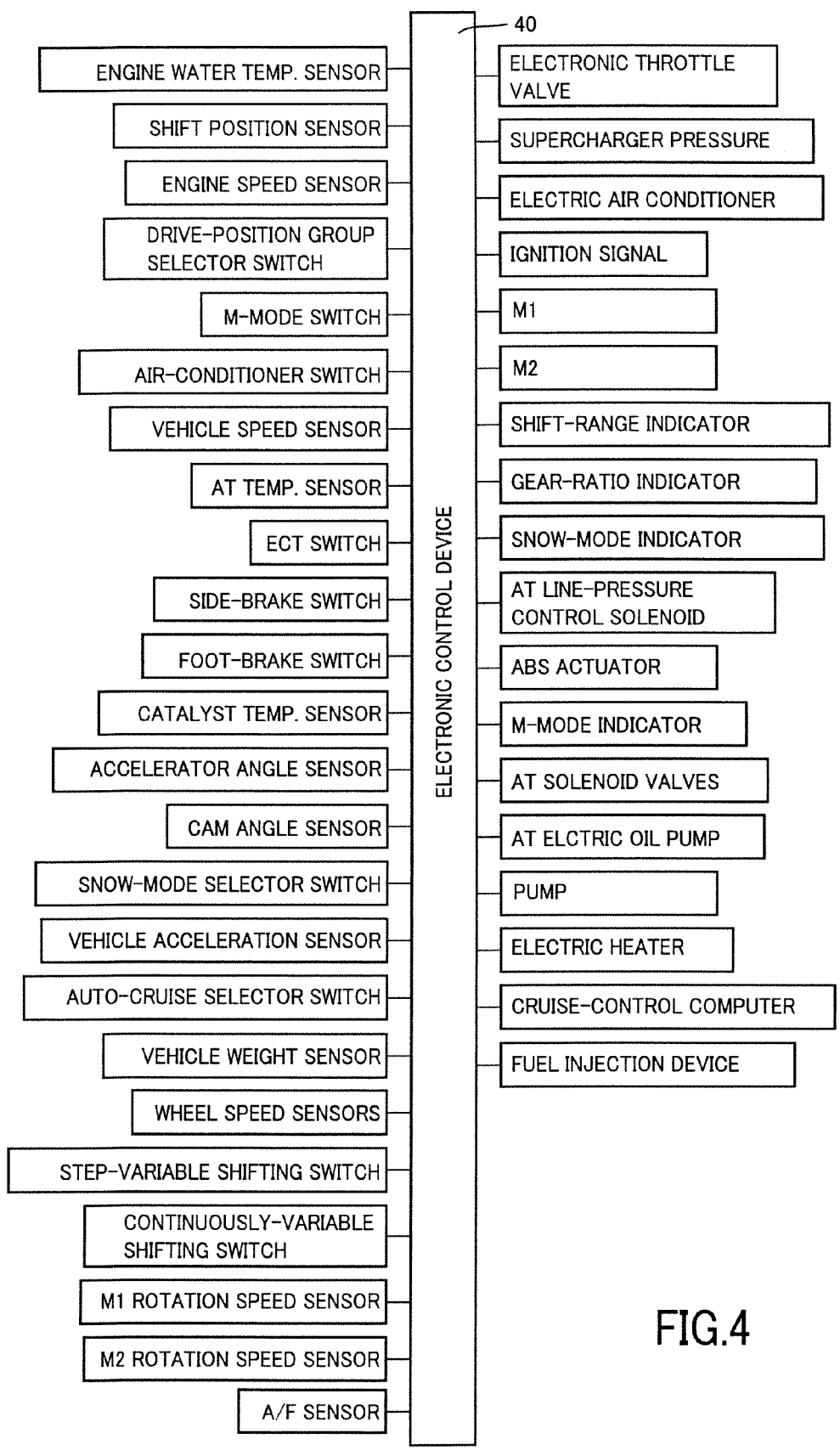
FIG. 4 is a view explaining input and output signals of an electronic control apparatus provided in the drive apparatus of the embodiment shown in FIG. 1.

FIG. 4 illustrates signals input to an electronic control device 40 and signals output therefrom to control the transmission mechanism 10. This electronic control device 40 includes a so-called microcomputer incorporating a CPU, a ROM, a RAM and an input/output interface. By performing signal processing according to programs stored in the ROM utilizing a temporary data storage function of the ROM, it implements hybrid drive controls of the engine 8 and electric motors M1 and M2, and drive controls such as shifting controls of the automatic transmission portion 20.

To the electronic control device 40, from various sensors and switches shown in FIG. 4, various signals are inputted, which include a signal indicative of a temperature $TEMP_W$ of cooling water of the engine, a signal indicative of a selected operating position $P_{SH}$ of a shift lever 92 (refer to FIG. 5), a signal indicative of the operating speed $N_E$ of the engine 8, a signal indicative of a set value of gear ratio row, a signal indicative of a command for M mode (motor drive mode), a signal indicative of an operated state of an air conditioner, a signal indicative of a vehicle speed V corresponding to the rotating speed $N_{OUT}$ of the output shaft 22, a signal indicative of a working oil temperature of the automatic transmission portion 20, a signal indicative of an operated state of a side brake, a signal indicative of an operated state of a foot brake, a signal indicative of a catalyst temperature, a signal indicative of an opened amount $A_{CC}$ of an accelerator pedal, a signal indicative of a cam angle, a signal indicative of a snow drive mode, a signal indicative of a longitudinal acceleration value of the vehicle, and a signal indicative of an auto-cruising drive mode.

Also inputted are a signal indicative of a vehicle weight, a signal indicative of wheel speed of each drive wheel, a signal indicative of operation of a step-variable switch for changing the differential portion 11 (power distributing mechanism 16) to the step-variable shifting state (locked state) so that the transmission mechanism 10 functions as the step-variable transmission, a signal indicative of operation of a continuous-variable switch for changing the differential portion 11 (power distributing mechanism 16) to the continuously variable shifting state (differential state) so that the transmission mechanism 10 functions as the continuously variable transmission, a signal indicative of the rotating speed $N_{M1}$ of the first electric motor M1, a signal indicative of the rotating speed $N_{M2}$ of the second electric motor M2, and a signal indicative an air-fuel ratio A/F of the engine 8.

From the electronic control device 40, various control signals are outputted to the engine output control apparatus 43 (refer to FIG. 5) which controls the engine output, which includes a signal to drive a throttle actuator 97 for controlling an opening degree $\theta_{TH}$ of a throttle valve 96 disposed in a suction tube 95 of the engine 8, a signal to control fuel supply amount to each cylinder of the engine 8 by a fuel injection device 98, a signal to command an ignition timing in the engine 8 by an ignition device 99, a signal to adjust a super-charger pressure, a signal to operate the electric air conditioner, a signal for controlling an ignition timing of the engine 8, signals to operate the electric motors M1 and M2, a signal to operate a shift-range indicator for indicating the selected operating position of the shift lever, a signal to operate a gear-ratio indicator for indicating the gear ratio, a signal to operate a snow-mode indicator for indicating the selection of the snow drive mode, a signal to operate an ABS actuator for anti-lock braking of the wheels, and a signal to operate an M-mode indicator for indicating the selection of the M-mode.

Also outputted are signals to operate solenoid-operated valves incorporated in a hydraulic control unit 42 (refer to FIG. 6) provided to control the hydraulic actuators of the hydraulically operated frictional coupling devices of the differential portion 11 and the automatic transmission portion 20, a signal to operate an electric oil pump used as a hydraulic pressure source for the hydraulic control unit 42, a signal to drive an electric heater, a signal to be applied to a cruise-control computer, and a signal indicative of an fuel injection device.

Figure 5:
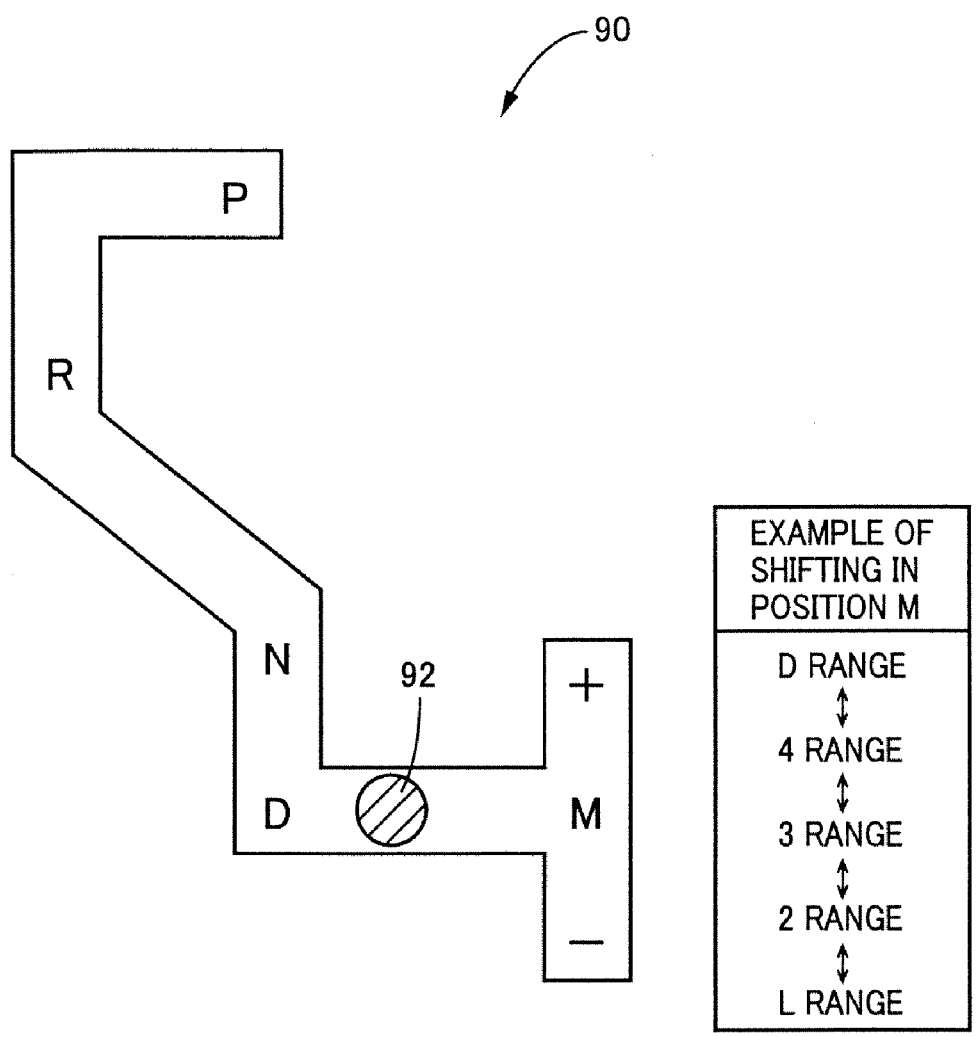
FIG. 5 is a view showing one sample of a shift device provided with a shift lever and being operated to select one of plural kinds of shift positions.

FIG. 5 shows on sample of a switch device 90 to be switched by manual operation to one of plural kinds of shift positions. This switch device 90 includes a shift lever 48 disposed for example at lateral side of the driver's seat and manually operated to select one of plural kinds of shifting positions. This switch lever 92 is selectively shifted to one of a parking position "P (parking)", rearward running position "R (reverse)" for rearward running, neutral position "N (neutral)", forward automatically shifted running drive position "D (drive)", and forward manually shifted running drive position "M (manual)". In the "P (parking)", none of the engaging device such as the first clutch C1 and the second clutch C2 are not engaged to set the interrupt state of the power transmitting path in the transmission mechanism 10 i.e., the automatic transmission portion 20, and to lock rotation of the output shaft 22. In the "N (neutral)", the power transmitting path in the transmission mechanism 10 is interrupted.

For example, in conjunction with manual operations of the switch lever 92 to the respective shift positions, manual valves in the hydraulically operated control circuit 42 mechanically connected to the switch lever 92, are switched. The hydraulically operated control circuit 42 is thereby mechanically switched so that the reverse-gear position "R," the neutral position "N," or the forward-gear position "D," etc., shown in the engagement operation table of FIG. 2, is established. The respective gear positions from the first to fifth gear positions in the "D" or "M" position, shown in the engagement operation table of FIG. 2, are established by electrical switching of the solenoid-operated valves in the hydraulically operated control circuit 42.

Among the respective shifting positions "P" to "M," at each of the non-running positions such as "P" and "N," for example, both the first clutch C1 and the second clutch C2 are released as shown in the engagement operation table of FIG. 2. These are non-drive positions for selecting a state in which the power transmitting path in the automatic transmission portion 20 is cut off to disable the vehicle drive. That is, this is a non-drive state in which the path of power transmission is cut off or interrupted by the first clutch C1 and the second clutch C2.

Also, at each of the running positions "R" "D" and "M" for example, at least one of the first clutch C1 and the second clutch C2 is engaged as shown in the engagement operation table of FIG. 2. These are drive positions for selecting a state in which the power transmitting path in the automatic transmission portion 20 is connected to enable the vehicle drive. That is, these are the drive position for selecting a transmitting state of the power transmitting path by both or one of the first clutch C1 and the second clutch C2.

Specifically, the second clutch C2 is engaged by manual operation of the switch lever 48 from the "P" position or the "N" position to the "R" position, so that the power transmitting path in the automatic transmission portion 20 is switched from a power transmission cutoff state to a power transmissive state. At least the first clutch C1 is engaged by manual operation of the switch lever 48 from the "N" position to the "D" position, so that the power transmitting path in the automatic transmission portion 20 is switched from a power transmission cutoff state to a power transmissive state. Also, the "D" position is the running position at the maximum speed, and the "4" range to "L" range in the "M" position are engine brake ranges for obtaining an engine brake effect.

The "M" position is located at the same position as the "D" position in the longitudinal direction of the vehicle, and is adjacent thereto in the lateral direction of the same. The switch lever 92 is operated to the "M" position, for manually selecting one of the above-indicated "D" through "L" positions. Described in detail, at the "M" position, a shift-up position "+" and a shift-down position "−" spaced from each other in the longitudinal direction of the vehicle are disposed. Each movement of the switch lever 92 to the shift-up position "+" or the shift-down position "−", any one of "D" to "L" positions is selected.

The "M" position is located at the same position as the "D" position in the longitudinal direction of the vehicle, and is adjacent thereto in the lateral direction of the same. The switch lever 48 is operated to the "M" position, for manually selecting one of the above-indicated "D" through "L" positions. Described in detail, at the "M" position, a shift-up position "+" and a shift-down position "−" spaced from each other in the longitudinal direction of the vehicle are disposed. Each movement of the switch lever 92 to the shift-up position "+" or the shift-down position "−", any one of "D" to "L" positions is selected.

Figure 6:
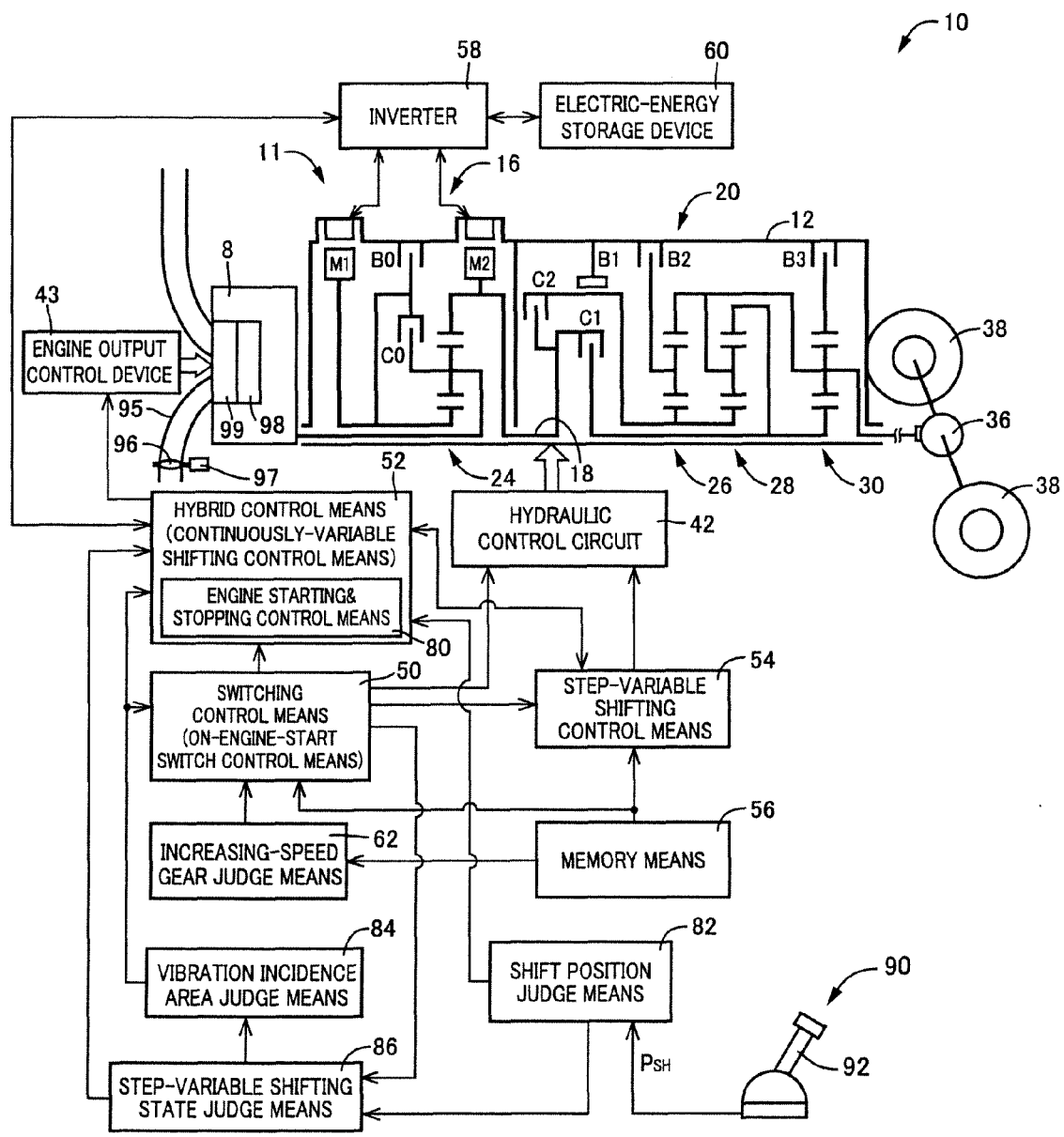
FIG. 6 is a functional block diagram explaining an essence of control operation to be executed by the electronic control apparatus shown in FIG. 4.
Figure 7:
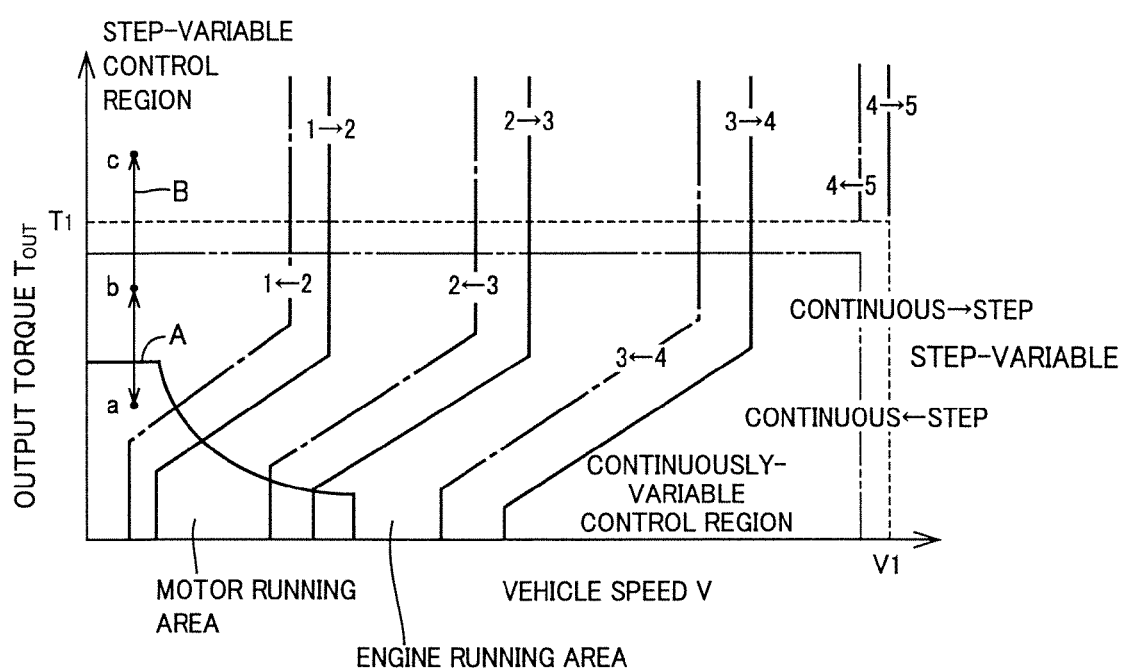
FIG. 7 is a view representing one example of a preliminarily stored shifting diagram based on which a determination on the gear shifting is executed in the automatic transmission, one example of a preliminarily stored shifting diagram based on which a determination on the switching of a shifting state is executed in a shifting mechanism, and one example of a preliminarily stored drive-force source switching diagram having a boundary line between an engine running area and a motor running area for an engine running mode and a motor running mode to be switched. They are plotted on a two-dimensional coordinate in terms of as the same parameters as the vehicle speed and output torque, while representing respective relations.

FIG. 6 is a functional block diagram for illustrating an essential part of a control function to be performed with the electronic control device 40. In FIG. 6, the step-variable shifting control means 54 functions as shifting control means for performing the gear shifting in the automatic transmission portion 20. For instance, the step-variable shifting control means 54 discriminates i.e., judges whether to perform the gear shifting in the automatic transmission portion 20 on the basis of the vehicle condition indicative of the vehicle speed V and the required output torque $T_{out}$ for the automatic transmission portion 20 by referring to the relations (including the shifting diagram and the shifting map), preliminarily stored in the memory means 56, which are shown in FIG. 7 in solid lines and single dot lines.

That is, the step-variable shifting control means 54 discriminates a shifting position, for which the gear shifting is performed with the automatic transmission portion 20, to allow the automatic transmission portion 20 to perform the gear shifting so as to obtain the discriminated shifting position. When this takes place, the step-variable shifting control means 54 outputs a command (shifting output command) to a hydraulic control circuit 42 for coupling and/or uncoupling the hydraulically operated frictional coupling device, excepting the switching clutch C0 and the switching brake B0, so as to achieve a desired shifting position in accordance with, for instance, the operation Table shown in FIG. 2.

Hybrid control means 52 renders the engine 8 operative in an operating region at high efficiency under the continuously variable shifting state of the transmission mechanism 10, that is, the differential state of the differential portion 11. Meanwhile, the hybrid control means 52 allows the rates of drive force being distributed to the engine 8 and the second electric motor M2 and a reactive force of the first electric motor M1 due to the operation thereof for generating electric power to be varied to optimum values, thereby controlling a speed ratio γ0 of the differential portion 11 placed as an electrically controlled continuously variable transmission. For instance, the hybrid control means 52 calculates a target (demanded) output of the vehicle by referring to the displacement value Acc of an accelerator pedal and the vehicle speed V indicative of the amount of output required by a vehicle driver at the current running speed of the vehicle.

Then, the hybrid control means 52 calculates a demanded total target output based on the target output of the vehicle and a charging request value. In order to obtain the total target output, the hybrid control means 52 calculates a target engine output with taking account of the transmitting loss, loads on auxiliary units, the assisting torque of the second electric motor M2, etc. Then, the hybrid control means 52 controls the engine 8 so as to provide the engine speed $N_E$ and the engine torque $T_E$ such that the target engine output is obtained, while controlling the amount of electric power being generated by the first electric motor M1.

The hybrid control means 52 performs hybrid control with taking account of the gear position of the automatic transmission portion 20 to obtain drive power performance while improving fuel consumption. Such hybrid control allows the differential portion 11 to function as the electrically controlled continuously variable transmission so as to allow the engine speed $N_E$, determined for the engine 8 to operate at a high efficiency, to match the rotating speed of the transmitting member 18 that is determined based on the vehicle speed V and the selected gear position of the automatic transmission portion 20.

To this end, the hybrid control means 52 preliminarily stores therein an optimum fuel economy curve (including the fuel economy map and the relations) that is preliminarily determined on an experimental basis. This allows a compromise to be obtained, during the running of the vehicle under the continuously variable shifting state, between drivability of the vehicle and fuel economy performance of the engine 8 on the two-dimensional coordinate with the parameters including, for instance, the engine speed $N_E$ and the output torque (engine torque) $T_E$ of the engine 8.

Thus, the hybrid control means 52 determines a target value of the total speed ratio γT of the transmission mechanism 10 so as to obtain the engine torque $T_E$, causing the engine to generate an output required for satisfying, for instance, the target output (overall target output and required drive force), and the engine speed $N_E$. This enables the engine 8 to operate on the optimum fuel economy curve. Then, the hybrid control means 52 controls the speed ratio γ0 of the differential portion 11 so as to achieve the target value. This allows the total speed ratio γT to be controlled within a variable shifting range, for instance, from 13 to 0.5.

During such hybrid control, the hybrid control means 52 allows electric energy generated by the first electric motor M1 to be supplied to an electric-energy storage device 60 and the second electric motor M2 through an inverter 58. This allows a major portion of the drive force of the engine 8 to be mechanically transmitted to the transmitting member 18. When this takes place, a portion of the drive force of the engine is consumed with the first electric motor M1 for generating electric power to be converted to electric energy. The electric energy is supplied through the inverter 58 to the second electric motor M2, which in turn is driven to transfer the drive force from the second electric motor M2 to the transmitting member 18. Equipment, related to the operations from a phase of generating the electric energy to a phase in which the electric energy is consumed with the second electric motor M2, constitutes an electric path in which the portion of the drive force of the engine 8 is converted to the electric energy which in turn is converted to the mechanical energy.

The hybrid control means 52 functionally includes engine output control means. The engine output control means allows a throttle actuator 97 to perform throttle control so as to open or close an electronic throttle valve 96. In addition, the engine output control means allows a fuel injection device 98 to control a fuel injection quantity and fuel injection timing for performing fuel injection control. Further, the engine output control means outputs commands to the engine output control apparatus 43 independently or in combination. This allows the engine 8 to perform output control so as to fundamentally provide the required engine output. For instance, the hybrid control means 52 drives the throttle actuator 60 in response to an acceleration opening signal Acc by referring to the preliminarily stored relation, which is not shown, such that the greater the accelerator opening Acc, the greater will be the throttle valve opening $\theta_{TH}$. The engine output control device 43, in accordance with command from the hybrid control means 52, operates to open/close the electric throttle valve 96 via the throttle actuator 96, to inject the fuel from the fuel injection device 98, and to ignite the fuel/air mixture by the ignition device such as the igniter.

The hybrid control means 52, irrespective of the halt or idling state of the engine 8, can perform the control to cause the vehicle to run or to be driven by the electrical CVT function of the differential portion 11. A solid line A, shown in FIG. 6, represents a boundary line between the engine running area and the motor running area for the drive power source of the vehicle for starting up/running (hereinafter referred to as "for running") thereof to be switched to the engine 8 and the electric motor, that is, for instance, the second electric motor M2. In other words, the boundary line is used for switching the so-called engine running area, in which the engine 8 is caused to act as a running drive power source for starting up/running (hereinafter referred to as "running") the vehicle, and the so-called motor running area in which the second electric motor M2 is caused to act as a drive power source for running the vehicle.

The preliminarily stored relation, having the boundary line (in the solid line A) shown in FIG. 7 for switching the engine running area and the motor running area, represents one example of the drive-force source switching diagram (drive power source map), formed in a two-dimensional coordinate, which takes the vehicle speed V and the output torque $T_{OUT}$, indicative of the drive-force related value, as parameters. Memory means 56 preliminarily stores the drive-force source switching diagram together with, for instance, the solid line and the shifting diagram (shifting map) designated by the single dot line which are shown in FIG. 7.

The hybrid control means 52 determines based on the vehicle condition, represented by the vehicle speed V and the required torque output $T_{OUT}$ by referring to, for instance, the drive-force source switching diagram shown in FIG. 7 to find whether the motor running area or the engine running area is present, thereby effectuating the motor running area or the engine running area. As will be apparent from FIG. 7, the hybrid control means 52 executes the motor running area at the relatively low output torque $T_{OUT}$, that is, the low engine torque $T_E$ in which the engine efficiency is generally lower than that in the high torque region, or the relatively low vehicle speed area in the vehicle speed V, that is, the low load region.

Accordingly, upon the vehicle starting, the motor starting is normally executed. However, depending on the vehicle state when the accelerator pedal is so deeply depressed that, in the drive force source switch diagram shown in FIG. 7, the required output torque $T_{OUT}$ exceeds the motor running area that is the required engine torque $T_E$, the engine starting is normally executed.

In order to suppress a drag of the engine 8 in a halted state thereof for improving the fuel economy, the hybrid control means 52 renders the differential portion 11 operative to perform an electrical CVT function (differential function) during the motor running area. This enables the rotating speed $N_{M1}$ of the first electric motor M1 to be controlled in a negative rotating speed, for instance, an idling state. This causes the engine speed $N_E$ to be maintained at a zeroed or nearly zeroed value.

In order to switch the engine running mode and the motor running mod, the hybrid control means 52 includes engine start and stop control means 80 for switching the operating state of the engine 8 between an operating condition and an inoperative condition, that is, starting up and halting the engine 8. In addition, the engine start and stop control means 80 may switch the operating state of the engine 8 between the operating condition and the inoperative condition depending on needs when the shift lever 9 remains in the halted condition of the vehicle such as the "P" position or the "N" position.

The hybrid control means 52 functions as engine start-up condition establishment determining means for determining whether or not an engine start-up condition is established for the engine 8 to be started up. The hybrid control means 52 determines that the engine start-up condition is established when the accelerator pedal is depressed and demanded output torque $T_{OUT}$ increases to cause the vehicle condition to shift from the motor running area to the engine running area as shown by transitions, for instance, in points "a"→"b" and points "a"→"c" on a solid line B in FIG. 7.

In an alternative, the hybrid control means 52 determines that the engine start-up condition is established under various situations described below. First, the determination is made based the occurrence of the accelerator pedal being depressed or the like that the operation is restored from the fuel cut-off operation well known to be the vehicle running under deceleration in an accel off state. Second, the determination is made in response to a signal representing a charging state SOC of the electric-storage device 60 that during the halt of the engine with the vehicle remaining under the halted condition, an actual charging state SOC becomes less than a rated value. Third, the determination is made based on a signal representing an engine water temperature $TEMP_W$ or a signal representing a catalyst temperature that during the halt of the engine 8 with the vehicle remaining in the halt state, a need arises for the engine 8 and the catalyst device to be warmed up in operation. As used herein, the term "rated value of the charging state SOC" refers to a value that is determined on preliminarily experiments or the like to be a charging state SOC required for the electric-storage device 60 to be charged upon operating the engine 8 to cause the first electric motor M1 to generate electric power when the charging state SOC is less than the rated value.

Further, the engine start and stop control means 80 functions as the engine start-up control means for effectuating the start-up of the engine 8 when the hybrid control means 52 determines that the engine start-up condition is established. For instance, the engine start and stop control means 80 allows the first electric motor M1 to be turned on for thereby increasing the rotating speed $N_{M1}$ of the first electric motor M1 to function as a starter. This allows the engine speed $N_E$ to increase to a level beyond a given engine speed $N_E'$, for instance, a level greater than the engine speed $N_E$, exceeding the idling engine speed $N_{EIDL}$, for autonomous rotation.

Thereafter, the fuel injection device 98 allows fuel to be supplied to the engine and permits the ignition device 99 to perform ignition for thereby starting up the engine 8.

When this takes place, the engine start and stop control means 80 rapidly increases the rotating speed $N_{M1}$ of the first electric motor to immediately (that is, rapidly) increase the engine speed $N_E$ to a given engine speed $N_E'$. This allows the engine speed to rapidly transit a given engine speed region $N_{ER}$ at a level less than the idling engine speed $N_{EIDL}$ to suppress the occurrence of vibration and/or noise of the vehicle during the start-up of the engine. The given engine speed region $N_{ER}$ is well known as a resonant region in which a resonance is liable to occur in a vibrating system of the vehicle with the vehicle encountering vibration and/or noise exceeding the given values. For instance, the engine start and stop control means 80 operates so as to increase the engine speed $N_E$ to the given engine speed $N_E'$ at a speed determined on a preliminary experimental test so as to avoid the vehicle from encountering vibration and/or noise exceeding the given value. In the illustrated embodiment, as used herein, the term "vibration and/or noise" refers to "vibration noise".

Examples of resonance induced in the vibrating system of the vehicle may be supposed to include a resonance encountered with an engine suspension system including a power plant such as, for instance, the engine 8 and the transmission mechanism 10 and an engine mount, a torsional resonance encountered with a drive system, a resonance encountered with an exhaust emission system, resonances encountered with engine auxiliary devices, a bending resonance encountered with the drive system, a coupled resonance encountered with the drive system, a resonance encountered with a vehicle body system, and resonances encountered with suspension component members, etc.

Further, conducting, for instance, preliminary experiments allows the given engine speed region $N_{ER}$ be derived and stored. Such an engine speed region is supposed to lie in an engine speed region in the order of approximately 200 to 300 rpm, considered with the view in mind on a comfort of a vehicle occupant, under which the vibrating system of the vehicle is liable to suffer from vibration noise with the vehicle encountering with a resonance exceeding a given level. The given engine speed region $N_{ER}$ may be determined based on, in addition to the engine speed $N_E$, a vehicle condition represented by, for instance, a vehicle speed V, states of varying cylinders of the engine 8, that is, the number of operating cylinders of the engine 8, and the number of cycles, etc., of a variable cycle engine represented by electromagnetic drive valves. This is because the resonance is present or absent on the transmission mechanism 10 depending on a difference in the vehicle condition even if the engine speed $N_E$ and the vehicle speed V or the like lie at the same values. The given engine speed region $N_{ER}$ is determined in consideration of various vehicle conditions having an impact on the occurrence of resonance in the transmission mechanism 10.

Figure 8:
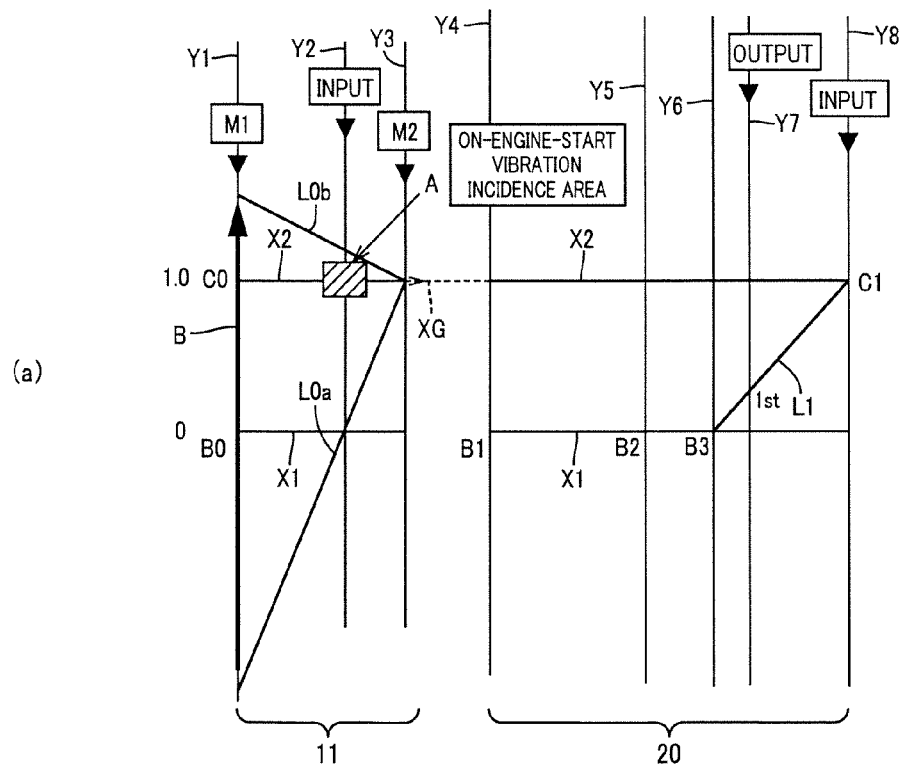
FIG. 8 is a view showing one sample illustrating operations, in which an engine speed transits a vibration generating region for a vehicle to encounter vibration and noise at a level exceeding a given value and a vibration generating region for the engine speed transits vibration generating region using a first electric motor during a start-up of the engine, which are plotted on a collinear chart corresponding to that shown in FIG. 3.
Figure 8:
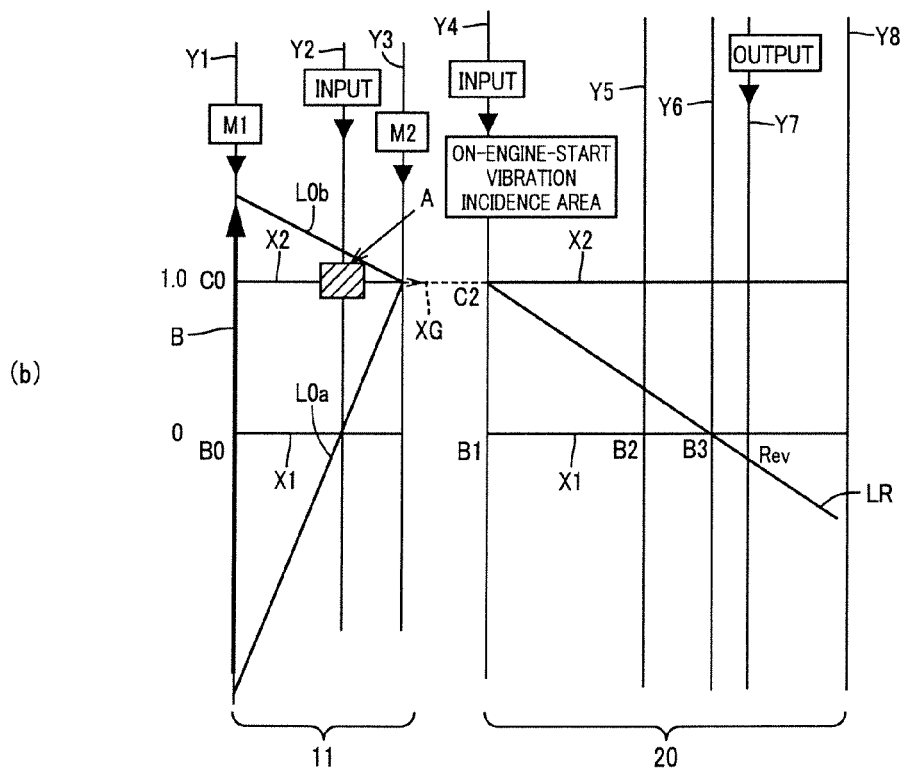

FIG. 8 is an example for illustrating a vibration generating region A under which the given engine speed region $N_{ER}$, that is, the vibration noise of the vehicle exceeds a given value, and an operation under which the engine speed is caused to transit the vibration generating region A during the start-up of the engine using the first electric motor M1, on a collinear chart corresponding to that of FIG. 3. FIG. 8A represents the collinear chart for the transmission mechanism 10 to operate in the 1st-gear position, and FIG. 8B represents the collinear chart for the transmission mechanism 10 to operate in the reverse-gear position.

In FIG. 8, a straight line L0a represents a motor running area during the halted condition of the engine. A straight line L0b represents a state in mid-flow in which the engine speed $N_E$ (the rotating speed of the first carrier CA1 and the rotating speed on a vertical line Y2) is raised to a given engine speed $N_E'$ during the start-up of the engine, when the motor running mode is switched to the engine running mode. Such an increase of the engine speed to the engine speed $N_E'$ occurs when, as shown by the solid line B, the rotating speed $N_{M1}$ (the rotating speed of the first carrier CA1 and the rotating speed on a vertical line Y2) of the first electric motor is raised using the first electric motor M1. Moreover, the region A, indicated by the hatched lines in FIG. 8, is present in an area below the given engine speed $N_E'$ with respect to the vibration generating area A.

Further, the rotating speed $N_{M2}$ (the rotating speed of the first ring gear R1 and the rotating speed on a vertical line Y3) of the second electric motor is uniquely determined with the vehicle speed V and the speed ratio γ of the automatic transmission portion 20. Thus, it will be turned out that the engine speed $N_E$ cannot be immediately raised using the second electric motor M2. Upon the start-up of the engine, moreover, the engine speed $N_E$ varies from the straight line L0a to the straight line L0b in a process under which the engine start and stop control means 80 controls the first electric motor M1 so as to rapidly raise the engine speed $N_E$ for rapidly transiting the vibration generating area A.

Further, the hybrid control means 52 functions as engine halt condition establishment determining means for determining whether or not an engine halt condition is established for the supply of fuel to the engine 8 to be cut off for halting the engine 8. The engine halt condition is determined to be established when, for instance, the accelerator pedal is released to decrease the required output torque $T_{OUT}$ under which the vehicle condition varies from the engine running area to the motor running area as indicated by the transition between the points "b"→"a" and the points "a"→"c" on the solid line B in FIG. 7.

In an alternative, the hybrid control means 52 determines in the presence of situations described below that the engine halt condition is established. First, such a situation stands when the determination is made based on the signal representing the state of charging SOC in the electric-storage device 60 that an actual charging state SOC is greater than a rated value during the operation of the engine under the halted condition of the vehicle. A second situation stands when the determination is made based on the signal representing the engine water temperature $TEMP_W$ and the signal representing the catalyst temperature that the warm-up operations of the engine 8 and the catalyst device are completed during the operation of the engine under the halted condition of the vehicle. A third situation stands when the determination is made based on the accel-opening ACC that the vehicle is running under deceleration with the accelerator pedal being released.

Further, if the hybrid control means 52 determines that the engine halt condition is established, then, the engine start and stop control means 80 functions as engine stop control means that effectuates the halting of the engine 8. For instance, the engine start and stop control means 80 performs the fuel-cutoff operation so as to allow the fuel injection device 98 to stop the supply of fuel to the engine 8 for halting the same. Thus, if the fuel supply to the engine 8 is interrupted to cause the engine 8 to fall in the halted state, the engine 8 is rendered to assume an idling state in which no engine torque $T_E$ is output and the first electric motor M1 does not produce reactive torque. Accordingly, the engine speed $N_E$ decreases such that the engine is brought into an engine rotation halted state, that is, the engine speed $N_E$ is zeroed.

Further, even under the engine running area, the hybrid control means 52 may allow the electric path to be established. In this moment, the electric energies resulting from the first electric motor M1 and/or the electric-storage device 60 are supplied to the second electric motor M2. Thus, the second electric motor M2 is driven to make it possible to perform torque-assisting for the drive force of the engine 8. Thus, in the illustrated embodiment, the engine running area may cover a phase including the engine running area and the motor running area in combination.

Further, the hybrid control means 52 may cause the differential portion 11 to have the electrical CVT function through which the engine 8 can be maintained under the operating state, regardless of the halted condition or the low speed condition of the vehicle. For instance, if a drop occurs in a state of charge SOC of the electric-storage device 60 during the halt of the vehicle, the first electric motor M1 needs to generate electric power. In this moment, the drive force of the engine 8 causes the first electric motor M1 to generate electric power while the rotating speed of the first electric motor M1 increases. Thus, even if the rotating speed $N_{M2}$ of the second electric motor M2, uniquely determined with the vehicle speed V, becomes zero (nearly zero) due to the halted condition of the vehicle, the power distributing mechanism 16 performs the differential action. This causes the engine speed $N_E$ to be maintained at a level beyond a rotating speed for autonomous rotation.

Furthermore, the hybrid control means 52 allows the differential portion 11 to perform the electrical CVT function to control the rotating speed $N_{M1}$ of the first electric motor M1 and the rotating speed $N_{M2}$ of the second electric motor M2. This causes the engine speed $N_E$ to be maintained at an arbitrary level of the rotating speeds regardless of the vehicle remaining under the halted or running state. In other words, the hybrid control means 52 controls the rotating speed $N_{M1}$ of the first electric motor M1 and/or the rotating speed $N_{M2}$ of the second electric motor M2 to the arbitrary level, while maintaining the engine rotation speed $N_E$ in the constant value or in the arbitrary value. For instance, as will be understood from the collinear diagram shown in FIG. 3, when increasing the engine speed $N_E$, the hybrid control means 52 executes the operation to raise the rotating speed $N_{M1}$ of the first electric motor M1 while maintaining the rotating speed $N_{M2}$ of the second electric motor M2, restricted with the vehicle speed V, at a substantially fixed level.

In addition, the hybrid control means 52 causes the first electric motor M1 to idly rotate so as not to generate the reaction force, so that the differential portion 11 is placed in a state equivalent to the power transmitting interrupted state (neutral state) unable to transmit the power therethrough where the power transmitting path therein is interrupted.

Increasing-speed gear judge means 62 makes a judge on which of the switching clutch C0 and the switching brake B0 are to be coupled for placing the transmission mechanism 10 in the step-variable shifting state. That is, the determination is made based on the vehicle condition according to, for instance, the shifting diagram, shown in FIG. 7, which is preliminarily stored in the memory means 56, to find whether or not the gear position to be shifted in the transmission mechanism 10 lies in an increasing-speed gear position, for instance, a 5th-speed gear position.

Switching control means 50 switches the coupling and/uncoupling states of the differential state switching means (switching clutch C0 and switching brake B0) depending on the vehicle condition. This allows the continuously variable shifting state and the step-variable shifting state, that is, the differential state and the locked state to be selectively switched. For instance, the switching control means 50 determines whether to switch the shifting state of the transmission mechanism 10 (differential portion 11) based on the vehicle condition represented with the vehicle speed V and the required output torque $T_{OUT}$. This determination is made by referring to the relations (shifting diagram and shifting map), preliminarily stored in the memory means 56, which are shown in the dotted line and the double dot line in FIG. 7.

That is, the determination is made to find whether the transmission mechanism 10 lies in a continuously variable shifting control region for the continuously variable shifting state or a step-variable shifting control region for the step-variable shifting state. Thus, the determination is made on the shifting state to be switched by the transmission mechanism 10. Then, the switching control means 50 effectuates the switching of the shifting state for selectively placing the transmission mechanism 10 in any one of the continuously variable shifting state and the step-variable shifting state.

More particularly, if the determination is made that the transmission mechanism 10 lies in the step-variable shifting control region, then, the switching control means 50 outputs a command to the hybrid control means 52 disenabling or interrupting the hybrid control or continuously variable shifting control, while permitting the step-variable shifting control means 54 to perform the shifting for the predetermined step-variable shifting operation. When this takes place, the step-variable shifting control means 54 allows the automatic transmission portion 20 to perform the automatic shifting in accordance with, for instance, the shifting diagram, shown in FIG. 7, which is preliminarily stored in the memory means 56. For instance, FIG. 2 shows the operation Table, preliminarily stored in the memory means 56, which represents combinations in operation of the hydraulically operated frictional coupling devices, that is, the clutches C0, C1, C2, and the brakes B0, B1, B2 and B3 to be selected in the shifting control. That is, the transmission mechanism 10, that is, the differential portion 11 and the automatic transmission portion 20, functions as a whole to be the so-called step-variable automatic transmission, thereby establishing the gear positions according to the operation Table shown in FIG. 2.

If the increasing-speed gear judge means 62 judges the 5th-gear position, the switching control means 50 outputs a command to the hydraulic control circuit 42 for uncoupling the switching clutch C0 and coupling the switching brake B0. This causes the differential portion 11 to function as an auxiliary power transmission with a fixed speed ratio γ0, for instance, the speed ratio γ0 equal to "0.7". Thus, the transmission mechanism 10 can act as a whole to obtain an increasing-speed gear position, that is, a so-called overdrive-gear position with a speed ratio less than 1.0. In contrast, if no 5th-gear position is determined by the increasing-speed gear judge means 62, the switching control means 50 outputs a command to the hydraulic control circuit 42 for coupling the switching clutch C0 and uncoupling the switching brake B0. This causes the differential portion 11 to function as the auxiliary power transmission with the fixed speed ratio γ0, for instance, the speed ratio γ0 equal to 1. Thus, the transmission mechanism 10 can act as a whole to obtain a decreasing-speed gear position with a speed ratio greater than 1.0.

Thus, the switching control means 50 can perform the switching of the transmission mechanism 10 in the step-variable shifting state and selectively performs the switching for the gear positions of two kinds in either one gear position under the step-variable shifting state. This causes the differential portion 11 to function as the auxiliary power transmission and the automatic transmission portion 20, connected to the differential portion 11 in series, is caused to function as the step-variable transmission. Thus, the transmission mechanism 10 is caused to function as the so-called step-variable automatic transmission as a whole.

On the contrary, if the determination is made that the transmission mechanism 10 should be switched to the continuously variable shifting state, the switching control means 50 outputs a command to the hydraulic control circuit 42 for uncoupling both the switching clutch C0 and the switching brake B0. This causes the transmission mechanism 10 to be placed in the continuously variable shifting state for enabling a continuously variable shifting to be performed. Thus, the transmission mechanism 10 can act as a whole to obtain the continuously variable shifting state.

Concurrently, the switching control means 50 outputs a command to the hybrid control means 52 for permitting the hybrid control, and outputs a signal to the step-variable shifting control means 54 for fixing the transmission mechanism 10 in the gear position for the predetermined continuously variable shifting state. Or, a signal is outputted to the step-variable shifting control means 54 for permitting the automatic transmission portion 20 to perform automatic shifting according to, for instance, the shifting diagram, shown in FIG. 7, which are preliminarily stored in the memory means 56. In such a case, the variable-step shifting control means 54 executes the operations as shown in the operation Table of FIG. 2 excepting the coupling operations of the switching clutch C0 and brake B0, thereby performing the automatic shifting.

Thus, the switching control means 50 switches the differential portion 11 to be placed in the continuously variable shifting state to function as the continuously variable transmission. In addition, the automatic transmission portion 20, connected to the differential portion 11 in series, is caused to function as the step-variable transmission. This results in the occurrence of a drive force with a suitable magnitude. Simultaneously, a continuously variable change occurs in the rotating speed input to the automatic transmission portion 20, that is, the rotating speed of the transmitting member 18 applied to the automatic transmission portion 20 for each gear position of the 1st-gear, 2nd-gear, 3rd-gear and 4th-gear positions. Thus, the respective gear positions are established in speed ratios over a continuously variable shifting range. Accordingly, since the speed ratio is continuously variable across the adjacent gear positions, the transmission mechanism 10 can achieve the overall speed ratio γT in the continuously variable shifting state.

Description is made of the relationship between the operation of the transmission mechanism 10 to switch the shifting state and the operation of the shift lever 92 of the switch device 90 shown in FIG. 5. If the shift lever 92 is shifted to, for instance, the position "D", the switching control means 50 effectuates automatic switching control for the shifting state of the transmission mechanism 10 based on the preliminarily stored shifting map or switching map shown in FIG. 7. In addition, the hybrid control means 52 allows the power distributing mechanism 16 to perform continuously variable shifting control and the step-variable shifting control means 54 allows the automatic transmission portion 20 to execute automatic shifting control.

During the running of the vehicle under, for instance, the step-variable transmission where the transmission mechanism 10 is placed in the step-variable shifting state, automatic shifting control is performed within a range from the 1st-gear to the 5th-gear positions as shown, for instance, in FIG. 2. The transmission mechanism 10 performs automatic shifting control, within a variable range of the overall speed ratio γT obtained in the continuously variable shifting range of the power distributing mechanism 16 and the respective gear positions resulting from the automatic shifting control executed by the automatic transmission portion 20 in a range from 1 st-gear to 4th-gear positions. As used herein, the position "D" refers to a shift position for a running mode (automatic mode) with automatic shifting representing a control pattern for the transmission mechanism 10 to execute automatic shifting control.

Further, if the shift lever 92 is shifted to, for instance, the position "M", the switching control means 50, the hybrid control means 52 and the step-variable shifting control means 54 allows the transmission mechanism 10 to perform automatic shift control within the shifting ranges of the overall speed ratio γT. During the running of the vehicle under the step-variable shifting state where the transmission mechanism 10 is switched to the step-variable shifting state, the transmission mechanism 10 performs the automatic shifting control within the various shifting ranges of the overall speed ratio γT. During the running of the vehicle under the continuously variable shifting state where the transmission mechanism 10 is switched to the continuously variable shifting state, automatic shifting control is performed within the ranges of the overall speed ratio γT available to be shifted in the respective shifting ranges, with the continuously variable shifting ratio width of the power distributing mechanism 16 and the ranges of the respective gear positions for the automatic transmission portion 20 to be available to shift depending on the respective shifting ranges. As used herein, the term position "M" also refers to a shift position for a manual shift running mode (manual mode) to be selected in a control pattern for the transmission mechanism 10 to execute manual shift control.

If the vehicle condition appears where a failure or defective function occurs in a control unit of an electrical system such as an electric motor or the like for rendering the differential portion 11 operative as an electrically controlled continuously variable transmission, the switching control means 50 may preferentially place the transmission mechanism 10 in the step-variable shifting state to ensure the vehicle to continuously run, even in the presence of the continuously variable control region. As used herein, the term "defective function" refers to a functional deterioration of equipment related to an electric path involved in the operation of the first electric motor M1 to generate electric energy and the conversion of such electric energy to mechanical energy, that is, failures and functional deteriorations resulting from the failures or low temperatures of the first electric motor M1, the second electric motor M2, the inverter 58 and the electric-storage device 60 and transmitting paths, etc., for such component parts to be interconnected.

To explain about FIG. 7 in detail, which represents the relations (shifting diagram and shifting map) preliminarily stored in the memory means 56 for a determination to be made to perform the gear shifting in the automatic transmission portion 20. FIG. 7 shows one example of the shifting diagram plotted in a two-dimensional coordinate with parameters in terms of the vehicle speed V and the required output torque $T_{OUT}$ indicative of a drive-force related value. In FIG. 7, a solid line represents an up-shift line and a single dot line represents a downshift line.

Further, in FIG. 7, a broken line represents a determination vehicle speed V1 and a determination output torque T1 for the switching control means 50 to make a determination on the continuously variable control area and the step-variable control area. That is, the broken line in FIG. 7 represents a two determination lines. One is a predetermined high vehicle speed determination line, which forms a series of the determination vehicle speed V1 representing a predetermined high-speed running determination line for determining that the hybrid vehicle lies in the high speed running region. Other is a predetermined high-output running determination line, which forms a series of the determination output torque T1 representing a predetermined high-output running determination line for determining the drive-force related value relevant to the hybrid vehicle, that is, for instance, the high output running region for the output torque $T_{OUT}$ of the automatic transmission portion 20 to mark the high output.

Further, as sown in a double dot line in FIG. 7 in contrast to the broken line indicated therein, a hysteresis is provided for making a determination on the step-variable shifting control region and the continuously variable shifting control region. That is, FIG. 7 represents a preliminarily stored shifting diagram (switching map and relation) for the switching control means 50 to make a regional determination on either the continuously variable control area or the step-variable control area, based on parameters with the vehicle speed V and the output torque $T_{OUT}$ covering the determination vehicle speed V1 and the determination output torque T1. In addition, the memory means 56 may preliminarily store the shifting map, inclusive of such a shifting diagram. Moreover, the shifting diagram may be of the type that includes at least one of the determination vehicle speed V1 and the determination output torque T1 and may include a preliminarily stored shifting diagram with a parameter taking any of the vehicle speed V and the output torque $T_{OUT}$.

The shifting diagram, the switching diagram or the drive-force source switching diagram or the like may be stored not in the map but in a determination formula for making comparison between the current vehicle speed V and the determination vehicle speed V1, and a determination formula or the like for making comparison between the output torque $T_{OUT}$ and the determination output torque T1. In such a case, the switching control means 50 places the transmission mechanism 10 in the step-variable shifting state when the vehicle condition such as, for instance, the current vehicle speed exceeds the determination vehicle speed V1. In addition, the switching control means 50 places the transmission mechanism 10 in the step-variable shifting state when the vehicle condition such as, for instance, the output torque $T_{OUT}$ of the automatic transmission portion 20 exceeds the determination output torque T1.

Further, for instance, if the transmission mechanism 10 is placed in the continuously variable shifting state during the high speed running, deterioration occurs in fuel consumption. Therefore, to address such an issue, the vehicle speed V1 is set such that the transmission mechanism 10 is placed in the step-variable shifting state during the high speed running. Furthermore, if the first electric motor M1 is configured to provide a reactive torque varying in a range covering the high output region of the engine during the running of the vehicle in a high output region, the first electric motor M1 becomes large in size. To minimize the first electric motor M1, the determination torque T1 is set to depend on the characteristic of the first electric motor M1 such that, for instance, the maximum output of electric energy being generated by the first electric motor M1 is lowered.

The above drive-force related value is a parameter corresponding to the drive force of the vehicle in one-to-one relation, which may be the drive torque or the drive force at the drive wheel 38. In addition, it may be an output torque $T_{OUT}$ of the automatic transmission portion 20, an engine output torque $T_E$, an acceleration value of the vehicle; an actual value such as the engine output torque $T_E$ calculated based on the operating angle of the accelerator pedal or the opening angle $\theta_{TH}$ of the throttle valve (or intake air quantity, air/fuel ratio or fuel injection amount) and the engine speed $N_E$; or an estimated value such as the engine output torque $T_E$ or required vehicle drive force calculated based on the amount of operation of the accelerator pedal by the vehicle operator or the operating angle of the throttle valve. The vehicle drive torque may be calculated based on not only the output torque $T_{OUT}$, etc., but also the ratio of a differential gear device of and the radius of the drive wheels 38, or may be directly detected by a torque sensor or the like. This is true for each of torques mentioned above.

Figure 9:
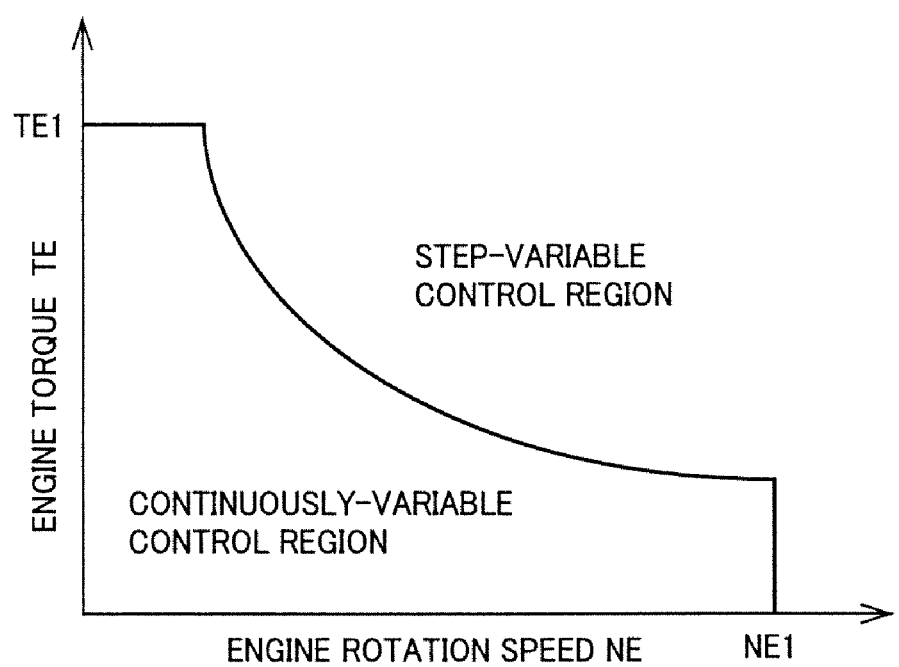
FIG. 9 is a conceptual view showing a preliminarily stored relation having a boundary line between a continuously variable control area and a step-variable control area for mapping the boundary line between the continuously variable control area and the step-variable control area shown in broken lines in FIG. 7.

FIG. 9 represents a switching diagram (switching map and relation), preliminarily stored in the memory means 56. It has an engine output line in the form of a boundary line to allow the switching control means 50 to execute the regional determination on which of the step-variable control area and the continuously variable control area is to be selected in terms of the parameters including the engine speed $N_E$ and the engine torque $T_E$. The switching control means 50 may execute the operation based on the engine speed $N_E$ and the engine torque $T_E$ by referring to the switching diagram shown in FIG. 7 in place of referring to the switching diagram shown in FIG. 7. That is, the switching control means 50 may determine whether the vehicle condition, represented with the engine speed $N_E$ and the engine torque $T_E$, is placed in the step-variable control area or the continuously variable control area. Further, FIG. 9 is a conceptual view for the broken line to be plotted as shown in FIG. 7. In other words, the broken line in FIG. 6 also represents shifting lines rewritten on the two-dimensional coordinate in terms of the parameters including the vehicle speed V and the output torque $T_{OUT}$ based on the relational diagram (map) shown in FIG. 9.

As indicated on the relation shown in FIG. 7, the step-variable control area is set to lie in the high torque region, where the output torque $T_{OUT}$ is greater than the predetermined determination output torque T1, or the high vehicle speed region where the vehicle speed V is greater than the predetermined determination vehicle speed V1. Therefore, a step-variable shift running area is effectuated in a high drive torque region, where the engine 8 operates at a relatively high torque, or a relatively high vehicle speed region of the vehicle speed. Further, a continuously variable shift running area is effectuated in a low drive torque region, where the engine 8 operates at a relatively low torque, or a relatively low vehicle speed region of the vehicle speed, that is, during a normal output region of the engine 8.

In the relation shown in FIG. 9, similarly, the step-variable shifting control region is set to lie in a high-torque region where the engine torque $T_E$ is greater than a predetermined given value TE1, a high-speed rotating region where the engine speed $N_E$ is greater than a predetermined given value NE1, or a high-output region where the engine output calculated based on the engine torque $T_E$ and the engine speed $N_E$ is greater than a given value. Therefore, the step-variable shift running area is effectuated at a relatively high torque, a relatively high rotating-speed or a relatively high-output of the engine 8.

The continuously variable shift running area is effectuated at a relatively low torque, a relatively low rotating-speed or a relatively low-output of the engine 8, that is, in the normal output region of the engine 8. The boundary line in FIG. 9 between the step-variable control area and the continuously variable control area corresponds to a high vehicle-speed determination line which forms a series of high vehicle-speed determination values and a high-output running determination line which forms a series of high-output running determination values.

With such a boundary line, the transmission mechanism 10 is placed in the continuously variable shifting state to ensure the vehicle to have fuel economy performance during the running of the vehicle at, for instance, a low/medium speed and low/medium output. In the high speed running region where an actual vehicle speed V exceeds the determination vehicle speed V1, the transmission mechanism 10 is placed in the step-variable shifting state operative to act as a step-variable transmission. In this moment, the output of the engine 8 is transferred to the drive wheels 38 mainly through a mechanical power transmitting path. This suppresses a loss in conversion between drive power and electric energy, generated when the transmission mechanism 10 is caused to act as an electrically controlled continuously variable transmission, providing improved fuel consumption.

Further, during the running of the vehicle at the high output of the engine where the drive-force related value such as the output torque $T_{OUT}$ or the like exceeds the determination torque T1, the transmission mechanism 10 is placed in the step-variable shifting state acting as the step-variable transmission. In this moment, the output of the engine 8 is transferred to the drive wheels 38 mainly through the mechanical power transmitting path. Therefore, the electrically controlled continuously variable transmission is caused to operate in the low/medium speed running region and the low/medium output running region of the vehicle. This results in a reduction in the maximum value of the electric energy being generated by the first electric motor M1, that is, the electric energy being transmitted by the same. Thus, a further miniaturization can be achieved in the first electric motor M1 per se or the vehicle drive apparatus including such a component.

That is, as the given value TE1 is preset to be a switching judgment value for engine torque $T_E$ for the first electric motor M1 to be able to bear reactive torque, the differential portion 11 is placed in the step-variable shifting state during the running of the vehicle at high output torque of the engine where engine torque $T_E$ exceeds the given value TE1. Therefore, the first electric motor M1 has no need to bear reactive torque acting against engine torque $T_E$ like a phase when the differential portion 11 is placed in the step-variable shifting state, thereby preventing an increase in size while suppressing the occurrence of degradation in durability. In other words, with the illustrated embodiment, the first electric motor M1 has a maximal output that is made smaller than reactive torque capacity required for the maximum value of engine torque $T_E$. That is, no output of the first electric motor M1 comply with the reactive torque capacity for engine torque $T_E$ to exceed the given value TE1, enabling the miniaturization to be realized.

In addition, the maximal output of the first electric motor M1 is a rated value that is obtained upon experimental tests in conformity to a related usage environment. Moreover, as used herein, the term "switching judgment value for engine torque $T_E$" refers to a value equivalent to the maximum value of engine torque $T_E$ or a value lower than the maximum value by a given level that enables the first electric motor M1 to bear reactive torque. The switching judgment value is a value obtained upon preliminary experimental tests so as to suppress the occurrence of degradation in durability of the first electric motor M1.

Figure 10:
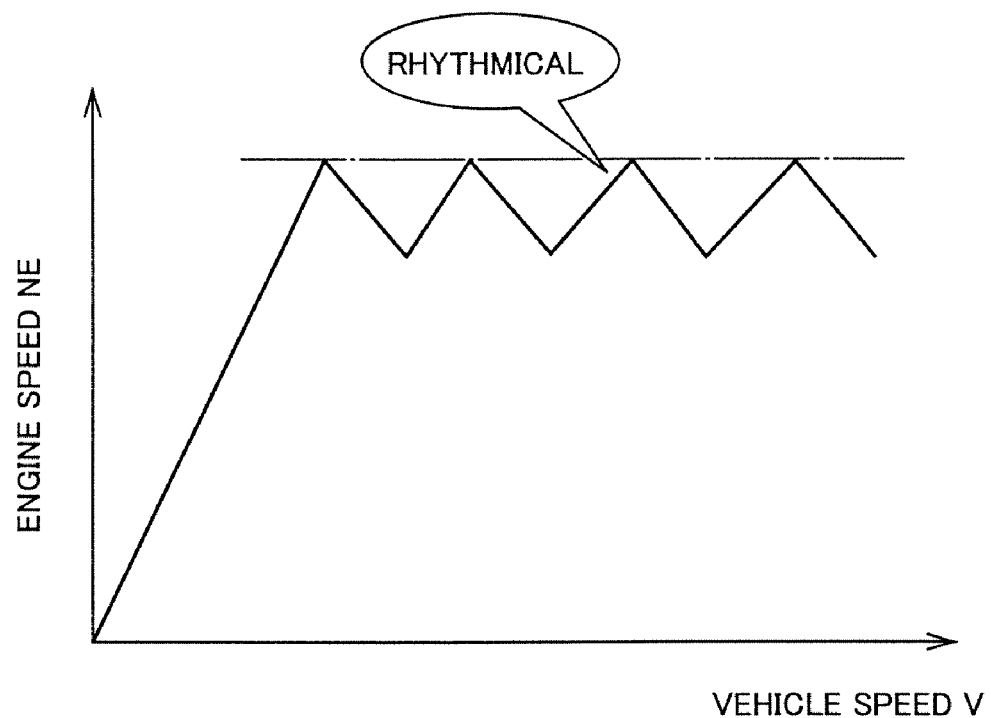
FIG. 10 is a graph showing fluctuation in an engine speed caused in up-shift in a step-variable transmission.

According to other viewpoint, in the high speed running, the requirement in the drive for the driver is precedes the requirement in the mileage. Therefore, the transmission mechanism 10 is switched to the step-variable shifting state (fixed shifting state) rather than the continuously variable shifting state. This allows a driver to enjoy a change in the engine speed $N_E$ resulting from the up-shifting in the step-variable automatic shift running region as shown in, for instance, FIG. 10, that is, a rhythmical change in the rotating speed $N_E$ of the engine.

Thus, with the illustrated embodiment, the transmission mechanism 10 (the differential portion 11, the power distributing mechanism 16) can be selectively switched to the continuously variable shifting state (differential state) and the non-continuously variable shifting (step-variable shifting state, locked state). In particular, the switching control means 50 determines the shifting state for the differential portion 11 to be switched based on the vehicle condition, upon which the differential portion 11 is selectively switched to either the continuously variable shifting state or the non-continuously variable shifting state (step-variable shifting state).

In addition, with the differential portion 11 placed in the continuously variable shifting state, an electrically controlled CVT function is executed to control the engine speed $N_E$ without being restricted with the vehicle speed, in other words, the rotating speed of the transmitting member 18. Therefore, during the start-up of the engine, the engine start and stop control means 80 controls the first electric motor M1 so as to rapidly increase the engine speed $N_E$ for thereby immediately transiting the given engine speed $N_{ER}$.

However, with the differential portion 11 placed in the step-variable shifting state, the power transmitting path between the engine 8 and the drive wheels 38 is mechanically established. In this moment, the engine speed $N_E$ is restricted with the vehicle speed V and can not be freely controlled. Therefore, in contrast to a case where the differential portion 11 is placed in the continuously variable shifting state, the engine start and stop control means 80 is hard to control the first electric motor M1 so as to rapidly increase the engine speed $N_E$ to immediately transit the given engine speed $N_{ER}$. Accordingly, during the start-up of the engine 8, there has been a probability for the vehicle to encounter vibrational noise greater than a given value.

For instance, during the running of the vehicle with the differential portion 11 placed in the step-variable shifting state, there has been a probability for the vehicle to encounter vibrational noise exceeding the given value. Such a probability has occurred upon the start-up of the engine where the engine start and stop control means 80, operating during the running of the vehicle under, for instance, the step-variable shifting state, restores the operation from the fuel-cutoff operation, or during the start-up of the engine where the continuously variable shifting state is switched to the step-variable shifting state as shown by the transition between points "a"→"c" on the solid line B in FIG. 7.

Thus, the switching control means 50 executes, in addition to the function set forth above, a function as on-engine-start switching control means when the engine start and stop control means 80 determines that the engine start-up condition is established and the engine start and stop control means 80 initiates the start-up of the engine 8. That is, the switching control means 50 operates so as to maintain the shifting state of the differential portion 11 in the continuously variable shifting state, or operates to uncouple the switching clutch C0 or the switching brake B0 to allow the shifting state of the differential portion 11 to be preferentially (forcibly) placed in the continuously variable shifting state.

Upon operation of the hybrid control means 52 to determine that the engine start-up condition is established, the engine start and stop control means 80 operates to start-up the engine 8. During such operation, if the power transmitting path between the engine 8 and the drive wheels 38 is placed in the power transmission cutoff state, then, no mechanical coupling is established in the power transmitting path, even if the shifting state of the differential portion 11 is placed in the step-variable shifting state. Accordingly, the engine speed $N_E$ can be controlled without being restricted with the vehicle speed V. Therefore, during the start-up of the engine with the power transmitting path placed in the power transmission cutoff state, the engine start and stop control means 80 allows the engine speed to rapidly transit the given engine speed $N_{ER}$, regardless of whether the power transmitting path is placed in the continuously variable shifting state or the step-variable shifting state.

Shift position judge means 82 executes the operation based on a signal representing a shift position "$P_{SH}$" to determine whether the shift lever 92 currently remains in any of the gear positions or shifted to any of the gear positions. For instance, the shift position judge means 82 executes the operation based on the signal representing the shift position "$P_{SH}$" to determine whether the shift lever 92 remains in the position "P" or the position "N". This represents a non-drive position in which the power transmitting path from the engine 8 to the drive wheels 38 is placed in the power transmission cutoff state. In an alternative, the shift position judge means 82 may execute the operation based on the signal representing the shift position "$P_{SH}$" to determine whether the shift lever 92 remains in the position "R", the position "D" or the position "M". This represents a drive position in which the power transmitting path from the engine 8 to the drive wheels 38 is placed in the power transmissive state.

Next, description is made of a phase in which the power transmitting path from the engine 8 to the drive wheels 38 is placed in the power transmissive state under a circumstance where the hybrid control means 52 determines that the engine start-up condition is established and the engine start and stop control means 80 initiates the operation to start-up the engine 8. When the shift position judge means 82 judges that the shift position "$P_{SH}$" of the shift lever 92 remains in the drive position, the switching control means 50 operates to maintain the shifting state of the differential portion 11 in the continuously variable shifting state or uncouple the switching clutch C0 or the switching brake B0 to cause the differential portion 11 to be preferentially (forcibly) placed in the continuously variable shifting state such that the engine speed rapidly transits the given engine speed $N_{ER}$.

Meanwhile, under a circumstance where the hybrid control means 52 determines that the engine start-up condition is established and, thereafter, the engine start and stop control means 80 initiates the start-up of the engine 8, there occurs a probability where the vehicle does not encounter vibrational noise exceeding a given value. In such a case, no need arises for the engine start and stop control means 80 to preferentially (forcibly) place the shifting state of the differential portion 11 in the continuously variable shifting state for causing the engine speed to immediately transit the given engine speed $N_{ER}$.

As used herein, the term "a probability where the vehicle does not encounter vibrational noise exceeding a given value" refers to a case where during the start-up of the engine, the engine speed $N_E$ already exceeds the given engine speed $N_{ER}$. In such a case, the engine speed does not transit the given engine speed $N_{ER}$ during the operation of the engine start and stop control means 80 to raise the engine speed $N_E$ to the given engine speed $N_{ER}$. In other words, under a circumstance where during the start-up of the engine, the engine speed $N_E$ does not exceeds the given engine speed $N_{ER}$, the engine speed $N_E$ transits the given engine speed $N_{ER}$, when the engine start and stop control means 80 raises the engine speed $N_E$ to a value greater than the given engine speed $N_E'$. This causes a probability to occur with the vehicle encountering vibrational noise exceeding the given value.

Under a circumstance where the hybrid control means 52 determines that the engine start-up condition is established, and thereafter, the engine start and stop control means 80 initiates the start-up of the engine 8, vibration incidence area judge means i.e., determination means 84 judges i.e., determines whether or not a resonance occurs in the vibrating system of the vehicle causing the vehicle to encounter vibrational noise exceeding the given value. Such determination is performed based on whether or not the actual engine speed $N_E$ exceeds the given engine speed area $N_{ER}$ involved in a vibration incidence area.

When vibrational noise of the vehicle exceeds the given value under a circumstance where the hybrid control means 52 determines that the engine start-up condition is established, and thereafter, the engine start and stop control means 80 initiates the start-up of the engine 8, the switching control means 50 allows the differential portion 11 to be placed in the continuously variable shifting state. This is because the engine start and stop control means 80 causes the engine speed to rapidly transit the given engine speed area $N_{ER}$, when the vibration incidence area judge means 84 judges that the actual engine speed $N_E$ does not exceed the given engine speed area $N_{ER}$. In this case, the operation is executed to place the shifting state of the differential portion 11 in the continuously variable shifting state, or uncouple the switching clutch C0 or the switching brake B0 to be preferentially (forcibly) placed in the continuously variable shifting state.

The phase in which during the start-up of the engine, the engine speed $N_E$ already exceeds the given engine speed area $N_{ER}$ is supposed to be involved in a status described below. That is, more particularly, such a status appears at timing where under a circumstance where the power transmitting path is established between the engine 8 and the drive wheels 38 in the power transmissive state, and the shifting state of the differential portion 11 is placed in the continuously variable shifting state, the vehicle speed V is uniquely determined with the vehicle speed V and the speed ratio γ such that the engine speed $N_E$, restricted with the vehicle speed V, raises to a value exceeding the given engine speed area $N_{ER}$.

Especially, when the engine speed $N_E$ further increases to a level exceeding the given engine speed $N_E'$, no need arises for the engine start and stop control means 80 to raise the engine speed $N_E$ to the given engine speed $N_E'$ using the first electric motor M1. In such a moment, the engine start and stop control means 80 allows the fuel injection device 98 to continuously supply fuel to the engine 8 intact while causing the ignition device 99 to perform the ignition for thereby effectuating the start-up of the engine 8.

Next, description is made of a phase wherein when the hybrid control means 52 determines that the engine start-up condition is established, and subsequently, the engine start and stop control means 80 operates to start-up the engine 8, the shift position judge means 82 judges that the shift position "$P_{SH}$" of the shift lever 92 remains in the drive position. In such a phase, step-variable shifting state judge means i.e., determination means 86 judges i.e., determines whether or not the power distributing mechanism 16 is placed in the locked state (coupled state), that is, whether or not the differential portion 11 is placed in the step-variable shifting state. The determination as to whether or not the differential portion 11 is placed in the step-variable shifting state is performed based on whether the switching control means 50 allows the transmission mechanism 10 to be placed in, for instance, in the step-variable shifting state.

When the step-variable shifting state judge means 86 judges that the differential portion 11 is placed in the step-variable shifting state, the vibration incidence area judge means 84 judges whether or not vibrational noise of the vehicle is higher than the given value.

When, during the start-up of the engine 8, the shifting state of the differential portion 11 is maintained in the continuously variable shifting state or preferentially (forcibly) placed in the continuously variable shifting state, the switching control means 50 allows the differential portion 11 to be placed in continuously variable shifting state for at least a given time period Ts. This is because the switching control means 50 interrupts the differential portion 11 from being switched to the step-variable shifting state for at least the given time period Ts.

For instance, the given time period Ts represents a time interval in which the engine 8 is actually supplied with fuel and the ignition for start-up is effectuated. Or, the given time period Ts represents a time interval required for start-up of the engine 8 in which the start-up of the engine 8 is initiated, that is, the first electric motor M1 effectuates the raising of the engine speed $N_E'$ after which fuel is supplied to the engine 8 and ignited. This time interval is a given start-up time A obtained upon conducting preliminarily experimental tests for storage.

More particularly, the switching control means 50 allows at least the differential portion 11 to be placed in the continuously variable shifting state until the engine start and stop control means 80 completes the start-up of the engine 8. As used herein, the expression "completes the start-up of the engine 8" refer to a phase starting from timing at which the engine start and stop control means 80 raises the engine speed $N_E$ to a level higher than the given engine speed $N_E'$ to timing at which fuel is actually supplied to the engine 8 and ignited. Or, the switching control means 50 allows at least the differential portion 11 to be placed in continuously variable shifting state during the given start-up time A required for the engine 8 to be started up after the engine start and stop control means 80 begins to start-up the engine 8.

Figure 11:
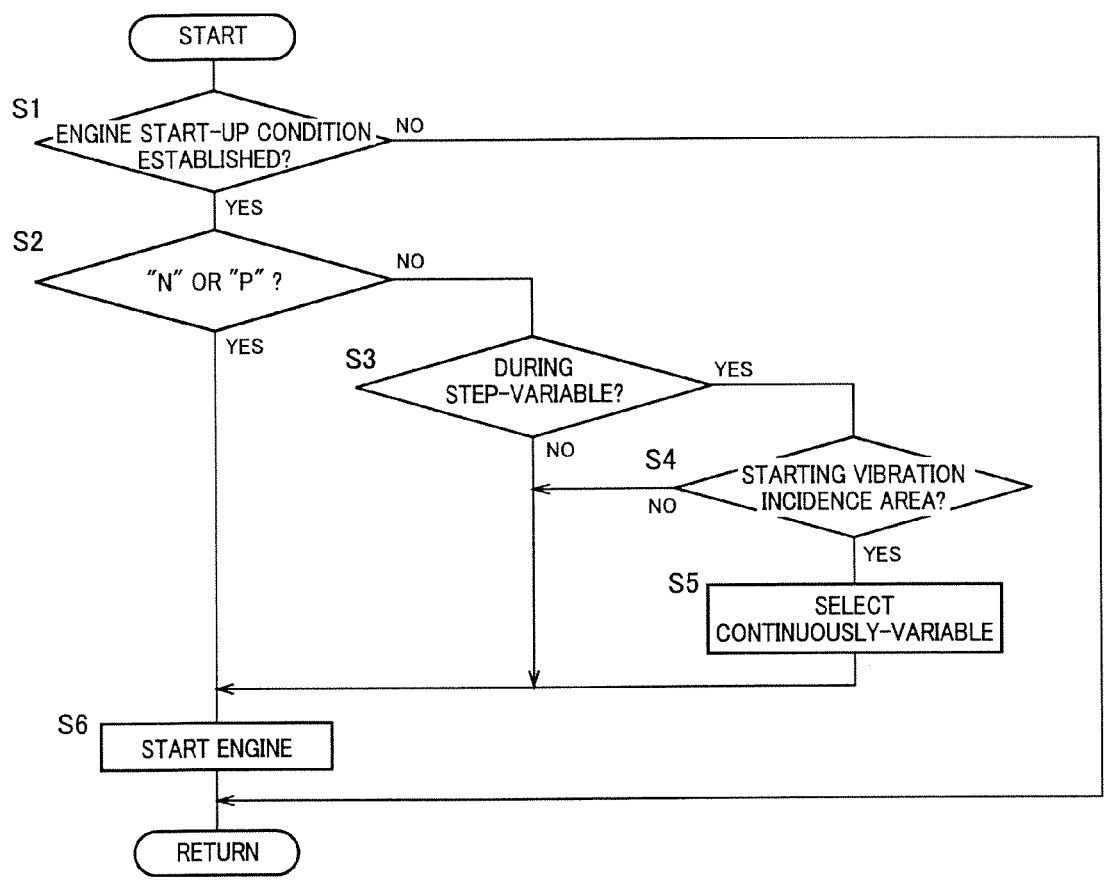
FIG. 11 is a flowchart illustrating a basic sequence of control operations to be executed with the electronic control apparatus shown in FIG. 6, that is, control operations to be executed not to cause the vehicle to encounter vibration and noise at a level exceeding a given value during a start-up of the vehicle.

FIG. 11 is a flowchart illustrating a basic sequence of control operations to be executed by the electronic control device 40, that is, a basic sequence of control operations not to cause the vehicle to encounter vibrational noise exceeding the given level during the start-up of the engine. This sequence is repeatedly executed for each extremely short cycle time in the order of a value, for instance, ranging from several milliseconds to several tens milliseconds.

Figure 12:
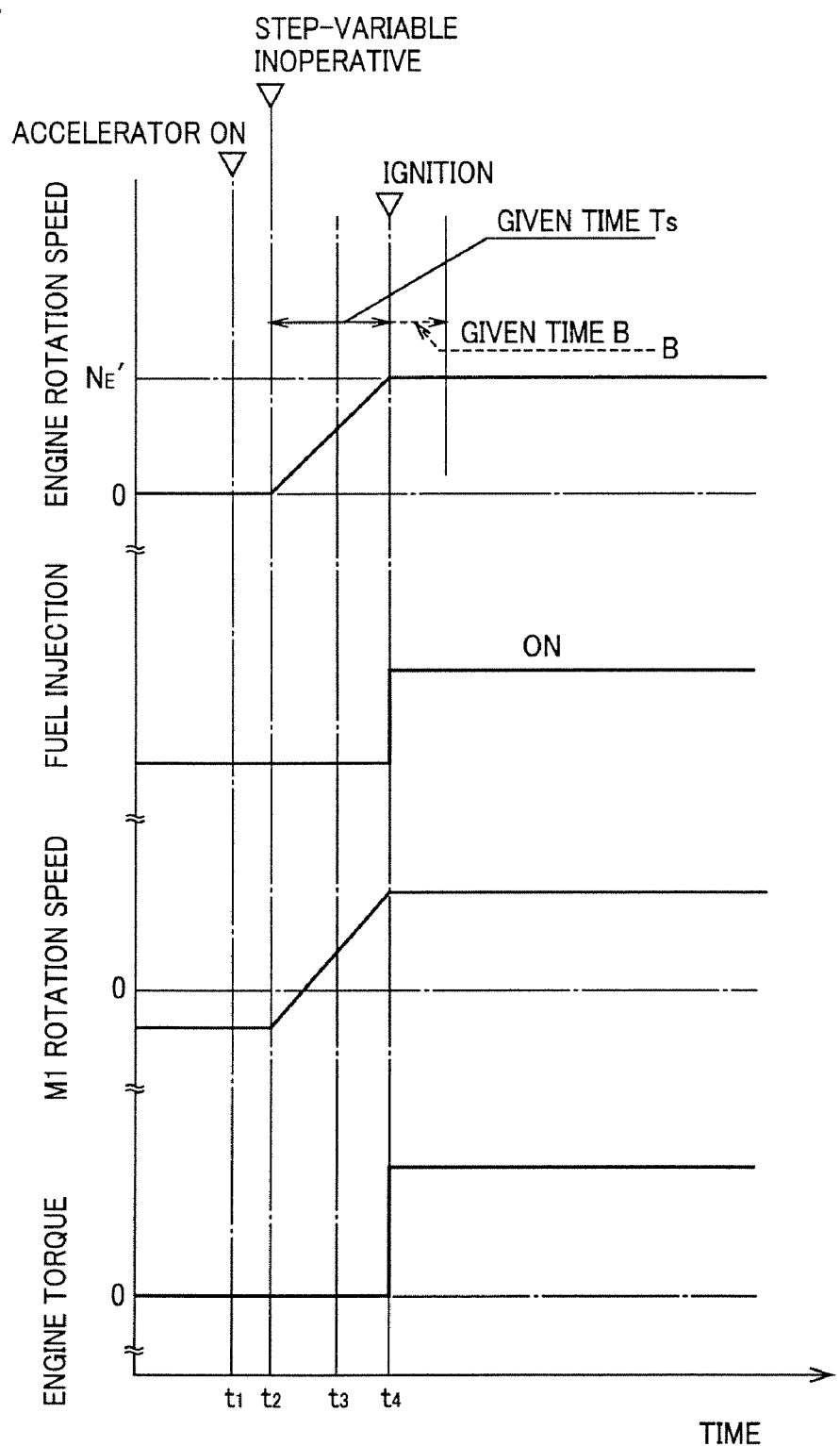
FIG. 12 is a timing chart illustrating the control operations shown in the flowchart shown in FIG. 11. This represents an example wherein deeply depressing an accelerator pedal during a motor running mode of a vehicle allows the determination to be made that an engine start is initiated for the vehicle to run in an engine running mode and that a differential portion is switched from a continuously variable shifting state to a step-variable shifting state.

Further, FIG. 12 is a timing chart for illustrating the basic sequence of control operations shown in the flowchart of FIG. 11. This timing chart represents a phase in which the accelerator pedal is deeply depressed during, for instance, the motor running to cause the vehicle condition to change in transition between the points "a"→"c" on the solid line B in FIG. 7. In this moment, the determination is made whether the start-up of the engine is initiated to be switched to the engine running mode, and the shifting state of the differential portion 11 is switched from the continuously variable shifting state to the step-variable shifting state.

First, in step S1 corresponding to the hybrid control mean S52, the determination is made whether or not the engine start-up condition is established for the engine 8 to be started up. For instance, as the accelerator pedal is depressed as shown by the transition between the points "a"→"c" on the solid line B in FIG. 7, the required output torque $T_{OUT}$ increases and the vehicle condition changes from the motor running area to the engine running area. When this takes place, the determination is made that the engine start-up condition is established. Or, if the accelerator pedal is deeply depressed during the halted condition of the vehicle and the halted condition of the engine under the vehicle condition with the required output torque $T_{OUT}$ exceeding the motor running area to cause a sudden starting of the engine, the determination is made that the engine start-up condition is established.

At a time point t1 shown in FIG. 12, the judgment i.e., determination is made that the start-up condition of the engine 8 is established and the switching control means 50 determines whether or not the differential portion 11 is placed in the step-variable shifting state, which is not shown in the flowchart in FIG. 11.

If the determination in step S1 is negative, then, the current routine is completed. If the determination in step S1 is positive, then, in step S2 corresponding to the shift position judge means 82, the judgment is made based on the signal representing the shift position "$P_{SH}$" to find whether the shift lever 92 remains in the position "P" or the position "N". This judgment is made based on whether or not the shift lever 92 is placed in the non-drive position with the power transmitting path from the engine 8 to the drive wheels 38 being placed in the power transmission cutoff state.

If the determination in step S2 is negative, then, in step S3 corresponding to the step-variable shifting state judge means 86, the judgment is made whether or not the power distributing mechanism 16 is placed in the locked state (coupled state), that is, whether or not the differential portion 11 is placed in the step-variable shifting state. This judgment is made based on whether or not the switching control means 50 places the transmission mechanism 10 in the step-variable shifting state.

If the determination in step S3 is positive, then, in step S4 corresponding to the vibration incidence area judge means 84, the judgment is made whether or not a resonance i.e., vibration occurs in the vibrating system of the vehicle at a level causing vibrational noise of the vehicle to exceed a given value. This determination is made based on whether or not, for instance, the actual engine speed $N_E$ exceeds the given engine speed area $N_{ER}$ involved in the vibrational noise incidence area. If the determination in step S4 is positive, then, in step S5 corresponding to the switching control means 50, the switching clutch C0 or the switching brake B0 is uncoupled, rendering the shifting state of the differential portion 11 operative to be preferentially (forcibly) placed in the continuously variable shifting state for at least the given time period Ts.

If the determination in step S3 is negative, then, in step (not shown) corresponding to the switching control means 50, the shifting state of the differential portion 11 is maintained in the continuously variable shifting state. When this takes place, the switching control means 50 is rendered inoperative or is inhibited to switch the differential portion 11 to the step-variable shifting state for at least the given time period Ts.

If the determination in step S2 is positive, the determination in step S3 is negative or the determination in step S4 is negative, or the determination in step S6 consecutive to step S5 corresponding to the engine start and stop control means 80 is negative, then, the start-up of the engine 8 is effectuated. When this takes place, the first electric motor M1 is turned on to rapidly increase the rotating speed $N_{M1}$ so as to allow the engine speed to rapidly transit the given engine speed area $N_{ER}$ under which the vehicle is liable to undergo vibrational noise exceeding the given level to cause the occurrence of resonance in the vibrating system of the vehicle. This allows the engine speed $N_E$ to be rapidly raised to a level exceeding the given engine speed $N_E'$ so as to suppress vibrational noise, which would occur during the start-up of the engine 8, upon which the fuel injection device 98 supplies fuel to the engine and the ignition device 99 initiates the ignition of air-fuel mixture for thereby starting up the engine 8.

However, if the determination in step S2 is positive, then, the power transmitting path between the engine 8 and the drive wheels 38 is placed in the power transmission cut-off state. In such a case, it is conceived that the vibrating system of the vehicle is hard to encounter resonance with the resultant difficulty for vibrational noise to be transferred. Thus, no need arises for the engine speed $N_E$ to be raised to the level exceeding the given engine speed $N_E'$. Moreover, under a situation where the determination in step S4 is negative, if the engine speed $N_E$ already increases to the level exceeding the given engine speed $N_E'$, no need arises for the engine speed $N_E$ to be raised to the level exceeding the given engine speed $N_E'$ using the first electric motor M1. At this moment, the fuel injection device 98 operates intact to supply fuel to the engine and the ignition device 99 ignites air-fuel mixture for thereby initiating the start-up of the engine 8.

A time period from $t_2$ to $t_4$ in FIG. 12 represents the given time period Ts, set forth above, for which the differential portion 11 is rendered inoperative or is inhibited to be switched to the step-variable shifting state. During such given time period Ts, the rotating speed $N_{M1}$ of the first electric motor M1 is rapidly raised to increase the engine speed $N_E$ to the level exceeding the given engine speed $N_E'$. At time instant $t_4$ at which the engine speed lies at the given engine speed $N_E'$, fuel is supplied to the engine 8 and the air-fuel mixture is ignited. This suppresses the occurrence of vibrational noise of the vehicle during start-up of the engine 8.

With the illustrated embodiment shown in FIG. 12, the given time period Ts represents a time interval starting from timing at which the start-up of the engine 8, that is, the rising of the engine speed $N_E$ with the use of the first electric motor M1 is initiated, to timing at which the start-up of the engine 8 is completed, that is, the fuel supply and the ignition are actually initiated. As designated by a broken line B in FIG. 12, however, the given time period Ts may be prolonged in an additional given time period B, obtained on preliminarily experimental tests, which acts as a time allowance for the engine 8 to be stabled in an operating condition after the start-up operation of the engine 8 has been completed. Moreover, the given time period Ts may include the given start-up time A required for the engine 8 to be completely started up after the start-up operation of the engine 8 is commenced.

With the illustrated embodiment, as set forth above, upon operation of the engine start and stop control means 80 for starting up the engine 8, the switching control means 50 allows the shifting state of the differential portion 11 to be placed in continuously variable shifting state, or allows the switching clutch C0 or the switching brake B0 to be uncoupled to cause the shifting state of the differential portion 11 to be preferentially (forcibly) placed in the continuously variable shifting state. As a result, the engine speed $N_E$ is rapidly raised to the level exceeding the given engine speed $N_E'$ to rapidly transit the given engine speed area $N_{ER}$ thereby enabling the suppression of vibrational noise of the vehicle during the start-up of the engine 8. This differs from step-variable sifting state of the differential portion 11 wherein the engine speed $N_E$ is restricted with the vehicle speed V.

With the illustrated embodiment, further, the engine start and stop control means 80 rapidly raises the engine speed $N_E$ to the level exceeding the given engine speed $N_E'$ using the first electric motor M1. As a result, upon the start-up of the engine 8, the actual engine speed $N_E$ can rapidly transit the given engine speed $N_{ER}$.

With the illustrated embodiment, furthermore, the switching control means 50 allows the shifting state of the differential portion 11 to be placed in continuously variable shifting state when during the start-up of the engine 8, vibrational noise of the vehicle is higher than the given level, that is, when the engine speed transits the given engine speed $N_{ER}$. As a result, during the start-up of the engine 8, the engine speed can rapidly transit the given engine speed $N_{ER}$, thereby enabling the suppression of vibrational noise of the vehicle during the start-up of the engine 8.

With the illustrated embodiment, moreover, the switching control means 50 allows the shifting state of the differential portion 11 to be placed in continuously variable shifting state when the power transmitting path from the engine 8 to the drive wheels 38 is placed in the power transmissive state. As a result, the engine speed can rapidly transit the given engine speed $N_{ER}$, thereby enabling the suppression of vibrational noise of the vehicle during the start-up of the engine 8. This differs from a case wherein with the power transmitting path placed in the power transmissive state, the shifting state of the differential portion 11 is placed in the continuously variable shifting state and the engine speed $N_E$ is restricted with the vehicle speed V.

With the illustrated embodiment, in addition, the switching control means 50 allows the shifting state of the differential portion 11 to be placed in continuously variable shifting, state until the engine start and stop control means 80 completes the start-up operation of the engine 8. As a result, the engine speed $N_E$ can rapidly transit the given engine speed $N_{ER}$, thereby enabling the suppression of vibrational noise of the vehicle during the start-up of the engine 8.

With the illustrated embodiment, further, the switching control means 50 allows the shifting state of the differential portion 11 to be placed in continuously variable shifting state for the given start-up time interval A, required for the start-up of the engine 8 to be effectuated, subsequent to the commencement of the start-up operation of the engine 8 initiated by the engine start and stop control means 80. As a result, the engine speed $N_E$ can rapidly transit the given engine speed $N_{ER}$, thereby enabling the suppression of vibrational noise of the vehicle during the start-up of the engine 8.

Second Embodiment

Now, another embodiment of the present invention will be described below. Also in the following description, like references characters designate like or corresponding parts common to the embodiments throughout the several views to omit redundant description.

While the foregoing illustrated embodiment has been described with reference to the basic sequence of control operations executed for preventing the vehicle from encountering vibrational noise at the level exceeding the given value during the start-up of the engine, reference is now made to the present embodiment with reference to a basic sequence of control operations executed for a halt of the engine, that is, for preventing the vehicle from encountering vibrational noise at a level exceeding a given value during the halt of the engine with the vehicle remaining under a running condition.

Figure 13:
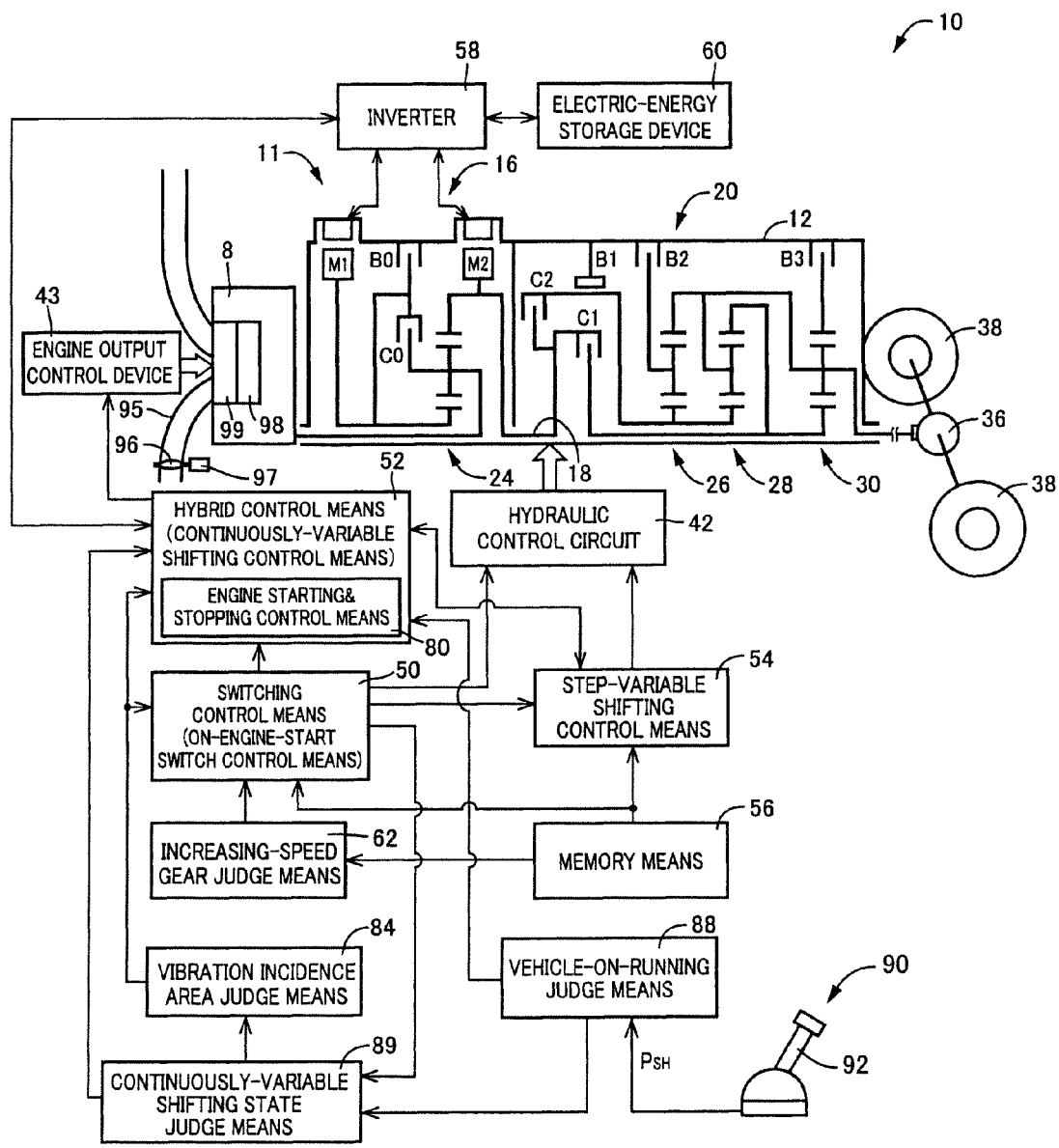
FIG. 13 is a functional block diagram explaining a main part of the control operation of the electronic control apparatus shown in FIG. 4, corresponding to FIG. 6.

FIG. 13 is a functional block diagram, illustrating an essence of a control function to be executed by the electronic control device 40, which is equivalent to that of FIG. 6. With the illustrated embodiment set forth above, under a circumstance where the hybrid control means 52 determines that the engine halted condition is established, the engine start and stop control means 80 functioning as the engine stop control means, operates to cause the fuel injection device 98 to thereby interrupt the supply of fuel to the engine 8. That is, the engine start and stop control means 80 performs the fuel cutoff operation to halt the engine 8.

With the present embodiment, the engine start and stop control means 80 is configured to performs the operation, in addition to the operation described above, so as to enable the engine speed to immediately transit the given engine speed $N_{ER}$ for suppressing the occurrence of vibration and/or noise of the vehicle during a halting operation of the engine 8. In particular, during the halt of the engine, the first electric motor M1 is turned on to rapidly lower the rotating speed $N_{M1}$ thereof to positively cause the engine speed $N_E$ to a level lower than the given engine speed $N_{ER}$. This allows the engine speed $N_E$ to rapidly transit the given engine speed $N_{ER}$ to suppress vibrational noise of the vehicle during the halt of the engine 8, in contrast to a case where the halt of the engine 8 is effectuated by performing the fuel cutoff operation so as to cause the engine speed $N_E$ to drop in nature to a rotationally halted condition, that is, a zeroed level.

Figure 14:
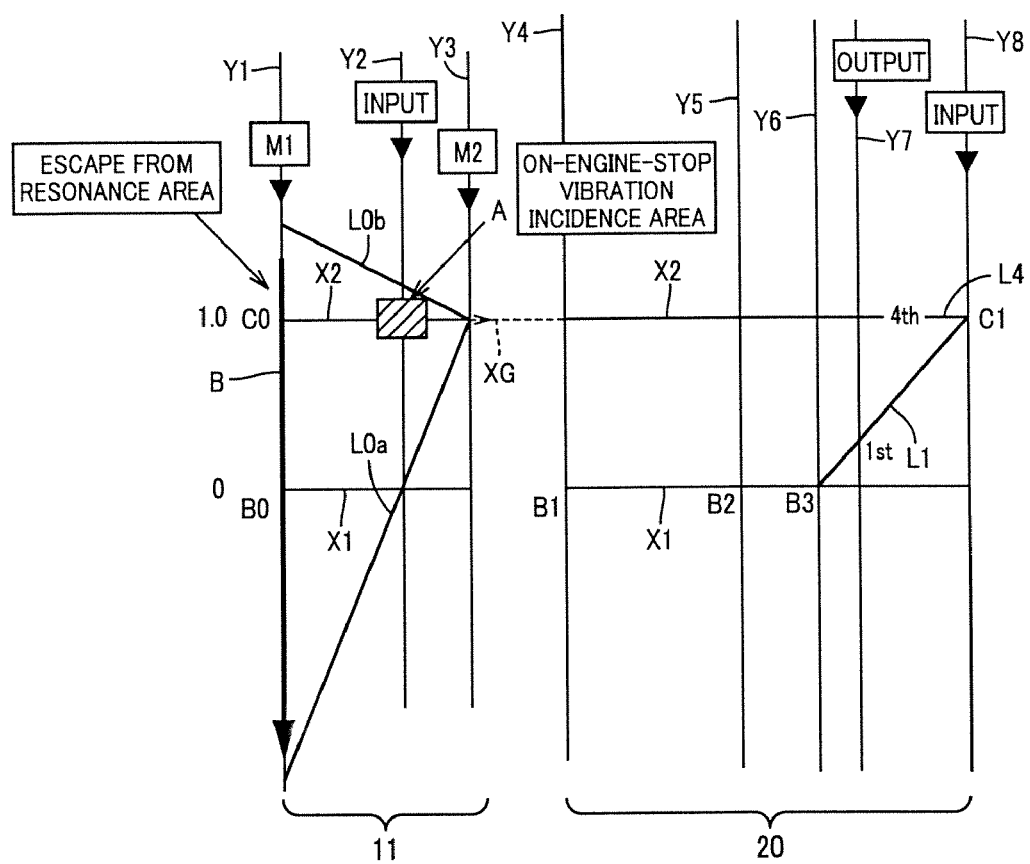
FIG. 14 is a view showing one sample illustrating operations, in which the engine speed transits the vibration generating region in which the vehicle encounters vibration and/or noise at the level exceeding the given value and the vibration generating region in which the engine speed transits vibration generating region using the first electric motor during a halt of the engine, which are plotted on a collinear chart corresponding to that shown in FIG. 3.

FIG. 14 is a view showing an exemplary case, illustrating the vibration incidence area A where the given engine speed $N_{ER}$, that is, vibrational noise of the vehicle exceeds a given value, and the operation where the engine speed $N_E$ transits the vibration incidence area A during the halt of the engine, which corresponds to the collinear chart shown in FIG. 3. FIG. 14 is a collinear chart representing a case wherein the transmission mechanism 10 is placed in the 1st- and 4th-gear positions, corresponding to FIG. 8.

In FIG. 14, a straight line L0*b* represents the engine running i.e., driving mode before the operation is switched to the motor running mode, and a straight line L0*a* represents the motor running mode under the halted condition of the engine. Further, the hatched area A, shown in FIG. 14 and representing the vibrational incidence area A, is present in an area below the given engine speed $N_E{}'$. Moreover, it will be turned out that since the rotating speed $N_{M2}$ (the rotating speed of the first ring gear R1 and the rotating speed on the vertical line Y3) of the second electric motor M2 is uniquely determined with the speed ratio γ of the automatic transmission portion 20, the engine speed $N_E$ is hard to be rapidly lowered with the use of the second electric motor M2. Upon the halt of the engine, the engine start and stop control means 80 controls the engine speed $N_E$ to rapidly transit the vibrational incidence area A, in the process of variation in the engine speed $N_E$ from the straight line L0*b* to the straight line L0*a*. This allows the engine speed $N_E$ to be positively (rapidly) raised using the first electric motor M1.

As set forth above, the transmission mechanism 10 of the present embodiment can be selectively switched to the continuously variable shifting state and the non-continuously variable shifting state. The switching control means 50 determines based on the vehicle condition to find the shifting state of the differential portion 11 to be switched, upon which the differential portion 11 is selectively switched to any one of the continuously variable shifting state and the non-continuously variable shifting sate (step-variable shifting state).

In the continuously variable shifting state of the differential portion 11, the relevant electrically controlled CVT function is performed to control the engine speed $N_E$ with no restriction from the vehicle speed V, in other words, the rotating speed of the transmitting member 18. Therefore, during the halt of the engine, the engine speed $N_E$ is rapidly decreased using the first electric motor M1 such that the engine start and stop control means 80 causes the engine speed $N_E$ to rapidly transit the given engine speed $N_{ER}$.

However, with the differential portion 11 placed in the step-variable shifting state, the power transmitting path between the engine 8 and the drive wheels 38 is mechanically established and the engine speed $N_E$ is restricted with the vehicle speed V. Thus, no engine speed $N_E$ can be freely controlled. For this reason, in contrast to the situation under which the differential portion 11 is placed in the continuously variable shifting state, the engine speed $N_E$ cannot be rapidly raised using the first electric motor M1 such that the engine start and stop control means 80 allows the engine speed $N_E$ to rapidly transit the given engine speed $N_{ER}$. Accordingly, a probability exists for the vehicle to encounter vibrational noise at a level exceeding a given value during the halt of the engine. Such a probability occurs during, for instance, the halt of the engine where the differential portion 11 placed in the step-variable shifting state, the vehicle runs at a decelerated speed with the accelerator pedal being released during the running of the vehicle.

Therefore, under a circumstance where the hybrid control means 52 determines that the engine halt condition is established and subsequently places the differential portion 11 in the continuously variable shifting state upon the operation of the engine start and stop control means 80 to halt the engine 8, the switching control means 50 performs the operation, in place of the function as the engine start-up switch control means described above or in addition thereto, to place the differential portion 11 in the continuously variable shifting state. That is, the switching control means 50 functions as the engine start-up switch control means operative to maintain the shifting state of the differential portion 11 in the continuously variable shifting state or uncoupling the switching clutch C0 or the switching brake B0 to preferentially (forcibly) place the shifting state of the differential portion 11 in the continuously variable shifting state. This is because the engine start and stop control means 80 is rendered operative to allow the engine speed $N_E$ to rapidly transit the given engine speed $N_{ER}$.

However, under a circumstance where the hybrid control means 52 determines that the engine halt condition is established after which the engine start and stop control means 80 initiates the halting of the engine 8, the power transmitting path from the engine 8 to the drive wheels 38 is placed in the power transmission cutoff state i.e., interrupted state under situation described below. Under such situations, even if the differential portion 11 is placed in the step-variable shifting state, no mechanical power transmitting path is established between the engine 8 and the drive wheels 38 and the engine speed $N_E$ can be controlled with no restriction from the vehicle speed V.

Therefore, during the halt of the engine under the circumstance where the power transmitting path is placed in the power transmission cutoff state, the engine start and stop control means 80 allows the engine speed $N_E$ to rapidly transit the given engine speed $N_{ER}$, regardless of whether the differential portion 11 is placed in the continuously variable shifting state or the step-variable shifting state. The operation of the switching control means 50 to switch the differential portion 11 to the continuously variable shifting state is supposed to occur in a phase where the engine is halted during the running of the vehicle.

Vehicle-on-running judge means 88 judges whether or not the vehicle is under a running state, based on whether the shift level 92 is placed in the position "D" or the position "M". That is, such determination is made based on whether or not the shift lever is placed in the drive position where the power transmitting path from the engine 8 to the drive wheels 38 is placed in the power transmissive state, and whether or not the vehicle speed V is higher than a predetermined given value that is preset for the determination to be made that the vehicle is under the running state.

Under a circumstance where the hybrid control means 52 determines that the engine halt condition is established upon which the engine start and stop control means 80 initiates the halting of the engine 8, if the vehicle-on-running judge means 88 judges that the vehicle is under the running state, then, the switching control mean 50 allows the differential portion 11 to be placed in the continuously variable shifting state. Thus, the engine start and stop control means 80 allows the engine speed $N_E$ to rapidly transit the given engine speed $N_{ER}$. More particularly, the switching control means 50 maintains the shifting state of the differential portion 11 in the continuously variable shifting state or uncouples the switching clutch C0, or the switching brake B0 to preferentially (forcibly) place the shifting state of the differential portion 11 in the continuously variable shifting state.

Meanwhile, under a circumstance where the hybrid control means 52 determines that the engine halt condition is established upon which the engine start and stop control means 80 initiates the halting of the engine 8, there is a probability in which no vibrational noise occurs on the vehicle at the level exceeding the given value. In this case, no need arises for the engine start and stop control means 80 to allow the differential portion 11 to be preferentially (forcibly) placed in the continuously variable shifting state so as to cause the engine speed $N_E$ to rapidly transit the given engine speed $N_{ER}$.

As used herein the term "probability in which no vibrational noise occurs on the vehicle at the level exceeding at the given value" refers to a phase in which the engine speed $N_E$ already falls below the given engine speed $N_{ER}$ during the halt of the engine. In such a phase, no probability takes place for the engine speed $N_E$ not to transit the given engine speed $N_{ER}$ during the operation of the engine start and stop control means 80 to lower the engine speed $N_E$ toward the rotationally halt condition. In other words, in a case where the engine speed $N_E$ exceeds the given engine speed $N_{ER}$ upon halt of the engine, the engine speed $N_E$ transits the given engine speed $N_{ER}$ upon operation of the engine start and stop control means 80 to lower the engine speed $N_E$. Thus, a probability occurs with the vehicle encountering vibrational noise exceeding the given value.

During the operation of the hybrid control means 52 determining that the engine halt condition is established after which the engine start and stop control means 80 initiates the halting of the engine 8, the vibration incidence area judge means 84 performs the operation, in place of the function described above or in addition thereto, to determine whether or the vibrating system of the vehicle encounters a resonance causing the vehicle to encounter vibrational noise exceeding the given value. That is, such a determination is made based on whether or not the engine speed transits the given engine speed area $N_{ER}$ acting as the vibration incidence area, that is, for instance, whether or not the actual engine speed exceeds the given engine speed area $N_{ER}$.

Under a circumstance where the hybrid control means 52 determines that the engine halt condition is established, and subsequently, the engine start and stop control means 80 initiates the haling of the engine 8, if vibration noise of the vehicle exceeds the given value, then, the vibration incidence area judge means 84 judges that the actual engine speed $N_E$ exceeds the given engine speed $N_{ER}$. When this takes place, the switching control means 50 maintains the shifting state of the differential portion 11 in the continuously variable shifting state, or uncouples the switching clutch C0 or the switching brake B0 to preferentially (forcibly) place the shifting state of the differential portion 11 in the continuously variable shifting state such that the engine start and stop control means 80 allows the engine speed $N_E$ to rapidly transit the given engine speed area $N_{ER}$.

As used herein, the phase under which the engine speed $N_E$ already falls below the given engine speed $N_{ER}$ upon halt of the vehicle may be supposed to include a case wherein, for instance, the power transmitting path from the engine 8 to the drive wheels 38 remains in the power transmissive state and the differential portion 11 is placed in the step-variable shifting state. In this moment, during the running of the vehicle under the step-variable shifting state, the vehicle speed V lies at a low speed and the total speed ratio γ0 is low (at the high vehicle-speed-side gear ratio) with the engine speed $N_E$, restricted by the vehicle speed V, remaining at a speed lower than the given engine speed $N_{ER}$.

In such a case, the engine start and stop control means 80 need not forcibly raise the engine speed $N_E$ using the first electric motor M1, and halts the engine 8 with halting the fuel supply by the fuel supply device 98.

The hybrid control means 52 determines that the engine halt condition is established, and subsequently, the engine start and stop control means 80 initiates the halting of the engine 8. A case where the vehicle-on-running judge means 88 judges that the vehicle is under the running state will be explained. In this case, continuously variable shifting state determining means 89 determines whether or not the power distributing mechanism 16 is placed in the differential state, that is, whether or not the differential portion 11 is placed in the continuously variable shifting state. The determinations as to whether or not the differential portion 11 is placed in the continuously variable shifting state is made based on whether or not, for instance, the switching control means 50 places the transmission mechanism 10 in the continuously variable shifting state.

If the continuously variable shifting state determining means 89 determines that the power distributing mechanism 16 is not placed in the continuously variable shifting state, then, the vibration incidence judge means 84 judges whether or not vibrational noise encountered with the vehicle exceeds the given level.

When the halting of the engine 8 is initiated, the switching control means 50 executes the operation to maintain the shifting state of the differential portion 11 in the continuously variable shifting state, or preferentially (forcibly) place the shifting state of the differential portion 11 in the continuously variable shifting state at least for a given time interval $T_D$. That is, the switching control means 50 is rendered inoperative to switch the differential portion 11 in the step-variable shifting state at least for the given time interval $T_D$.

As used herein, the term "given time interval $T_D$" refers to, for instance, the given halt time interval A, preliminarily and experimentally acquired and stored as a time interval required for the engine 8 to be halted, which starts from timing at which the halting of the engine 8 is commenced, that is, when the first electric motor M1 is actuated to effectuate the reduction of the engine speed $N_E$, to timing at which the engine speed $N_E$ is actually reduced to the rotating halt condition. In an alternative, the given time interval $T_D$ may be the given halt time interval B, preliminarily and experimentally acquired and stored as a time interval required for the engine 8 to be halted, in which after the halting of the engine 8 has begun and the engine speed $N_E$ is actually lowered to a level below the given engine speed $N_{ER}$.

That is, the switching control means 50 maintains the shifting state of at least the differential portion 11 in the continuously variable shifting state until the engine start and stop control means 80 completes the halting of the engine 8.

Figure 15:
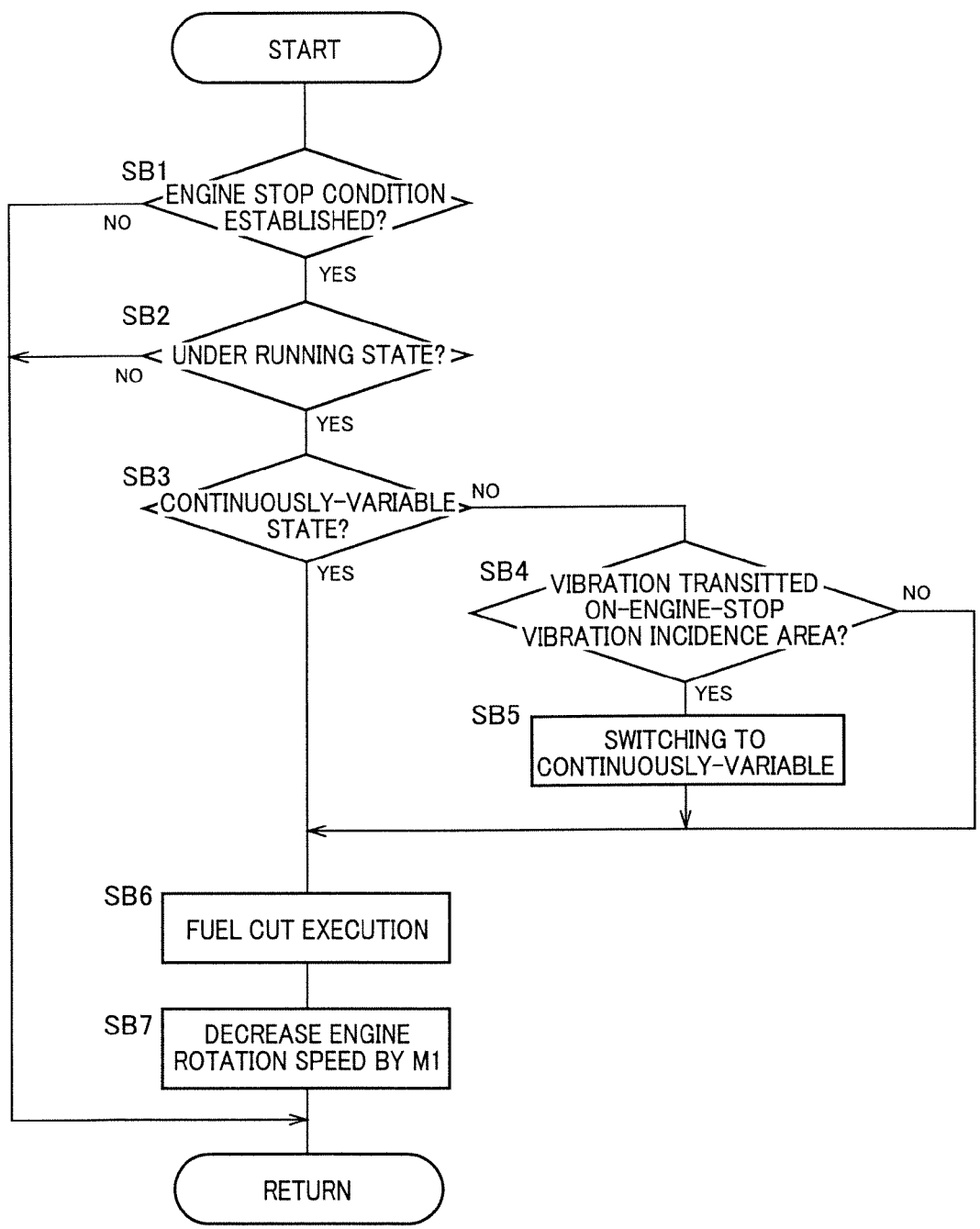
FIG. 15 is a flowchart illustrating a basic sequence of control operations to be executed with the electronic control apparatus shown in FIG. 13, that is, control operations to be executed not to cause the vehicle to encounter vibration and noise at a level exceeding a given value during a halt of the vehicle.

FIG. 15 is a flowchart illustrating an essence of a basic sequence of control operations to be executed by the electronic control device 40, that is, a basic sequence of control operations to be executed for preventing the vehicle from encountering vibrational noise exceeding the given value during the halt of the engine. This basic sequence is repeatedly executed for an extremely short cycle time in the order of, for instance, several milliseconds to several tens milliseconds.

Figure 16:
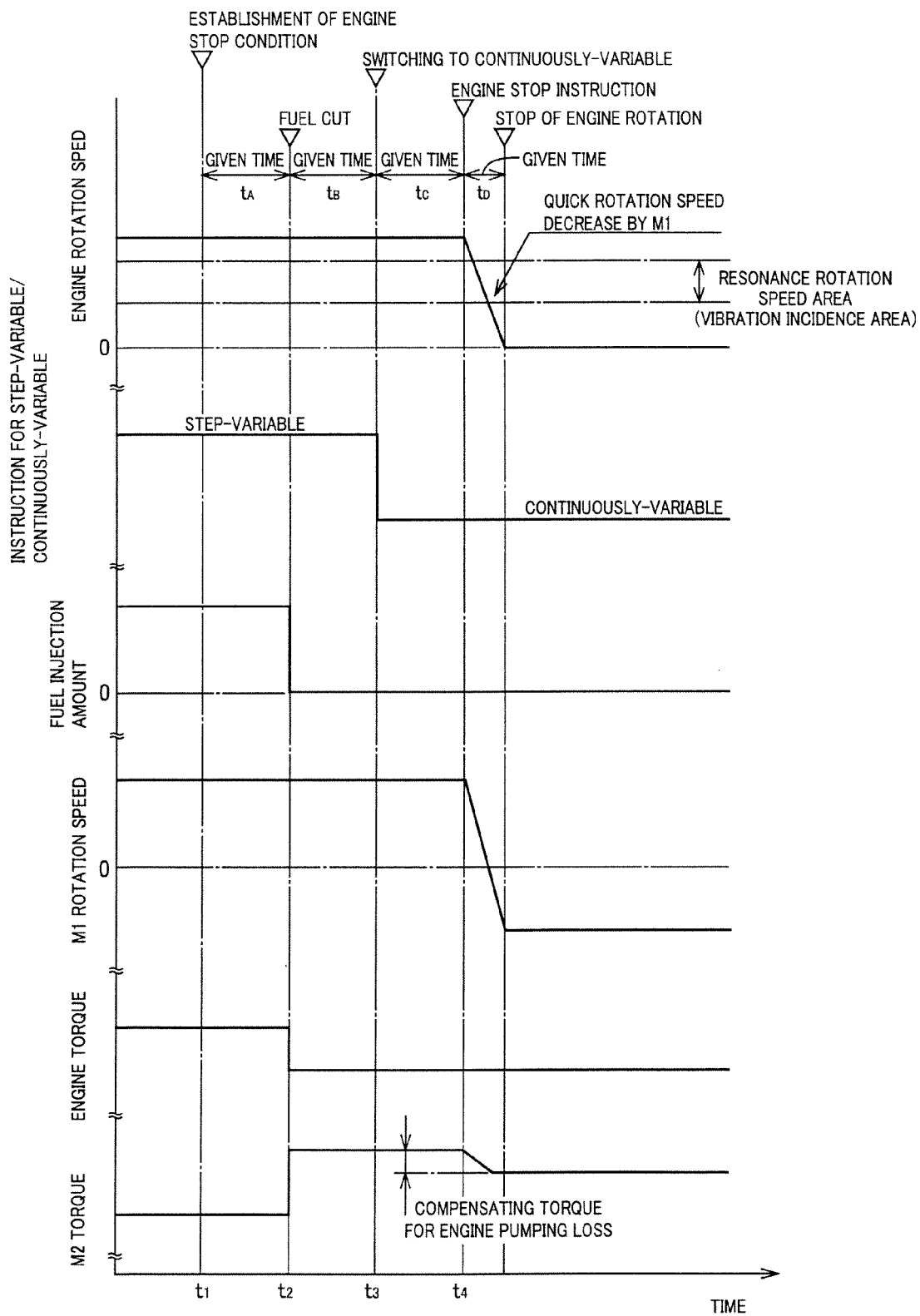
FIG. 16 is a timing chart illustrating the control operations shown in the flowchart shown in FIG. 15. This represents an example wherein releasing the accelerator pedal during the running of the vehicle in the engine running mode with the differential portion placed in the continuously variable shifting state allows the determination to be made for fuel cut-off that the engine is to be halted.

Further, FIG. 16 is a timing chart illustrating the control operations represented in the flowchart shown in FIG. 15. This flowchart represents an exemplary case wherein the accelerator pedal is released during the running of the vehicle under the engine running mode with the differential portion 11 remaining in, for instance, the step-variable shifting state, so that the determination is made that the engine is halted due to the fuel-cutoff operation.

First, in step SB1 corresponding to the hybrid control means 52, the determination is made whether or not the engine halt condition is established for the engine 8 to be halted. The engine halt condition is determined to be established when, for instance, the accelerator pedal is released in accel-off. At time instant $t_1$ in FIG. 16, the determination is made that the halt condition of the engine 8 is established due to accel-off.

If the determination in step SB1 is negative, then, the current routine is terminated. In contrast, if the determination in step SB1 is positive, then, in step SB2 corresponding to the vehicle-on-running judge means 88, the judgment is made whether or not the vehicle is under the running state. If the determination in step SB2 is negative, then, the current routine is terminated. In contrast, if the determination in step SB2 is positive, then, in step SB3 corresponding to the continuously variable shifting state determining means 89 determines whether or not the power distributing mechanism 16 is placed in the differential state, that is, whether or not the differential portion 11 is placed in the continuously variable shifting state. This determination is made based on whether or not the switching control means 50 causes the transmitting mechanism 10 to be placed in the continuously variable shifting state.

If the determination in step SB3 is negative, then, in step SB4 corresponding to the vibration incidence judge means 84, the judgment is made whether or not the resonance exists in the vibrating system of the vehicle causing the vehicle to encounter vibrational noise exceeding the given level. This determination is made based on whether or not the actual engine speed $N_E$ exceeds the given engine speed $N_{ER}$.

If the determination in step SB4 is positive, then, in step SB5 corresponding to the switching control means 50, the switching clutch C0 or the switching brake B0 is uncoupled. Under such an uncoupling state, the shifting state of the differential portion 11 is preferentially (forcibly) placed in the continuously variable shifting state at least for the given time interval $t_D$.

If the determination in step SB3 is positive, then, in step (not shown) corresponding to the switching control means 50, the shifting state of the differential portion 11 is maintained in the continuously variable shifting state. When this takes place, the switching control means 50 is disenabled to cause the differential portion 11 to switch the shifting state of the differential portion 11 to the continuously variable shifting state at least for the given time interval $t_D$.

If the determination in step SB3 is positive or if the determination in step SB4 is negative, or in step SB6, subsequent to step SB5, which corresponds to the engine start and stop control means 80, the fuel injection device 98 interrupts the supply of fuel to the engine 8. This means the halting of the engine 8 due to the fuel-cutoff operation. In step SB7, subsequent to step SB6, which corresponds to the engine start and stop control means 80, the engine speed $N_E$ can rapidly transit the given engine speed $N_{ER}$, thereby suppressing the occurrence of vibration and/or noise upon halt of the engine. More particularly, the first electric motor M1 is turned on to rapidly decrease the rotating speed $N_{M1}$ thereof. This positively allows the engine speed $N_E$ to rapidly decrease to a level below the given engine speed $N_{ER}$, thereby halting the engine 8.

The fuel-cutoff operation, executed in step SB6, may be executed when the determination in step SB2 is found to be positive. In such a case, the operation in step SB3 is executed in succession to the operation in step SB6.

At time instant $t_2$ in FIG. 16, the fuel-cutoff operation is executed for halting the engine 8 after an elapse of a predetermined given time $T_A$ when the halt condition of the engine 8 is established due to accel-off. FIG. 16 represents an embodiment in which the fuel-cutoff operation is executed in step SB6 in the flowchart of FIG. 15, as set forth above, when the determination in step SB2 is positive. At time instant $t_3$ in FIG. 16, further, a command is output to the differential portion 11 to be placed in the continuously variable shifting state after an elapse of a predetermined given time period $t_B$, after the fuel-cutoff operation is commenced for halting the engine 8

At time instant $t_4$ in FIG. 16, furthermore, a command is output to the inverter 58 causing the first electric motor M1 to positively lower the engine speed $N_E$ to the rotating halt condition. This command is output after an elapse of a predetermined given time interval $T_c$ when the command is output to the differential portion 11 to be switched to the continuously variable shifting state. During the time interval $t_D$ for the shifting state of the differential portion 11 to be maintained in the continuously variable shifting state since the time instant $t_4$, the rotating speed $N_{M1}$ of the first motor M1 is rapidly lowered. This positively causes the engine speed $N_E$ to rapidly decrease to a level below the given engine speed $N_{ER}$. Thus, the engine 8 is halted, which suppresses the occurrence of vibrational noise during the halt of the engine 8.

With the illustrated embodiment sown in FIG. 16, the given time interval $t_D$ represents a given halt time A starting from timing at which the command is output to halt the engine 8, that is, the first electric motor M1 is turned on to execute the reduction of the engine speed $N_E$, to timing at which the halt of the engine 8 is completed. However, the given time interval $t_D$ may be a given halt time C starting from timing at which the command is output to the differential portion 11 to be switched to the continuously variable shifting state to timing at which the halt of the engine 8 is completed.

As represented by a time period from time instant $t_2$ to time instant 4, further, the second electric motor M2 may be turned on to increase output torque with compensating a pumping loss or the like caused by a drag of the engine 8 subjected to the fuel-cutoff operation.

With the illustrated embodiment, as set forth above, during the operation of the engine start and stop control means 80 to halt the engine 8, the switching control means 50 maintains the shifting state of the differential portion 11 in the continuously variable shifting state, or uncouples the switching clutch C0 or the switching brake B0 to cause the shifting state of the differential portion 11 to be preferentially (forcibly) placed in the continuously variable shifting state. As a result, the engine speed $N_E$ can rapidly transit the given engine speed $N_{ER}$ and decreases to a level below the same, thereby suppressing the occurrence of vibrational noise of the vehicle during the halt of the engine 8. This phase is different from the step-variable shifting state of the differential portion 11 wherein the engine speed $N_E$ is probable to be restricted with the vehicle speed V.

With the illustrated embodiment, further, the engine start and stop control means 80 decreases the engine speed $N_E$ to the level below the given engine speed $N_{ER}$ using the first electric motor M1. As a result, during the halt of the engine 8, the actual engine speed $N_E$ can rapidly transit the given engine speed $N_{ER}$.

With the illustrated embodiment, furthermore, under a circumstance where during the halt of the engine 8, if the vehicle encounters vibrational noise exceeding the given level, that is, when the engine speed $N_E$ transits the given engine speed $N_{ER}$, the switching control means 50 allows the shifting state of the differential portion 11 to be placed in the continuously variable shifting state. As a result, during the halt of the engine 8, the actual engine speed $N_E$ can rapidly transit the given engine speed $N_{ER}$, thereby suppressing the occurrence of vibrational noise of the vehicle.

With the illustrated embodiment, moreover, under a circumstance where the power transmitting path from the engine 8 to the drive wheels 38 is placed in the power transmissive state, that is, during, for instance, the traveling of the vehicle, the switching control means 50 allows the shifting state of the differential portion 11 to be placed in the continuously variable shifting state. As a result, the actual engine speed $N_E$ can rapidly transit the given engine speed $N_{ER}$, thereby suppressing the occurrence of vibrational noise of the vehicle during the halt of the vehicle. This phase is different from a case wherein the differential portion 11 is placed in the step-variable shifting state, when the power transmitting path from the engine 8 to the drive wheels 38 is placed in the power transmissive state, and the engine speed $N_E$ is restricted with the vehicle speed V.

With the illustrated embodiment, further, the switching control means 50 allows the shifting state of the differential portion 11 to be maintained in the continuously variable shifting state, until the engine start and stop control means 80 completes the operation to halt of the engine 8. As a result, during the halting operation of the engine 8, the engine speed $N_E$ can rapidly transit the given engine speed $N_{ER}$, thereby suppressing the occurrence of vibrational noise of the vehicle.

With the illustrated embodiment, in addition, the switching control means 50 allows the shifting state of the differential portion 11 to be maintained in the continuously variable shifting state for the given halt time A required for the engine start and stop control means 80 to begin the halting of the engine 8 and to completely halt the engine 8. As a result, during the halt of the engine 8, the engine speed $N_E$ can rapidly transit the given engine speed $N_{ER}$, thereby suppressing the occurrence of vibrational noise of the vehicle during the halt of the engine 8.

Embodiment 3

Figures 17, 18:
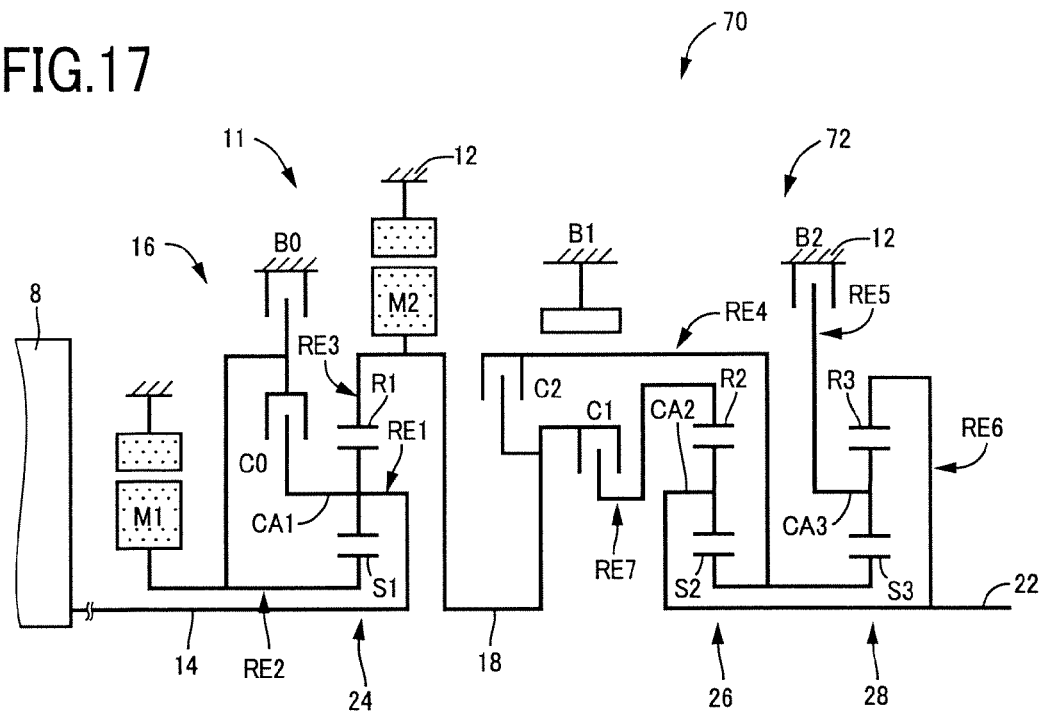
FIG. 17 is a skeleton view explaining a drive apparatus of a hybrid vehicle according to other embodiment of the present invention, corresponding to FIG. 1.
FIG. 18 is an operation Table indicating a relation between a shifting operation of the drive apparatus of the hybrid vehicle of the embodiment shown in FIG. 17 operable in a continuously variable shifting state or a step-variable shifting state, and operation combinations of hydraulic-type frictionally coupling devices used therefore, corresponding to FIG. 2.
Figure 19:
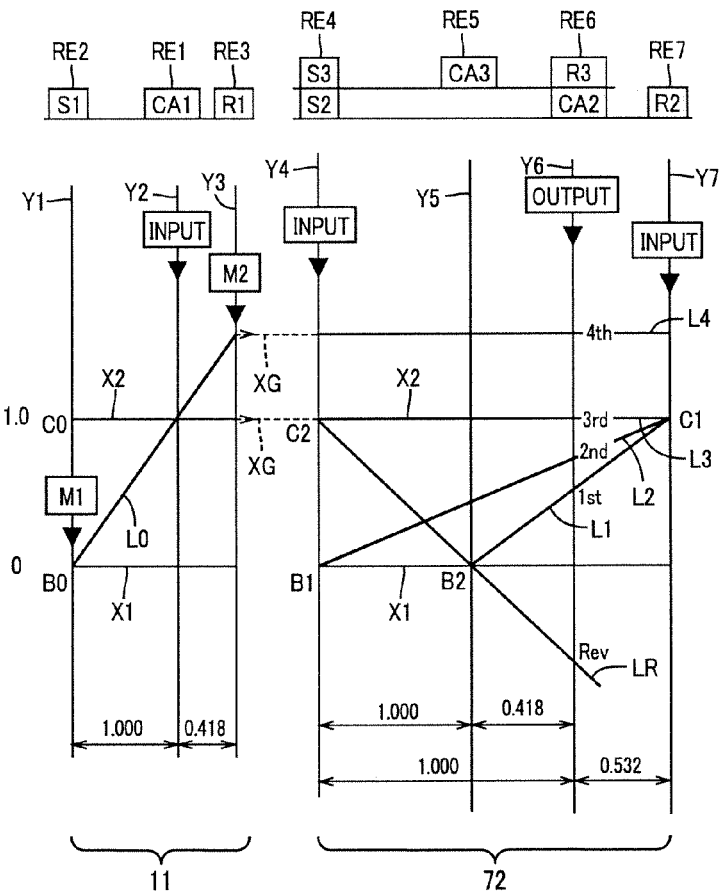
FIG. 19 is a collinear chart showing relative rotating speeds of rotary elements in each of different gear positions when the drive apparatus of the hybrid vehicle of the embodiment shown in FIG. 17 is operated in the step-variable shifting state, corresponding to FIG. 3.

FIG. 17 is a skeleton view explaining structure of a transmission mechanism i.e., shifting mechanism 70 according to other embodiment of the present invention. FIG. 18 is an operation Table indicating a relation between a shifting position of the transmission mechanism 10, and operation combinations of hydraulic-type frictionally coupling devices used therefor. FIG. 19 is a collinear chart explaining a shifting operation of the transmission mechanism 70.

Like the illustrated embodiment described above, the transmission mechanism 70 comprises the differential portion 11 including the first electric motor M1, the power distributing mechanism 16 and the second electric motor M2, and an automatic transmission portion 72 with three forward-gear positions connected to the differential portion 11 and the output shaft 22 in series via the transmitting member 18. The power distributing mechanism 16 includes the first planetary gear unit 24 of the single pinion type having a given speed ratio ρ1 of, for instance, about 0.418, the switching clutch C0 and the switching brake B0. The automatic transmission portion 72 includes the second planetary gear unit 26 of the single pinion type having a given speed ratio ρ2 of, for instance, about 0.532, and the third planetary gear unit 28 of the single pinion type having a given speed ratio ρ3 of, for instance, about 0.418.

The sun gear S2 of the second planetary gear unit 26 and the sun gear S3 of the third planetary gear unit 28 are integrally connected to each other. These sun gears S2 and S3 are selectively coupled to the transmitting member 18 via the second clutch C2 and also selectively coupled to the case 12 via the first brake B1. The second carrier CA2 of the second planetary gear unit 26 and the third ring gear R3 of the third planetary gear unit 28 integrally connected to each other are connected to the output shaft 22. The second ring gear R2 is selectively connected to the transmitting member 18 via the first clutch C1, and the third carrier CA3 is selectively coupled to the case 12 via the second brake B2.

With the transmission mechanism 70 thus constructed, the switching clutch C0, the first clutch C1, the second clutch C2, the switching brake B0, the first brake B1 and the second brake B2 are selectively coupled as shown by, for instance, the operation Table shown in FIG. 18. One of a 1st-gear position (1st-speed position) to a 4th-gear position (4th-speed position), a reverse-gear position (rear-drive position) or a neutral position is selectively established. In this moment, each gear position has a speed ratio γ (=input shaft speed $N_{IN}$/output shaft speed $N_{OUT}$) that substantially varies in equal ratio.

In particular, with the present embodiment, the power distributing mechanism 16 incorporates the switching clutch C0 and the switching brake B0. With either the switching clutch C0 or switching brake B0 being coupled, the differential portion 11 can be structured to assume the continuously variable shifting state operative as the continuously variable transmission and, in addition thereto, the fixed shifting state operative as a transmission with a fixed speed ratio. Accordingly, with either the switching clutch C0 or switching brake B0 brought into coupling engagement, the transmission mechanism 70 can take a structure for the step-variable shifting state operative as the step-variable transmission with the differential portion 11 placed in the fixed shifting state, and the automatic transmission portion 72.

With both the switching clutch C0 and switching brake B0 brought into uncoupling states, the transmission mechanism 70 can take the continuously variable shifting state operative as the electrically controlled continuously variable transmission with the differential portion 11 placed in the continuously variable shifting state, and the automatic transmission portion 72. In other words, the transmission mechanism 70 is switched to the step-variable shifting state upon coupling either the switching clutch C0 or the switching brake B0, and switched to the continuously variable shifting state upon uncoupling both the switching clutch C0 and switching brake B0.

For the transmission mechanism 70 to function as the step-variable transmission, as shown for instance in FIG. 18, the switching clutch C0, the first clutch C1 and the second brake B2 are coupled, which establishes the 1st-gear position having the highest speed ratio γ1 of, for instance, about 2.804. With the switching clutch C0, the first clutch C1 and the first brake B1 being coupled, a 2nd-gear position is established with a speed ratio γ2 of, for instance, about 1.531 that is lower than that of the 1 st-gear position. With the switching clutch C0, the first clutch C1 and the second clutch C2 being coupled, a 3rd-gear position is established with a speed ratio γ3 of, for instance, about 1.000 that is lower than that of the 2nd-gear position.

With the first clutch C1, the second clutch C2 and the switching brake B0 being coupled, a 4th-gear position is established with a speed ratio γ4 of, for instance, about 0.705 that is lower than that of the 3rd-gear position. Further, with the second clutch C2 and the second brake B2 being coupled, a reverse-gear position is established with a speed ratio γR of, for instance, about 2.393 that is intermediate between those of the 1 st-gear and 2nd-gear positions. In addition, for the neutral "N" state to be established, for instance, only the switching clutch C0 is coupled.

In contrast, for the transmission mechanism 10 to function as the continuously variable transmission, both the switching clutch C0 and the switching brake B0 are uncoupled as indicated in the operation Table shown in FIG. 18. This allows the differential portion 11 to function as the continuously variable transmission, and the automatic transmission portion 72 connected to the differential portion 11 in series to function as the step-variable transmission. When this takes place, the rotating speed input to the automatic transmission portion 72 for the gear positions placed in the 1st-gear, 2nd-gear and 3rd-gear positions, respectively, that is, the rotating speed of the transmitting member 18, is caused to continuously vary. This allows the respective gear positions to have speed ratios in continuously variable ranges. Accordingly, the automatic transmission portion 72 has a speed ratio that is continuously variable across the adjacent gear positions, causing the transmission mechanism 70 to have the overall speed ratio γT variable in a continuous fashion as a whole.

FIG. 19 shows a collinear chart representing relative relations on the rotating speeds of the rotary elements coupled in differing states for the intended gear positions in the transmission mechanism 70, respectively. The transmission mechanism 70 is structured with the differential portion 11 functioning as the continuously variable shifting portion or first shifting portion, and the automatic transmission portion 72 functioning as the step-variable shifting portion or a second shifting portion. For the switching clutch C0 and the switching brake B0 to be uncoupled, and for the switching clutch C0 or the switching brake B0 to be coupled, the rotary elements of the power distributing mechanism 16 rotate at the same speeds as those stated above.

In FIG. 19, the automatic transmission portion 72 operates on four vertical lines Y4, Y5, Y6 and Y7 corresponding to fourth to seventh rotary elements RE4 to RE7 in order from the left, respectively. The fourth rotary element (fourth element) RE4 represents that the second and third sun gears S2 and S3 are connected to each other. The fifth rotary element (fifth element) RE5 corresponds to the third carrier CA3. The sixth rotary element (sixth element) RE6 represents that the second carrier CA2 and the third ring gear R3 are connected to each other. The seventh rotary element (seventh element) RE7 corresponds to the second ring gear R2. Further, in the automatic transmission portion 72, the fourth rotary element RE4 is selectively connected to the transmitting member 18 via the second clutch C2 and selectively connected to the case 12 via the first brake B1. The fifth rotary element RE5 is selectively connected to the case 12 via the second brake B2.

The sixth rotary element RE6 is connected to the output shaft 22 of the automatic transmission portion 72. The seventh rotary element RE7 is selectively connected to the transmitting member 18 via the first clutch C1.

The automatic transmission portion 72 operates in a manner as shown in FIG. 19. That is, with both the first clutch C1 and the second brake B2 being coupled, an intersection point between an inclined straight line L1 and the vertical line Y6 represents the rotating speed of the output shaft 22 in the 1st-speed position. The inclined straight line L1 passes across an intersection point between the vertical line Y7 indicative of the rotating speed of the seventh rotary element (seventh element) RE7 (R2), and an intersection point between the vertical line Y5 indicative of the rotating speed of the fifth rotary element RE5 (CA3), and a horizontal line X1. The vertical line Y6 represents the rotating speed of the sixth rotary element (sixth element) RE6 (CA2, R3) connected to the output shaft 22.

Likewise, an intersection point between an inclined straight line L2 determined with both the first clutch C1 and the first brake B1 being coupled, and the vertical line Y6 indicative of the rotating speed of the sixth rotary element RE6 connected to the output shaft 22, represents the rotating speed of the output shaft 22 in the 2nd-speed position. An intersection point between a horizontal straight line L3 determined with both the first clutch C1 and the second clutch C2 being coupled, and the vertical line Y6 indicative of the rotating speed of the sixth rotary element RE6 connected to the output shaft 22, represents the rotating speed of the output shaft 22 in the 3rd-speed position.

For the 1st-speed to the 3rd-speed positions, as a result of the switching clutch C0 being coupled, the differential portion 11 inputs drive power to the seventh rotary element RE7 at the same rotating speed as the engine speed $N_E$. However, as the switching brake B0 is coupled in place of the switching clutch C0, the differential portion 11 inputs drive power to the seventh rotary element RE7 at a rotating speed higher than the engine speed $N_E$. Thus, an intersection point between a horizontal straight line L4 determined with the first clutch C1, the second clutch C2 and the switching brake B0 being coupled, and the vertical line Y6 indicative of the rotating speed of the sixth rotary element RE6 connected to the output shaft 22, represents the rotating speed of the output shaft 22 in the 4th-speed position.

Even with the present embodiment, the transmission mechanism 70 includes the differential portion 11, functioning as the continuously variable transmission or the first shifting portion, and the automatic transmission portion 72 functioning as the step-variable transmission or the second shifting portion. This allows the transmission mechanism 70 to have the same advantageous effects as those of the embodiment described above.

Fourth Embodiment

Figure 20:
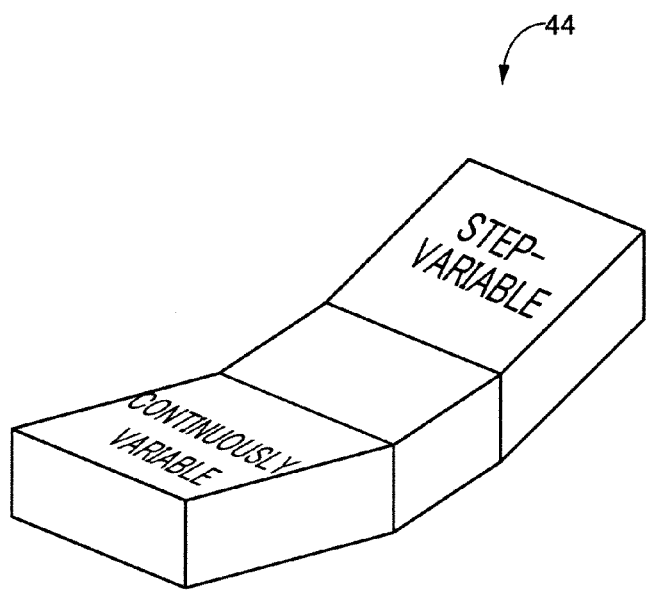
FIG. 20 is a view showing an example of a shifting state manual selection device including a seesaw type switch serving as a switching device to be manipulated by a vehicle driver for selecting a shifting state.

FIG. 20 shows an example a seesaw type switch 44 (hereinafter referred to as a switch 44), acting as a shifting-state manual selection device, which is installed on a vehicle for a vehicle driver to manually operate. The switch 44 allows manual operation to cause the power distributing mechanism 16 to be selectively placed in the differential state and the non-differential state (locked state), that is, the continuously variable shifting state and the step-variable shifting state. The switch 44 allows the vehicle to run in a shifting state desired by the vehicle driver. The switch 44 has a continuously variable shift running command button with a display "CONTINUOUSLY VARIABLE", representing a continuously variable shift running mode, and a step-variable shift running command button with a display "STEP-VARIABLE" representing a step-variable shift running mode. Upon depression of the vehicle driver on one of these buttons, the transmission mechanism 10 can be selectively placed in the continuously variable shifting state, operative as the electrically controlled continuously variable transmission, or the step-variable shifting state operative as the step-variable transmission.

The embodiments set forth above have been described with reference to the case wherein the transmission mechanism 10 performs the automatic switching control operation to be placed in the shifting state based on variations in the vehicle condition by referring to, for instance, the relational chart shown in FIG. 7. On the contrary, in place of the automatic switching control operation or in addition thereto, the switch 44 may be manipulated for thereby executing manual switching control for the shifting state of the transmission mechanism 10. That is, the switching control means 50 may take priority to switch the transmission mechanism 10 to the continuously variable shifting state and the step-variable shifting state depending on the switch 44 selectively operated for the continuously variable shifting state and the step-variable shifting state. For instance, if the vehicle driver, desiring a running mode with a touch of feeling in the continuously variable transmission and improved fuel economy, then manually selects the continuously variable shifting to be placed by the transmission mechanism 10. Further, if another running mode is desired with the step-variable transmission performing the gear shifting accompanied by a rhythmical change in the rotating speed $N_E$ of the engine, the vehicle driver manually selects the step-variable shifting state to be placed by the transmission mechanism 10

However, even under a circumstance where the selective operation of the switch 44 is performed to switch the transmission mechanism 10 to the step-variable shifting state, the switching control means 50 performs the operation for the continuously variable shifting state in a given situation. That is, the differential portion 11 is preferentially maintained in the shifting state of the continuously variable shifting state or uncouple the switching clutch C0 or the switching brake B0, to preferentially (forcibly) place the shifting state of the differential portion 11 in the continuously variable shifting state. As used herein, the term "given situation" refers to a state in which the hybrid control means 52 determines that the engine start-up condition is established, and subsequently, the engine start and stop control means 80 begins the starting of the engine 8. The differential portion 11 is placed in the continuously variable shifting state because of the fact that the engine start and stop control means 80 enables the engine speed $N_E$ to rapidly transit the given engine speed $N_{ER}$.

Even under a circumstance where the switch 44 is selectively operated so as to switch the transmission mechanism 10 to the step-variable shifting state, the hybrid control means 52 determines that the engine start-up condition is established, and subsequently, the engine start and stop control means 80 begins halting the engine 8. In an alternative, the switching control means 50 performs the operation to maintain the shifting state of the differential portion 11 in the continuously variable shifting state or uncouple the switching clutch C0 or the switching brake B0, to preferentially (forcibly) place the shifting state of the differential portion 11 in the continuously variable shifting state such that the engine start and stop control means 80 causes the engine speed $N_E$ to rapidly transit the given engine speed $N_{ER}$.

Further, there exists a probability for the switch 44 not to be provided with a neutral position under which neither the continuously variable running mode nor the step-variable running mode is selected. Under such a probability, if the switch 44 remains in a status with the neutral position, if no desired shifting state is selected by the vehicle driver or if the desired shifting state is under automatic switching mode, then, the automatic switching control may be executed for the shifting state of the transmission mechanism 10.

While in the foregoing, the embodiments of the present invention have been described above in detail with reference to the accompanying drawings, the present invention may be embodied in other specific forms.

With the illustrated embodiment set forth above, the step-variable shifting state judge means 86 (corresponding to step S3 shown in FIG. 11) judges, based on, for instance, whether or not the switching control means 50 places the transmission mechanism 10 in the step-variable shifting state, to find whether or not the differential portion 11 is placed in the step-variable shifting state. However, the determination may be made based on the vehicle condition, represented with the vehicle speed V and the output torque $T_{OUT}$ by referring to the shifting diagram shown in FIG. 7, to find whether or not the differential portion 11 is placed in the step-variable control region. In an alternative, the determination may be made based on a selectively operated state of the switch 44 to find whether or not the vehicle runs in a condition under the step-variable shifting mode.

With the illustrated embodiment described above, further, the continuously variable shifting state determining means 89 (corresponding to step SB3 shown in FIG. 15) determines, based on whether or not the switching control means 50 places the transmission mechanism 10 in the continuously variable shifting state, to find whether or not the differential portion 11 is placed in the continuously variable shifting state. However, the determination may be made based on the vehicle condition, represented with the vehicle speed V and the output torque $T_{OUT}$ by referring to the shifting diagram shown in FIG. 7, to find whether or not the differential portion 11 remains in the continuously variable control region. In an alternative, the determination may be made based on the selectively operated state of the switch 44 to find whether or not the vehicle runs in the condition under the continuously variable shifting mode.

With the illustrated embodiment set forth above, further, the engine start and stop control means 80 executes the operations to start and halt the engine 8. However, with the first embodiment, the engine start and stop control means 80 may suffice to function as engine start control means that achieves at least the start-up of the engine 8, and may include engine stop control means, operative to halt the engine 8, independently of the engine start control means. Or, the engine start and stop control means 80 executes the operations to start and stop the engine 8. However, with the second embodiment, the engine start and stop control means 80 may suffice to function as engine stop control means that effectuates at least the halt of the engine 8, and may include engine start control means, operative to start-up the engine 8, independently of the engine stop control means.

Further, the engine start and stop control means 80 executes the operation to start-up the engine by increasing the engine speed $N_E$ using the first electric motor M1. However, the engine speed $N_E$ may be raised using an electric motor for sole use in start-up of the engine 8 for thereby effectuating the start-up of the engine 8. In the alternative, the engine start and stop control means 80 decreases the engine speed $N_E$ using the first electric motor M1 for thereby effectuating the halting of the engine 8. However, the engine speed $N_E$ may be lowered using an electric motor for sole use in halting the engine 8 for thereby effectuating the halting of the engine 8. In an alternative, the engine start and stop control means 80 may be configured to lower the rotating speed $N_{M1}$ of the first electric motor M1 prior to the fuel cutoff operation being performed for thereby decreasing the engine speed $N_E$.

For instance, in the illustrated embodiment, the transmission mechanism 10, 70 is structured to be switched to the continuously variable shifting state and the step-variable shifting state, by switching the differential portion 11 (power distributing mechanism 16) to the differential state functioning as the electrically continuously variable transmission and the non-differential state (locked state). The switching between the continuously variable shifting state and the step-variable shifting state is performed as one mode of placing the differential portion 11 in the differential state and the non-differential state. However, even if, for instance, when placed in the differential state, the differential portion 11 may be arranged to function as a step-variable transmission with the shifting speed ratio thereof made not in a continuous mode but in a stepwise mode. In other words, the differential state/non-differential state of the differential portion 11 and the continuously variable shifting state/step-variable shifting state of the transmission mechanism 10, 70 do not necessarily fall in a one-on-one correspondence. The differential portion 11 need not necessarily be formed in a structure to enable the switching between the continuously variable shifting state and the step-variable shifting state, but the transmission mechanism 10, 70 (power distributing mechanism 16) is sufficiently structured to be switched between the differential state and the non-differential state, for the present invention.

In the power distributing mechanisms 16 in the illustrated embodiments, the first carrier CA1 is fixed to the engine 8, and the first sun gear S1 is fixed to the first electric motor M1, and the first ring gear R1 is fixed to the transmitting member 18. However, such connecting arrangement is not essential, and the engine 8, first electric motor M1 and transmitting member 18 are fixed to respective ones of the three elements CA1, S1 and R1 of the first planetary gear unit 24. Although the engine 8 is directly connected to the drive apparatus input shaft 14 in the illustrated embodiments, it may be operatively connected to the input shaft 14 through gears, a belt or the like, and need not be disposed coaxially therewith.

In the illustrated embodiments, the first electric motor M1 and the second electric motor M2 are disposed coaxially with the drive apparatus input shaft 14, the first electric motor M1 is fixed to the first sun gear S1, and the second electric motor M2 is fixed to the transmitting member 18. However, such arrangement is not essential. For example, the first electric motor M1 may be fixed to the first sun gear S1 through gears, a belt or the like, and the second electric motor M2 may be fixed to the transmitting member 18.

In addition, the second electric motor M2 can be connected to, instead of the transmitting member 18 as in the illustrated embodiment, to the output shaft 22, or the rotating member disposed in the automatic transmission portion 20, 72. Further, as one mode provided in the power transmitting path from the transmitting member to the drive wheel, the second electric motor M2 is connected to the transmitting member 18, the output shaft 22 and the like via a gear, belt, speed reduction device and the like.

Although the above power distributing mechanism 16 is provided with both the switching clutch C0 and the switching brake B0, it need not be provided with both of them, and may be provided with only one of the switching clutch C0 and brake B0. Although the switching clutch C0 selectively connects the sun gear S1 and carrier CA1 to each other, it may selectively connect the sun gear S1 and ring gear R1 to each other, or the carrier CA1 and ring gear R1. In essence, the switching clutch C0 sufficiently connects any two of the three elements of the first planetary gear unit 24.

The switching clutch C0 in the embodiment is engaged to establish the neutral position "N" in the transmission mechanism 10, 70, but the neutral position need not be established by engagement thereof. The hydraulic-type frictional coupling devices such as the switching clutch C0 and switching brake B0 may be a coupling device of a magnetic-powder type, an electromagnetic type or a mechanical type, such as a powder (magnetic powder) clutch, an electromagnetic clutch and a meshing type dog clutch.

In the above embodiment, as the coupling device for selectively switching the power transmitting path into the power transmissive state and the power interrupted state, the first clutch C1 and the second clutch C2 are employed, which constructs the part of the automatic transmission portion 20, 72 and are disposed between the automatic transmission portion 20, 72 and the differential portion 11. However, the coupling device is not necessarily the first clutch C1 and the second clutch C2, and at least one coupling device, enabling the power transmitting path into the power transmissive state and the power interrupted state, can be sufficiently employed. Such coupling device can be connected to for example the output shaft 22, or connected to the rotating member in the automatic transmission portion 20, 72. The coupling device does not necessarily construct the part of the automatic transmission portion 20, 72, and can be provided independent therefrom.

In the illustrated embodiment, further, the automatic transmission portion 20, 72 is disposed in the power transmitting path between the transmitting member 18 serving as the output member of the differential portion 11, that is the power distributing mechanism 16 and the drive wheels 38. However, a power transmitting device of the other type such as, for instance, a continuously variable transmission (CVT) which is one kind of the automatic transmission, a first type manual transmission or a second type manual transmission can be employed. The first manual transmission of a well-known constantly meshed type includes two parallel shafts, and is automatically switched the gear positions thereof by the select ring and the shift cylinder. The second manual transmission of a synchronously meshed type is so constructed that the gear positions thereof is manually switched. Other type of the power transmitting device (transmission) can be employed. The continuously variable transmission (CVT) is set in a step-variable shifting state as a whole, by placing the power distributing mechanism 16 in a fixed speed shifting state. The term "step-variable shifting state" used herein refers to a state wherein power transmission is achieved mainly in a mechanical transmitting path without using the electrical path.

In an alternative, the continuously variable transmission may be configured to preliminarily store a plurality of fixed speed ratios in correspondence to gear-shift positions of a step-variable transmission to allow the gear shift of the automatic transmission portion 20, 72 to be executed using such a plurality of fixed speed ratios.

Noted it that the present invention can be applied to the drive apparatus not including the automatic transmission portion 20, 72. When the automatic transmission portion 20, 72 is constructed by the continuously variable transmission (CVT) as in the illustrated embodiment, or when no automatic transmission portion 20, 72 is provided, the coupling device is provided in the power transmitting path between the transmitting member 18 and the drive wheel 38 for sole use.

The coupling device is controlled to have the coupled state or the uncoupled state, so that the power transmitting path is switched to the power transmissive state or the power interrupted state.

In the illustrated embodiment, furthermore, while the automatic transmission portion 20, 72 is connected to the differential portion 11 in series via the transmitting member 18, a countershaft may be provided in parallel to the input shaft 14 to allow the automatic transmission portion 20, 72 to be coaxially disposed on an axis of the countershaft. In this case, the differential portion 11 and the automatic transmission portion 20, 72 are connected to each other in power transmitting capability via a set of transmitting members structured of, for instance, a counter-gear pair acting as the transmitting member, a sprocket and a chain. The power distributing mechanism 16 in the illustrated embodiment can be comprised of for example a pinion driven and rotated by the engine, and a differential gear set having a pair of bevel gears meshed with the pinion being operatively connected to the first electric motor M1 and the second electric motor M2.

The power distributing mechanism 16 in the illustrated embodiment comprised of one paired planetary gear units, may be comprised of two or more pairs planetary gear units to function in the non-differential state (fixed speed state) as the transmission having three or more speed positions. The planetary gear unit is not limited to the single-pinion type, but can be the double-pinion type.

The switch device 90 in the illustrated embodiment has the shift lever 92 to be manipulated for selecting one of a plurality of shift positions. However, instead of such shift lever 92, following switch or device can be employed. That is, a switch being comprised of a pressing type switch and a sliding type switch and being selected to one of a plurality of shift positions; a device being selected to one of a plurality of shift positions in response not to the manipulation by the hand but to the driver's voice; and a device being selected to one of a plurality of shift positions in response to the manipulation by the foot, can be employed.

In the illustrated embodiment, the shifting range is established by manipulation of the shift lever 92 to the "M" position, but the shifting position i.e., speed position can be established by setting of the shifting step that is the maximum speed step for each shifting range. In this case, in the automatic transmission portion 20, 72, the shifting position is switched for executing the shifting action. For example, when the manual manipulation of the shift lever 92 to a shift-up position "+" and a shift-down position "−" at the "M" position is executed, any of the first gear position to the fourth gear position is set by the manipulation of the shift lever 92 in the automatic transmission portion 20.

The switch 44 in the illustrated embodiment is of the seesaw type. However, switches capable of being selectively switched to one of the continuously variable shifting running (differential state) and the step-variable shifting running (non-differential state) can be employed. That is, a pressing type switch; two pressing type switches which can hold the state selectively pressed; a lever type switch; and a sliding type switch, can be provided. In addition to the switch 44 having single neutral position, a switch having two shifting positions for making the selected state thereof valid and invalid can be provided, independent from the switch 44, can be employed. Instead of, or in addition to the switch 44, following devices can be employed. That is, the devices capable of being selectively switched to one of the continuously variable shifting running (differential state) and the step-variable shifting running (non-differential state), in response not to the manual manipulation but to the driver's voice, and the device switched by the manipulation by foot, can be employed.

Needless to say, above mentioned are mere illustration of the embodiments, and accordingly the present invention can be carried out in the various altered or improved modes based on knowledge of the skilled person in this technical field.

The invention claimed is:

1. A control apparatus for a drive apparatus for a vehicle, the drive apparatus having an engine, and a continuously variable transmission portion including a differential mechanism through which an engine output is distributed to a first electric motor and a transmitting member and a second electric motor disposed in a power transmitting path between the transmitting member and drive wheels, and being operative to act as an electrically controlled continuously variable transmission, the control apparatus comprising:

a differential state switch device incorporated in the differential mechanism and selectively switched to an uncoupling state under which the continuously variable transmission portion is placed in a continuously variable shifting state rendered operative to perform an electrically controlled continuously variable shifting operation, and a coupling state under which the continuously variable transmission portion is placed in a non-continuously variable shifting state rendered inoperative to perform the electrically controlled continuously variable shifting operation;

on-engine-start switching control means operative to place the continuously variable transmission portion in the continuously variable shifting state upon a start-up of the engine; and engine start control means operative to increase an engine rotation speed to a level higher than a given engine rotation speed using the first electric motor for thereby starting up the engine.

2. A control apparatus for drive apparatus for vehicle according to claim 1, wherein the on-engine-start switching control means is operative to place the continuously variable transmission portion in the continuously variable shifting state, when the vehicle encounters vibration and/or noise at a level exceeding a given value upon the start-up of the engine.

3. A control apparatus for drive apparatus for vehicle according to claim 1, wherein the on-engine-start switching control means is operative to place the shifting state of the continuously variable transmission portion in the continuously variable shifting state, when the power transmitting path from the engine to the drive wheels is placed in a power transmissive state.

4. A control apparatus for drive apparatus for vehicle according to claim 1, wherein the on-engine-start switching control means is operative to place the continuously variable transmission portion in the continuously variable shifting state until the start-up of the engine is completed.

5. A control apparatus for drive apparatus for vehicle according to claim 1, wherein the on-engine-start switching control means is operative to place the shifting state of the continuously variable transmission portion in the continuously variable shifting state for a given start-up time period required for the engine to start-up after the start-up of the engine is commenced.

6. A control apparatus for a drive apparatus for a vehicle,
the drive apparatus having an engine, and a differential portion including a differential mechanism for distributing an engine output to a first electric motor and a transmitting member, and a second electric motor provided in a power transmitting path between the transmitting member and drive wheels,
the control apparatus comprising:
a differential state switch device incorporated in the differential mechanism and selectively switched to an uncoupling state in which the differential mechanism performs a differential action, and a coupling state in which the differential action is disenabled;
on-engine-start switching control means operative to place the differential mechanism in the uncoupling state upon the start-up of the engine; and
engine start control means operative to increase the engine speed to a level higher than a given engine speed using the first electric motor.

7. A control apparatus for drive apparatus for vehicle according to claim 6, wherein the on-engine-start switching control means is operative to place the differential mechanism in the uncoupling state, when the vehicle encounters vibration and/or noise at a level exceeding a given value upon the start-up of the engine.

8. A control apparatus for drive apparatus for vehicle according to claim 6, wherein the on-engine-start switching control means is operative to place the differential mechanism in the uncoupling state, when the power transmitting path from the engine to the drive wheels is placed in a power transmissive state.

9. A control apparatus for drive apparatus for vehicle according to one of claim 6, wherein the on-engine-start switching control means is operative to place the differential mechanism in the uncoupling state until the start-up of the engine is completed.

10. A control apparatus for drive apparatus for vehicle according to claim 6, wherein the on-engine-start switching control means is operative to place the differential mechanism in the uncoupling state for a given start-up time period required for the engine to start-up after the start-up of the engine is initiated.

11. A control apparatus for a drive apparatus for a vehicle,
the drive apparatus having an engine, and a continuously variable transmission portion including a differential mechanism through which an engine output is distributed to a first electric motor and a transmitting member, and a second electric motor provided in a power transmitting path between the transmitting member and drive wheels, and being operative to act as an electrically controlled continuously variable transmission,
the control apparatus comprising:
a differential state switch device incorporated in the differential mechanism and selectively switched to an uncoupling state under which the continuously variable transmission portion is placed in a continuously variable shifting state rendered operative to perform an electrically controlled continuously variable shifting operation, and a coupling state under which the continuously variable transmission portion is placed in a non-continuously variable shifting state rendered inoperative to perform the electrically controlled continuously variable shifting operation; and
on-engine-stop switching control means operative to place the continuously variable transmission portion in the continuously variable shifting state upon the halt of the engine.

12. A control apparatus for drive apparatus for vehicle according to claim 11, further comprising engine stop control means operative to decrease an engine speed to a level less than a given engine speed using the first electric motor for halting the engine.

13. A control apparatus for drive apparatus for vehicle according to claim 11, wherein the on-engine-stop switching control means is operative to place the shifting state of the continuously variable transmission portion in the continuously variable shifting state, when the power transmitting path from the engine to the drive wheels is placed in the power transmissive state.

14. A control apparatus for drive apparatus for vehicle according to claim 11, wherein the on-engine-stop switching control means is operative to place the shifting state of the continuously variable transmission portion in the continuously variable shifting state until the halt of the engine is completed.

15. A control apparatus for drive apparatus for vehicle according to claim 11, wherein the on-engine-stop switching control means is operative to place the shifting state of the continuously variable transmission portion in the continuously variable shifting state for a given halt time period required for the engine to be halted after the halt of the engine is commenced.

16. A control apparatus for drive apparatus for vehicle according to claim 12, wherein the engine stop control means is operative to halt the engine by decreasing an engine rotation speed to a level less than a given engine rotation speed using the first electric motor.

17. A control apparatus for a drive apparatus for a vehicle,
the drive apparatus having an engine, and a differential portion including a differential mechanism for distributing an engine output to a first electric motor and a transmitting member, and a second electric motor provided in a power transmitting path between the transmitting member and drive wheels,
the control apparatus comprising:
a differential state switching device incorporated in the differential mechanism and selectively switched to an uncoupling state for the differential mechanism to perform a differential action and a coupling state for the differential mechanism not to perform the differential action; and
on-engine-stop switching control means operative to place the differential mechanism in the uncoupling state upon the halt of the engine.

18. A control apparatus for drive apparatus for vehicle according to claim 17, further comprising engine stop control means operative to decrease the engine rotation speed to a level lower than a given engine rotation speed using the first electric motor or halting the engine.

19. A control apparatus for drive apparatus for vehicle according to claim 17, wherein the on-engine-stop switching control means is operative to place the differential mechanism in the uncoupling state, when the power transmitting path from the engine to the drive wheels is placed in a power transmissive state.

20. A control apparatus for drive apparatus for vehicle according to one of claim 17, wherein the on-engine-stop switching control means is operative to place the differential mechanism in the uncoupling state until the halt of the engine is completed.

21. A control apparatus for drive apparatus for vehicle according to one of claim 17, wherein the on-engine-stop switching control means is operative to place the differential mechanism in the uncoupling state for a given halt time interval required for the engine be halted after the halt of the engine is commenced.

22. A control apparatus for drive apparatus for vehicle according to claim 18, wherein the engine stop control means is operative to halt the engine by decreasing an engine rotation speed to a level less than a given engine rotation speed using the first electric motor.

* * * * *